US008668614B2

(12) United States Patent
Sherrill et al.

(10) Patent No.: US 8,668,614 B2
(45) Date of Patent: Mar. 11, 2014

(54) HIGH TORQUE TRACTION DRIVE

(75) Inventors: Ryan Sherrill, Fort Collins, CO (US);
Ed VanDyne, Loveland, CO (US)

(73) Assignee: Vandyne Superturbo, Inc., Loveland, CO (US)

( * ) Notice: Subject to any disclaimer, the term of this patent is extended or adjusted under 35 U.S.C. 154(b) by 223 days.

(21) Appl. No.: 13/354,320

(22) Filed: Jan. 19, 2012

(65) Prior Publication Data
US 2013/0017920 A1  Jan. 17, 2013

Related U.S. Application Data

(60) Provisional application No. 61/434,358, filed on Jan. 19, 2011.

(51) Int. Cl.
*F16H 13/06* (2006.01)
*F16H 13/14* (2006.01)

(52) U.S. Cl.
USPC .......................................... 475/183; 475/195

(58) Field of Classification Search
CPC .......... F16H 13/06; F16H 13/10; F16H 13/14
USPC ................................................ 475/183, 195
See application file for complete search history.

(56) References Cited

U.S. PATENT DOCUMENTS

| 236,150 | A | 1/1881 | Fitch |
|---|---|---|---|
| 1,526,493 | A | 2/1925 | Dolton |
| 1,550,796 | A | 8/1925 | Gammons |
| 1,686,446 | A | 10/1928 | Gilman |
| 1,691,625 | A | 11/1928 | Chilton |
| 1,718,846 | A | 6/1929 | Arter |
| 1,979,170 | A | 10/1934 | Nardone |

(Continued)

FOREIGN PATENT DOCUMENTS

| EP | 0517675 | 8/1995 |
|---|---|---|
| EP | 1400667 | 3/2004 |

(Continued)

OTHER PUBLICATIONS

PCT Application Serial No. PCT/US09/51742, filed with the U.S. Receiving Office on Jul. 24, 2009.

(Continued)

*Primary Examiner* — Edwin A Young
(74) *Attorney, Agent, or Firm* — William W. Cochran; Cochran Freund & Young LLC

(57) ABSTRACT

Disclosed is high torque traction drive. The high torque traction drive utilizes planet gears that engage the inner mesh of a ring gear. The planet gears are mounted in rollers that have inner traction surfaces that engage sloped ring traction surfaces on traction rings that are attached to the ring gear. The sloped traction interface causes the rollers to move inwardly when forced toward the traction rings. The inward force on the rollers creates a shaft traction interface between a shaft and outer traction surfaces on the roller, so that rotational mechanical energy is effectively transferred between the rollers, the shaft and the ring gear. High rotational speeds can be achieved with a high degree of torque. Speed reduction ratios of at least 10:1 or greater can be achieved. The high speed drive may include exhaust turbines, steam turbines, including a Tesla turbine or Schumacher turbine, compressors, combinations of turbines and compressors, high speed pumps, dentist drills, or other devices that operate with high rotational speed.

115 Claims, 30 Drawing Sheets

(56) References Cited

U.S. PATENT DOCUMENTS

| | | |
|---|---|---|
| 2,076,057 A | 4/1937 | Almen |
| 2,173,595 A | 9/1939 | Schutte |
| 2,216,494 A | 10/1940 | Kurtz et al. |
| 2,278,181 A | 3/1942 | Lieberherr |
| 2,397,941 A | 4/1946 | Birkigt |
| 2,412,351 A | 12/1946 | Mount |
| 2,542,539 A | 2/1951 | Kuhrt et al. |
| 2,573,258 A | 10/1951 | Gerritsen |
| 2,585,698 A | 2/1952 | Schneider |
| 2,585,968 A | 2/1952 | Schneider |
| 2,585,986 A | 2/1952 | Andreasson |
| 2,586,725 A | 2/1952 | Schottler |
| 2,590,800 A | 3/1952 | Stephenson |
| 2,620,621 A | 12/1952 | Nettel |
| 2,652,006 A | 9/1953 | Simonson |
| 2,696,888 A | 12/1954 | Chillson et al. |
| 2,701,970 A | 2/1955 | Kraus |
| 2,803,507 A | 8/1957 | Mempel et al. |
| 2,874,592 A | 2/1959 | Oehrli |
| 2,878,692 A | 3/1959 | Wolf |
| 2,901,924 A | 9/1959 | Banker |
| 2,905,026 A | 9/1959 | Oehrli |
| 2,913,932 A | 11/1959 | Oehrli |
| 2,941,422 A | 6/1960 | Barish |
| 2,973,671 A | 3/1961 | Elkins |
| 3,035,460 A | 5/1962 | Guichard |
| 3,044,683 A | 7/1962 | Woollenweber |
| 3,163,984 A | 1/1965 | Dumont |
| 3,203,278 A | 8/1965 | General |
| 3,237,468 A | 3/1966 | Schottler |
| 3,246,531 A | 4/1966 | Kashihara |
| 3,248,960 A | 5/1966 | Schottler |
| 3,293,945 A | 12/1966 | Stockton |
| 3,420,122 A | 1/1969 | Okabe |
| 3,423,927 A | 1/1969 | Scherenberg |
| 3,494,224 A | 2/1970 | Fellows et al. |
| 3,504,574 A | 4/1970 | Okabe |
| 3,673,797 A | 7/1972 | Wilkinson |
| 3,676,999 A | 7/1972 | Oldfield |
| 3,707,888 A | 1/1973 | Schottler |
| 3,745,844 A | 7/1973 | Schottler |
| 3,793,907 A | 2/1974 | Nakamura et al. |
| 3,988,894 A | 11/1976 | Melchior |
| 4,052,915 A | 10/1977 | Kraus |
| 4,089,569 A | 5/1978 | Rempel |
| 4,215,549 A | 8/1980 | Daeschner |
| 4,270,400 A | 6/1981 | Fodor |
| 4,287,791 A | 9/1981 | Numazawa et al. |
| 4,312,183 A | 1/1982 | Regar |
| 4,314,485 A | 2/1982 | Adams |
| 4,345,486 A | 8/1982 | Olesen |
| 4,378,677 A | 4/1983 | Zumstein |
| 4,398,436 A | 8/1983 | Fisher |
| 4,424,726 A | 1/1984 | Galbraith |
| 4,449,370 A | 5/1984 | Ream |
| 4,489,992 A | 12/1984 | Brandenstein et al. |
| 4,570,501 A | 2/1986 | de Bris Perry |
| 4,592,247 A | 6/1986 | Mutschler |
| 4,593,574 A | 6/1986 | Sinn et al. |
| 4,616,481 A | 10/1986 | Melchior et al. |
| 4,667,525 A | 5/1987 | Schottler |
| 4,693,134 A | 9/1987 | Kraus |
| 4,700,542 A | 10/1987 | Wang |
| 4,718,781 A | 1/1988 | Gerard |
| 4,729,225 A | 3/1988 | Bucher |
| 4,856,374 A | 8/1989 | Kreuzer |
| 5,033,269 A | 7/1991 | Smith |
| 5,037,361 A | 8/1991 | Takahashi |
| 5,385,514 A | 1/1995 | Dawe |
| 5,397,279 A | 3/1995 | McCotter, Jr. |
| 5,458,855 A | 10/1995 | Gillbrand |
| 5,551,929 A | 9/1996 | Fritsch |
| 5,560,207 A | 10/1996 | Ramsden et al. |
| 5,586,540 A | 12/1996 | Marzec et al. |
| 5,713,204 A | 2/1998 | Kadlicko |
| 5,724,813 A | 3/1998 | Fenelon et al. |
| 5,729,978 A | 3/1998 | Hiereth et al. |
| 5,775,417 A | 7/1998 | Council |
| 5,887,434 A | 3/1999 | Arnell et al. |
| 5,974,792 A | 11/1999 | Isobe |
| 6,041,602 A | 3/2000 | Dickey |
| 6,050,094 A | 4/2000 | Udd et al. |
| 6,050,095 A | 4/2000 | Blake |
| 6,095,940 A | 8/2000 | Ai et al. |
| 6,145,313 A | 11/2000 | Arnold |
| 6,227,180 B1 | 5/2001 | Hoffmann et al. |
| 6,343,473 B1 | 2/2002 | Kanesaka |
| 6,406,399 B1 | 6/2002 | Ai |
| 6,408,626 B1 | 6/2002 | Arnell |
| 6,470,864 B2 | 10/2002 | Kim et al. |
| 6,601,388 B1 | 8/2003 | Gladden |
| 6,651,432 B1 | 11/2003 | Gray, Jr. |
| 6,681,574 B2 | 1/2004 | Berglund et al. |
| 6,689,008 B2* | 2/2004 | Ai .................. 475/193 |
| 6,725,653 B2 | 4/2004 | Brown et al. |
| 6,729,315 B2 | 5/2004 | Onodera et al. |
| 6,857,263 B2 | 2/2005 | Gray, Jr. et al. |
| 6,871,498 B1 | 3/2005 | Allen et al. |
| 6,912,852 B2 | 7/2005 | Gottemoller et al. |
| 6,960,147 B2 | 11/2005 | Kolstrup |
| 6,994,531 B2 | 2/2006 | Dairokuno et al. |
| 7,025,042 B2 | 4/2006 | Gray, Jr. |
| 7,032,382 B2 | 4/2006 | Onodera et al. |
| 7,055,507 B2 | 6/2006 | Kelley, Jr. |
| 7,237,532 B2 | 7/2007 | Gray, Jr. |
| 7,455,617 B2 | 11/2008 | Miller et al. |
| 7,491,149 B2 | 2/2009 | Greenwood et al. |
| 7,492,594 B2 | 2/2009 | Pal |
| 7,540,818 B2 | 6/2009 | Miller et al. |
| 2003/0196436 A1 | 10/2003 | Hoecker et al. |
| 2005/0277514 A1 | 12/2005 | Hiroyuki et al. |
| 2006/0032225 A1 | 2/2006 | VanDyne |
| 2006/0070382 A1 | 4/2006 | Karlsson |
| 2006/0157291 A1 | 7/2006 | Puiu et al. |
| 2007/0062189 A1 | 3/2007 | Keppeler et al. |
| 2007/0130094 A1 | 6/2007 | Lien et al. |
| 2007/0130946 A1 | 6/2007 | Winsor et al. |
| 2007/0130948 A1 | 6/2007 | Boehm et al. |
| 2007/0197337 A1 | 8/2007 | Miller et al. |
| 2007/0275809 A1 | 11/2007 | Miller et al. |
| 2008/0141810 A1 | 6/2008 | Miller et al. |
| 2008/0146395 A1* | 6/2008 | Ai et al. ............. 475/183 |
| 2008/0236150 A1 | 10/2008 | Jarvi |
| 2008/0276756 A1 | 11/2008 | Marumoto |
| 2008/0282699 A1 | 11/2008 | Barthelet et al. |
| 2009/0277431 A1 | 11/2009 | Nitzke et al. |
| 2010/0031935 A1 | 2/2010 | VanDyne et al. |
| 2010/0174456 A1 | 7/2010 | Beaudoin et al. |
| 2010/0236503 A1 | 9/2010 | Bernt et al. |

FOREIGN PATENT DOCUMENTS

| | | |
|---|---|---|
| EP | 01300946 | 12/2004 |
| EP | 0994245 | 6/2005 |
| EP | 1550796 | 7/2005 |
| EP | 1711699 | 3/2007 |
| GB | 0206845 | 2/1924 |
| GB | 557970 | 12/1943 |
| JP | 61164039 | 7/1986 |
| JP | 3153947 | 7/1991 |
| WO | 2004072449 | 8/2004 |
| WO | 2006022635 | 3/2006 |
| WO | 2008008379 | 1/2008 |
| WO | 2011120520 | 10/2011 |

OTHER PUBLICATIONS

U.S. Appl. No. 12/536,421, filed Aug. 5, 2009.
U.S. Appl. No. 61/086,401, filed Aug. 5, 2008.
U.S. Appl. No. 61/231,624, filed Aug. 5, 2009.

(56) References Cited

OTHER PUBLICATIONS

U.S. Appl. No. 61/231,628, filed Aug. 5, 2009.

International Search Report, mailed May 4, 2012, in PCT Application Serial No. PCT/US2012/021932.

* cited by examiner

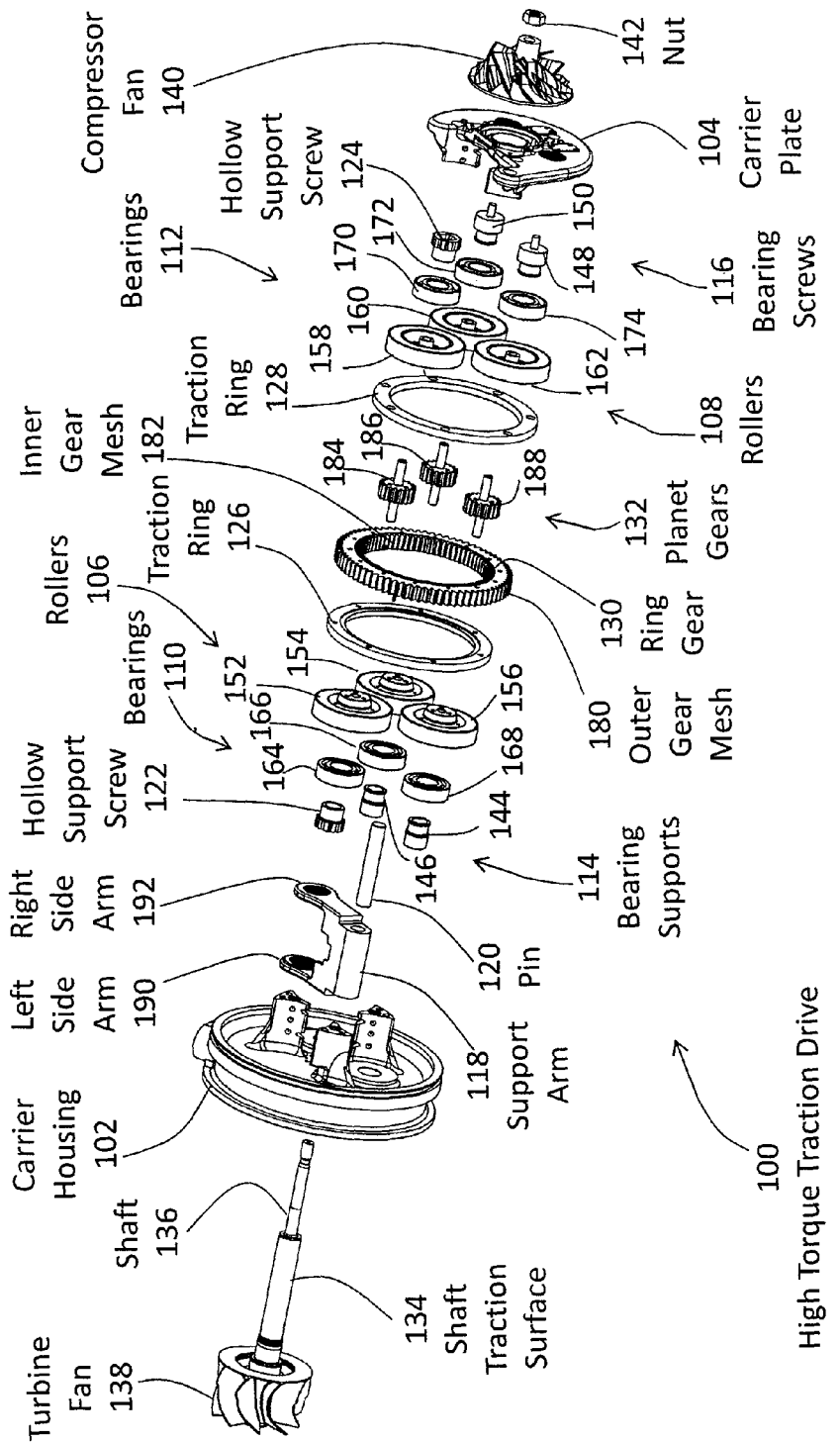

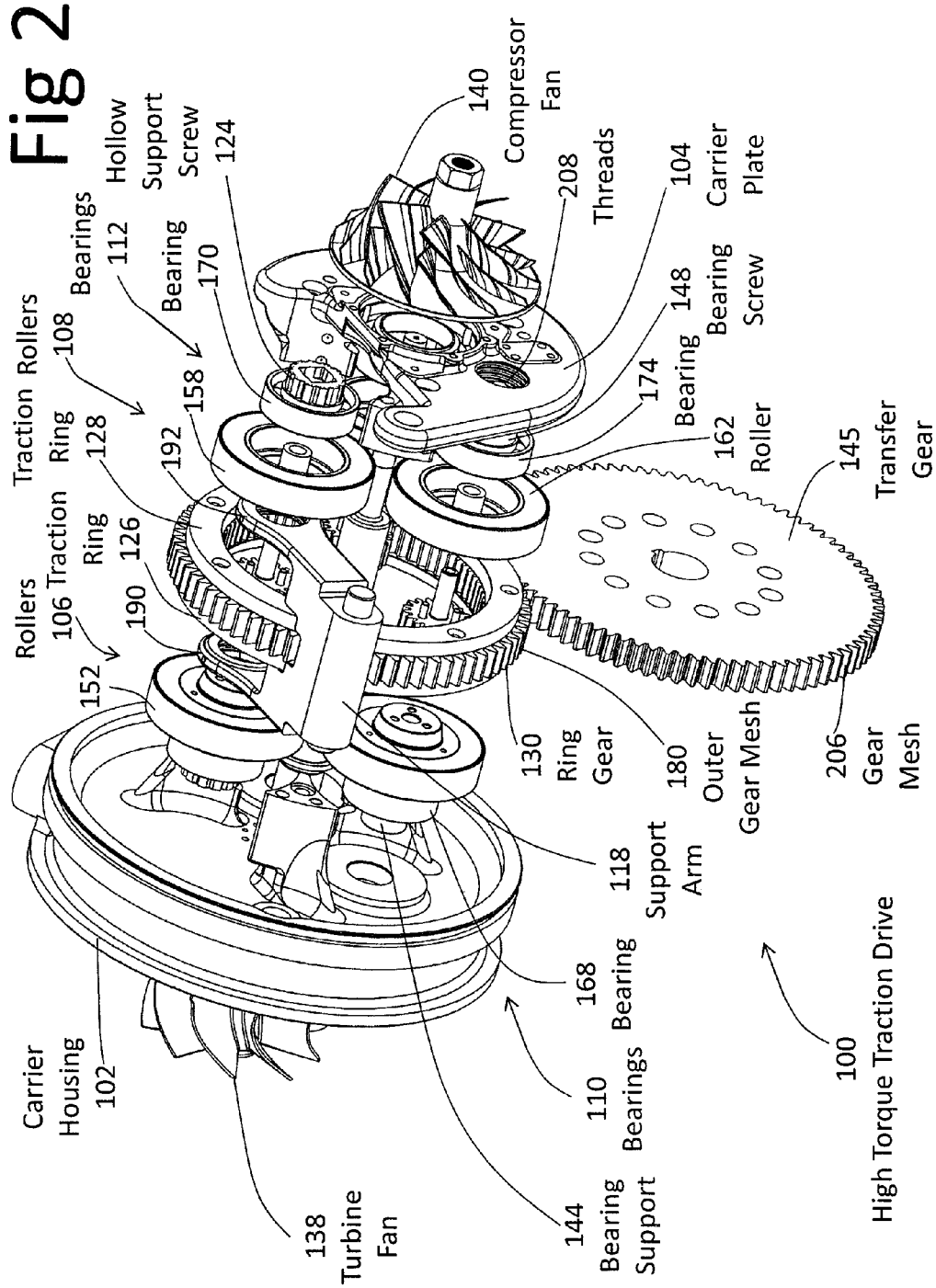

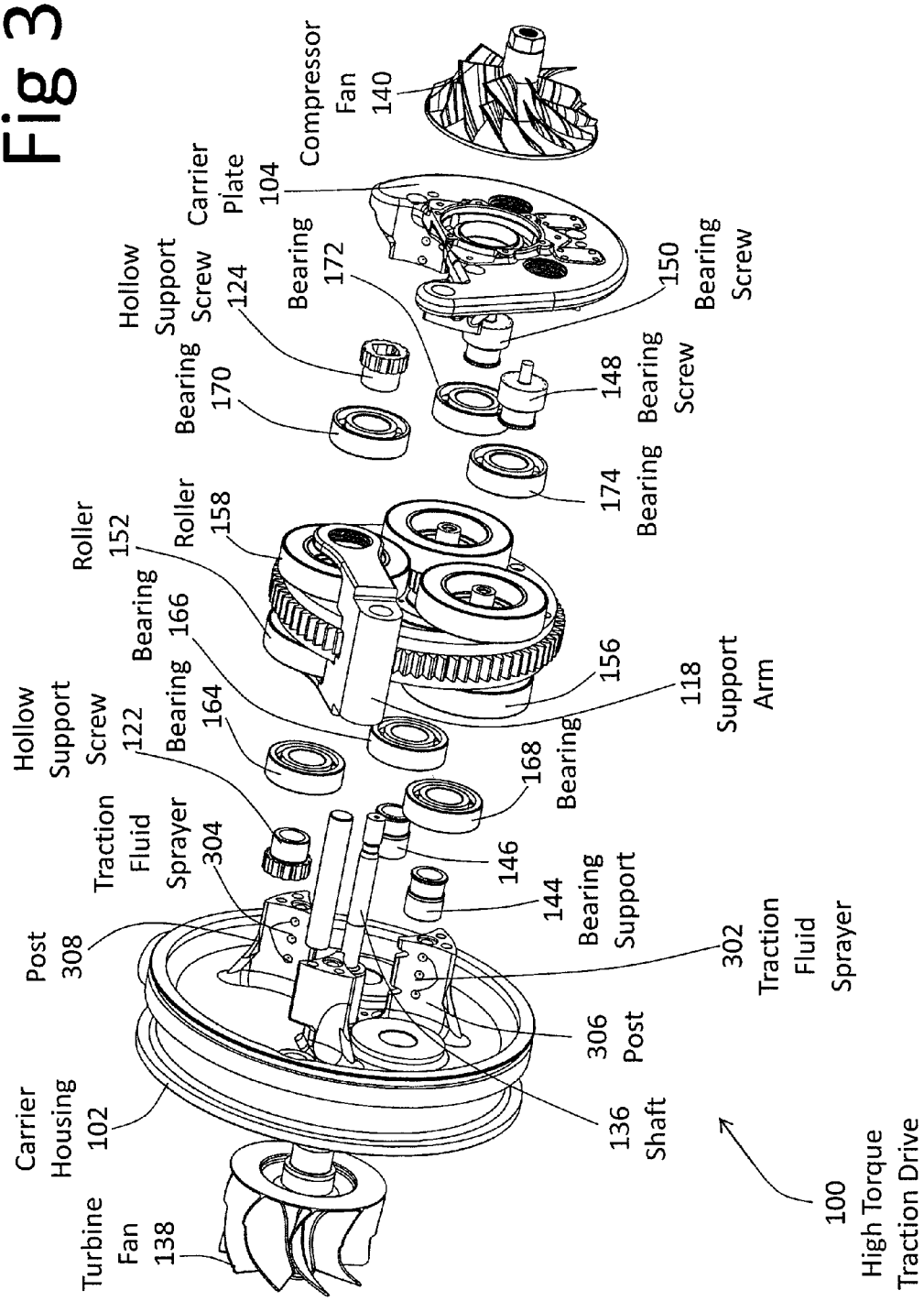

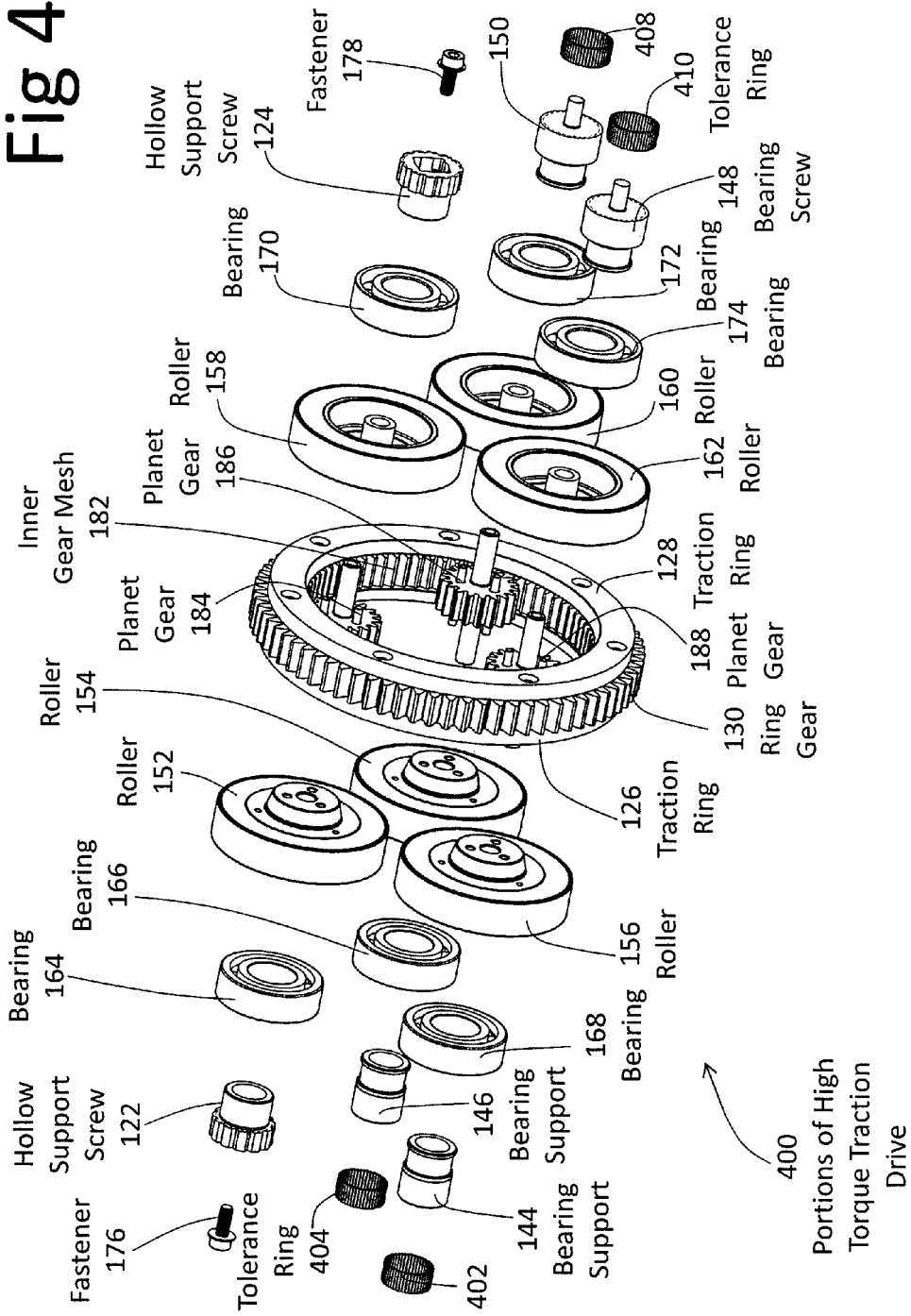

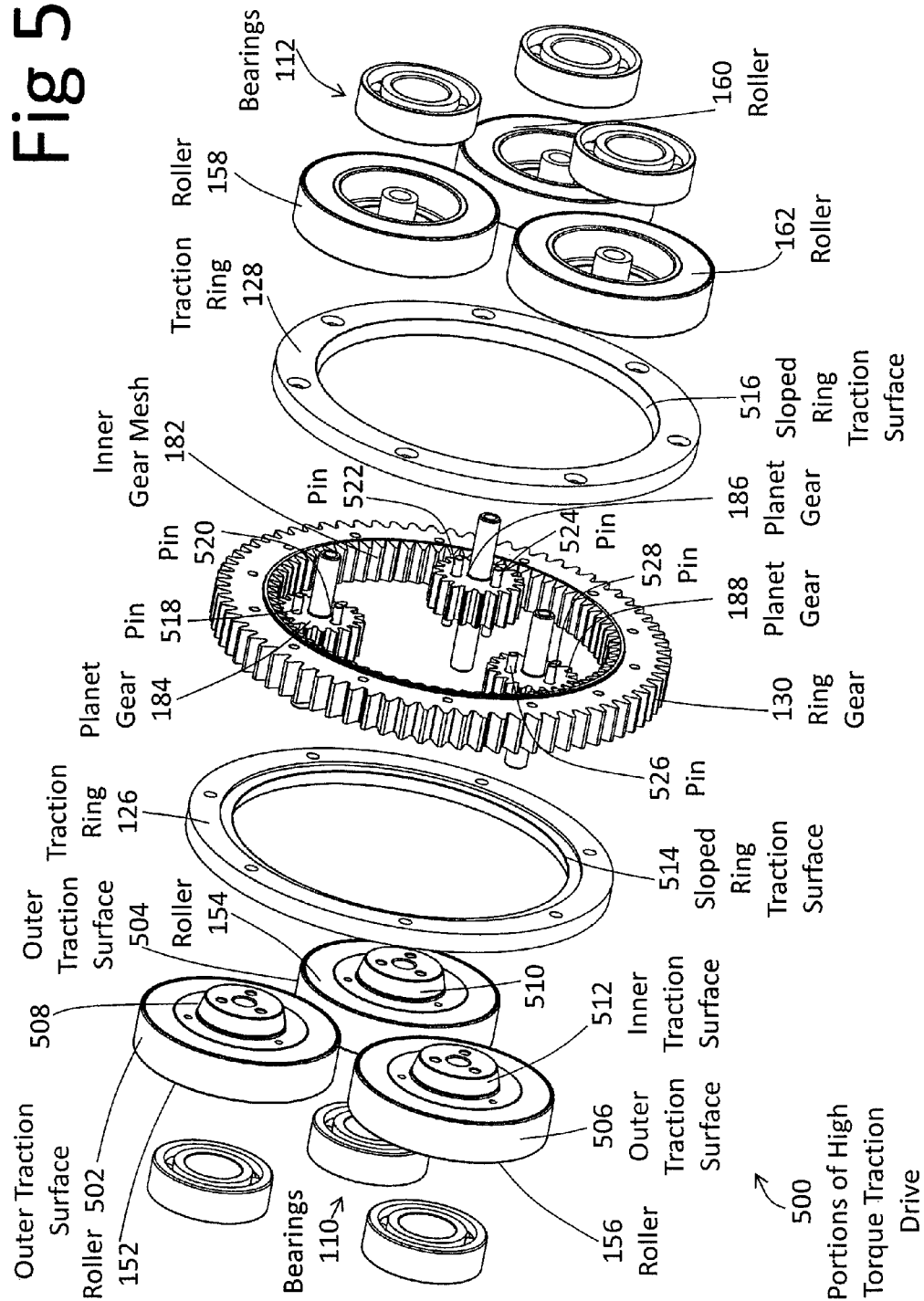

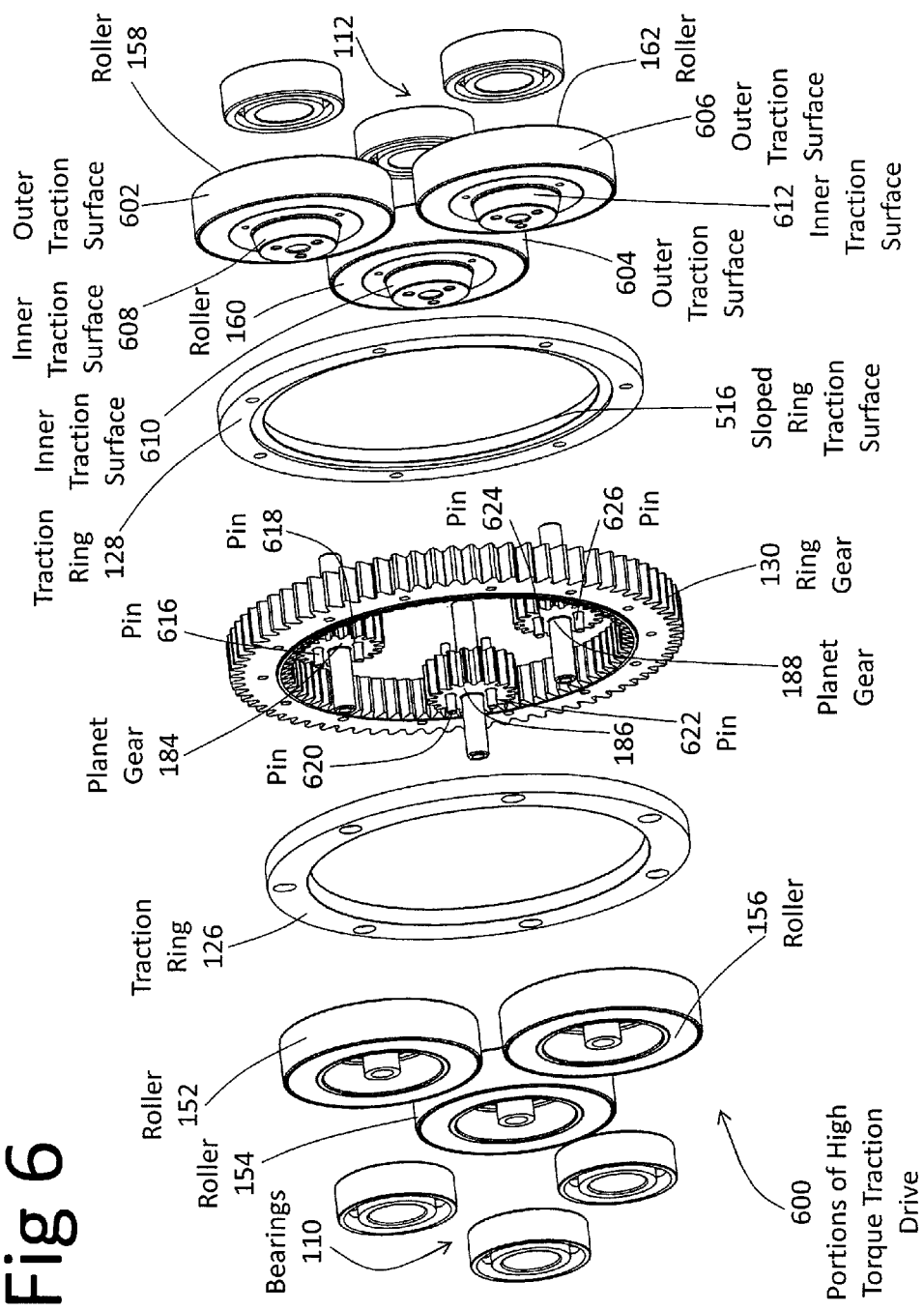

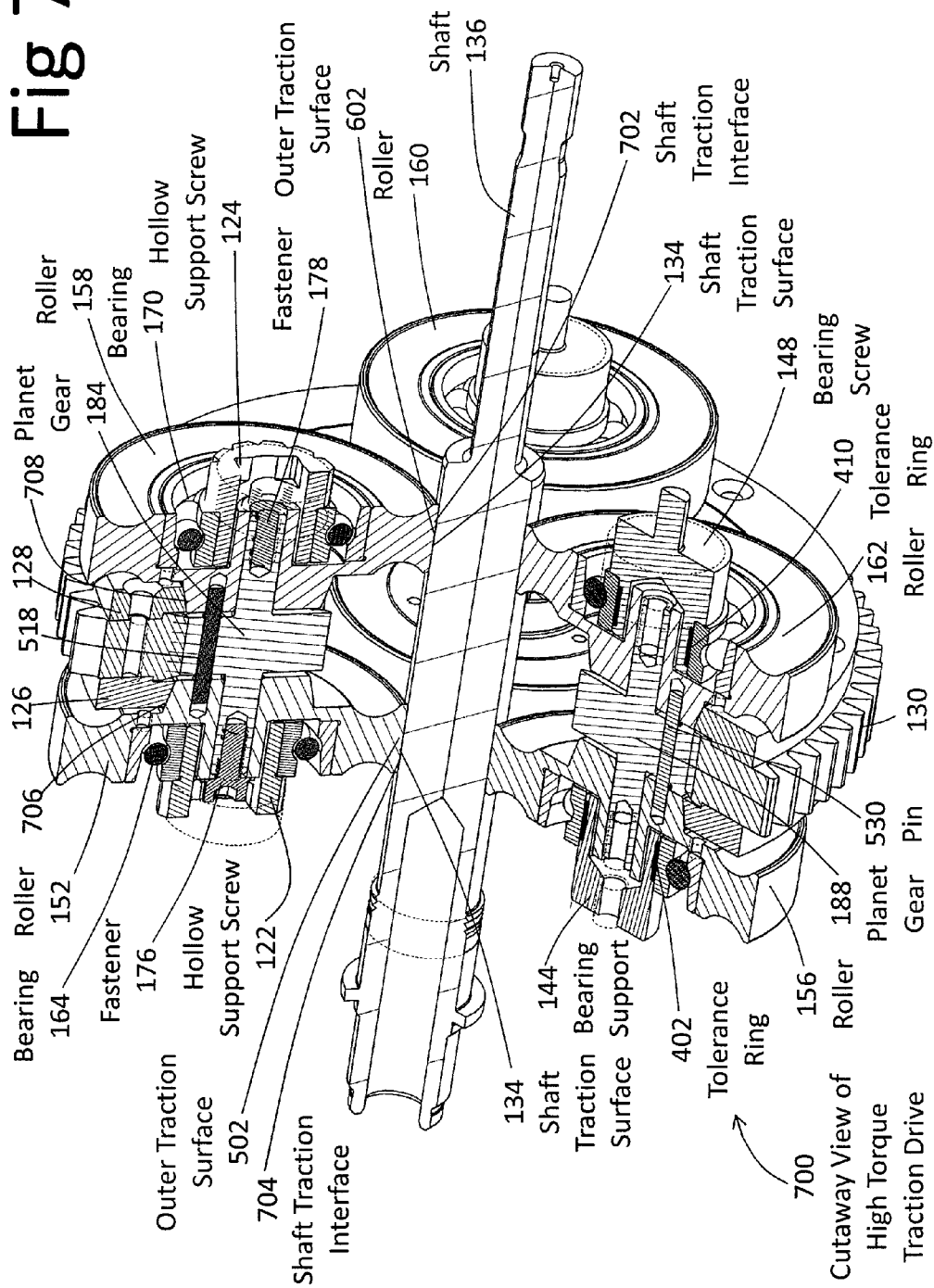

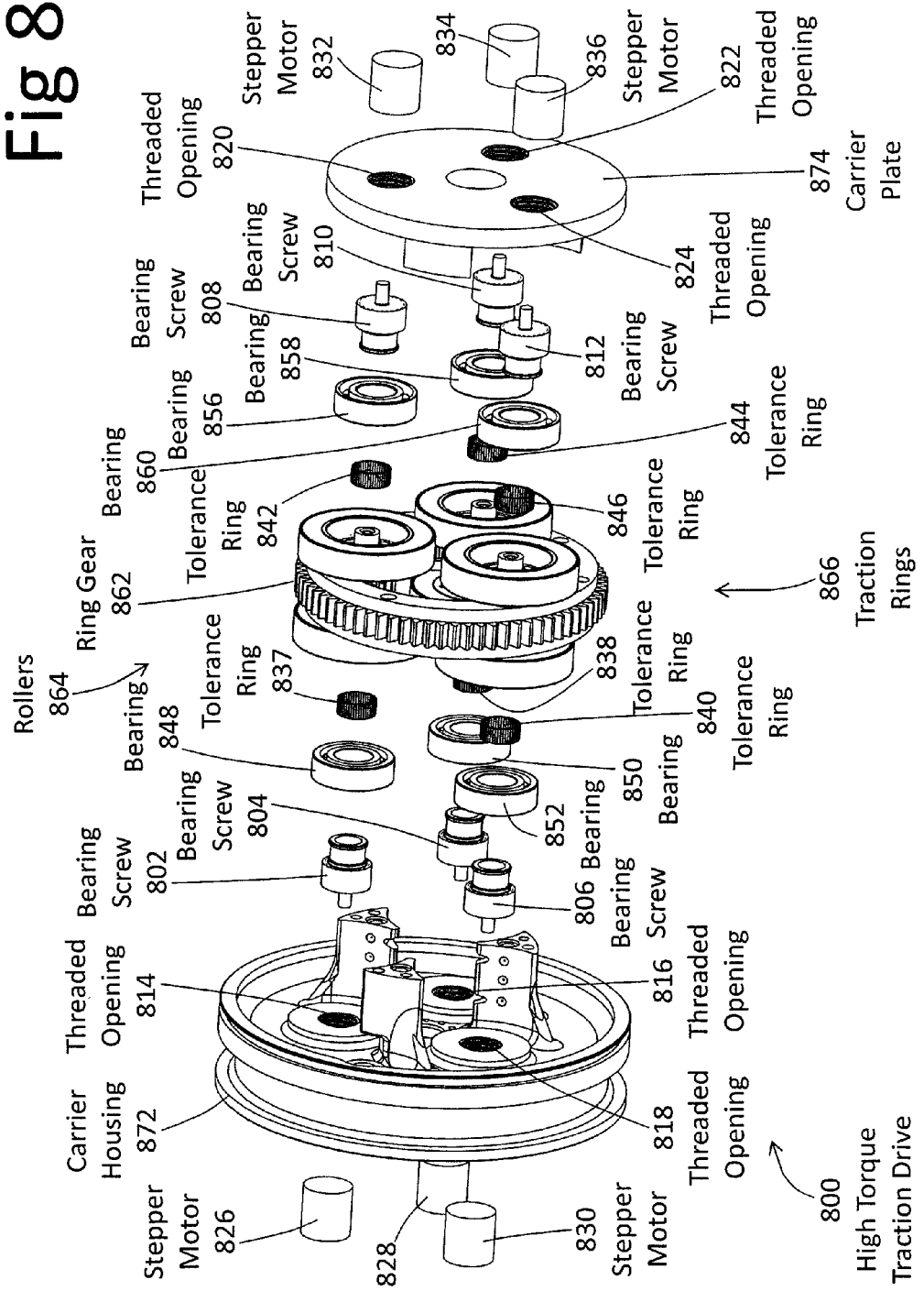

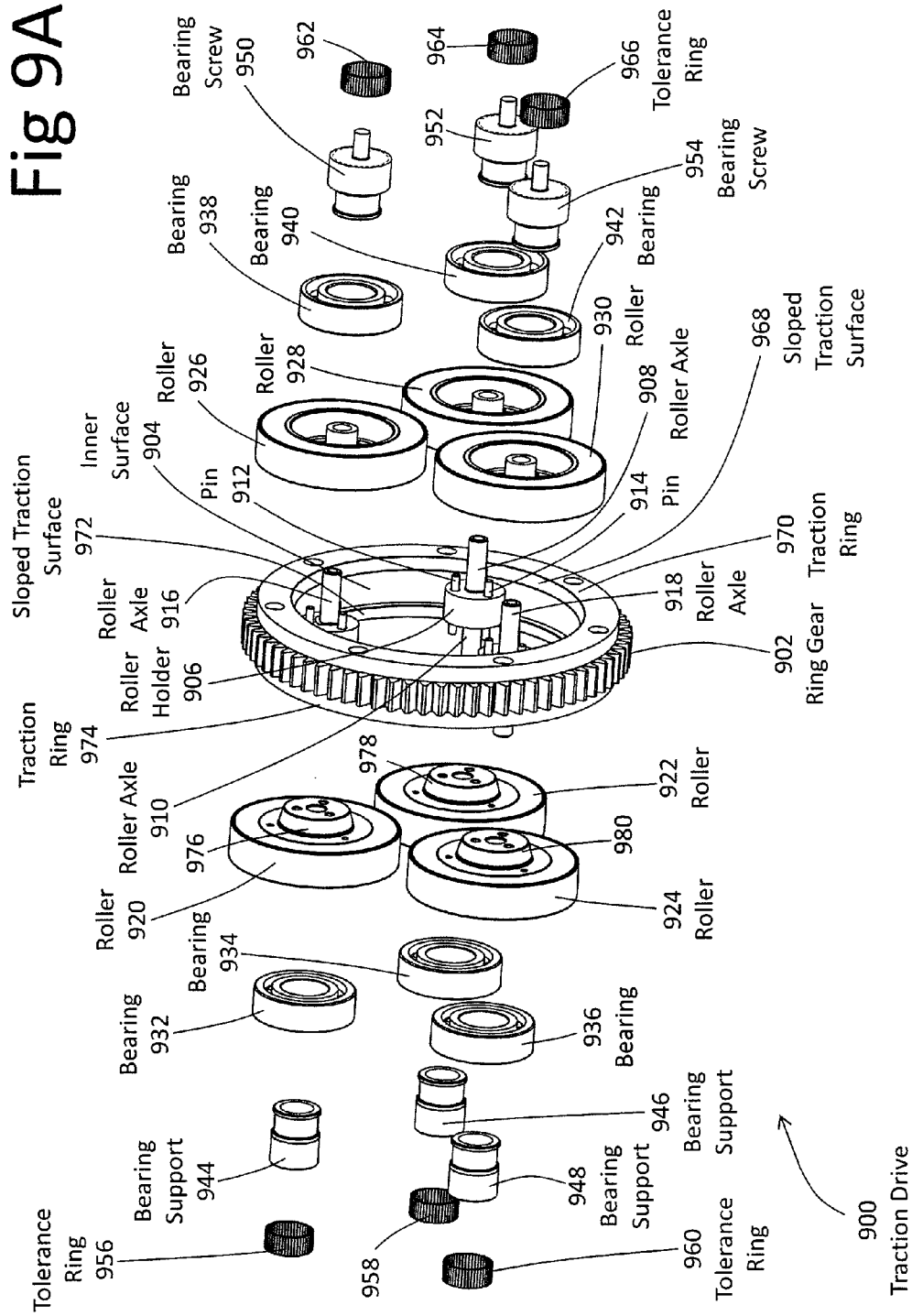

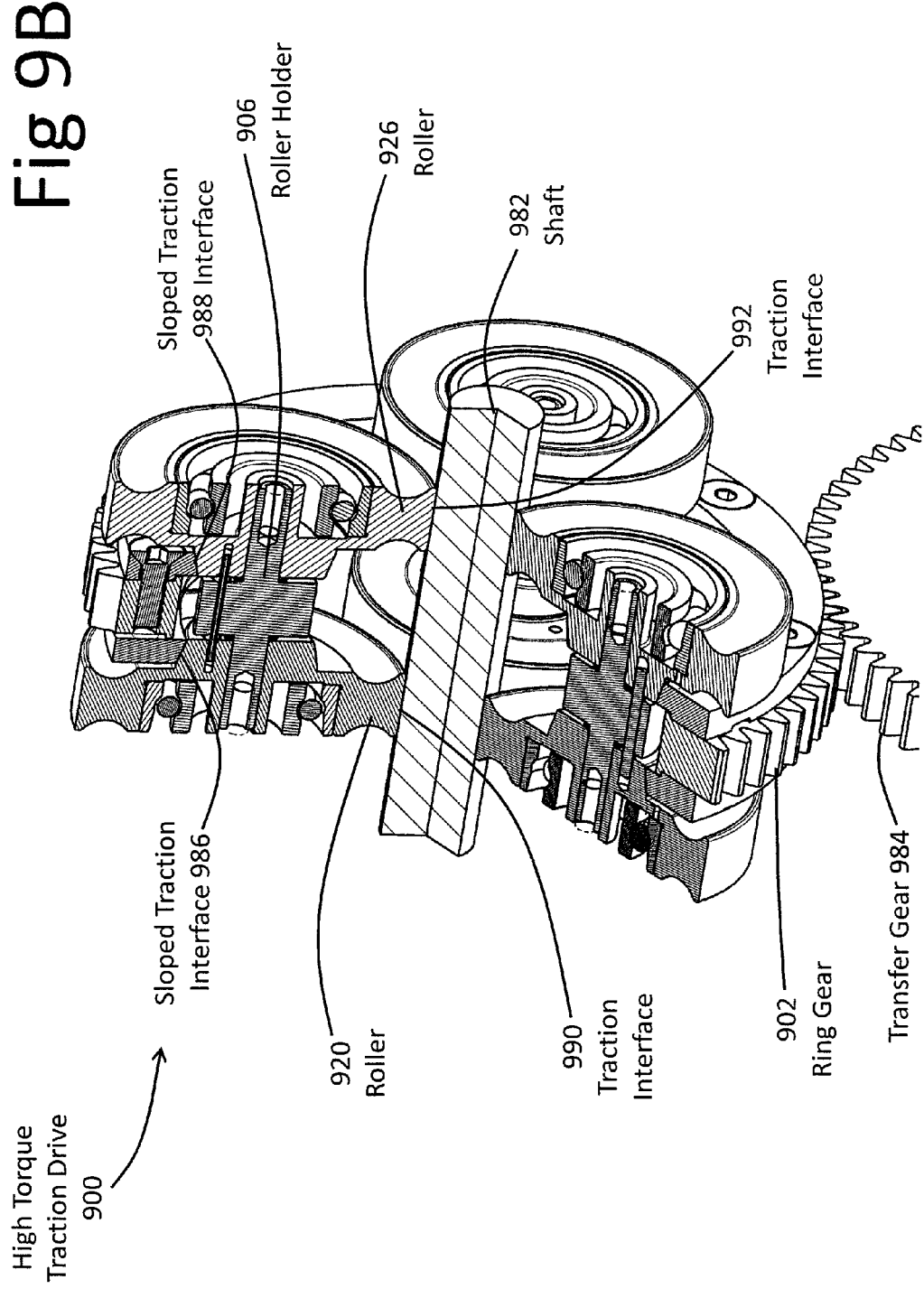

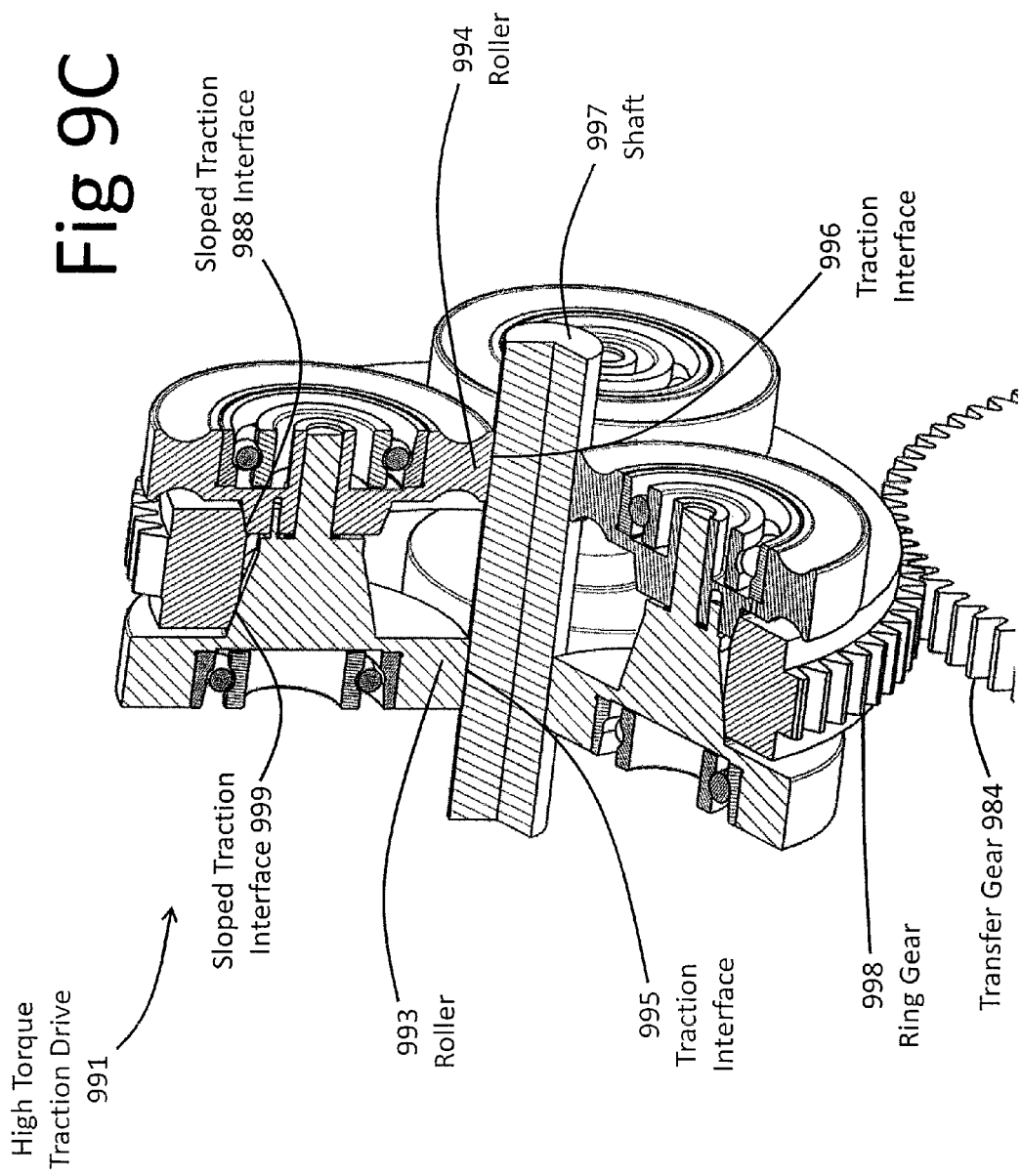

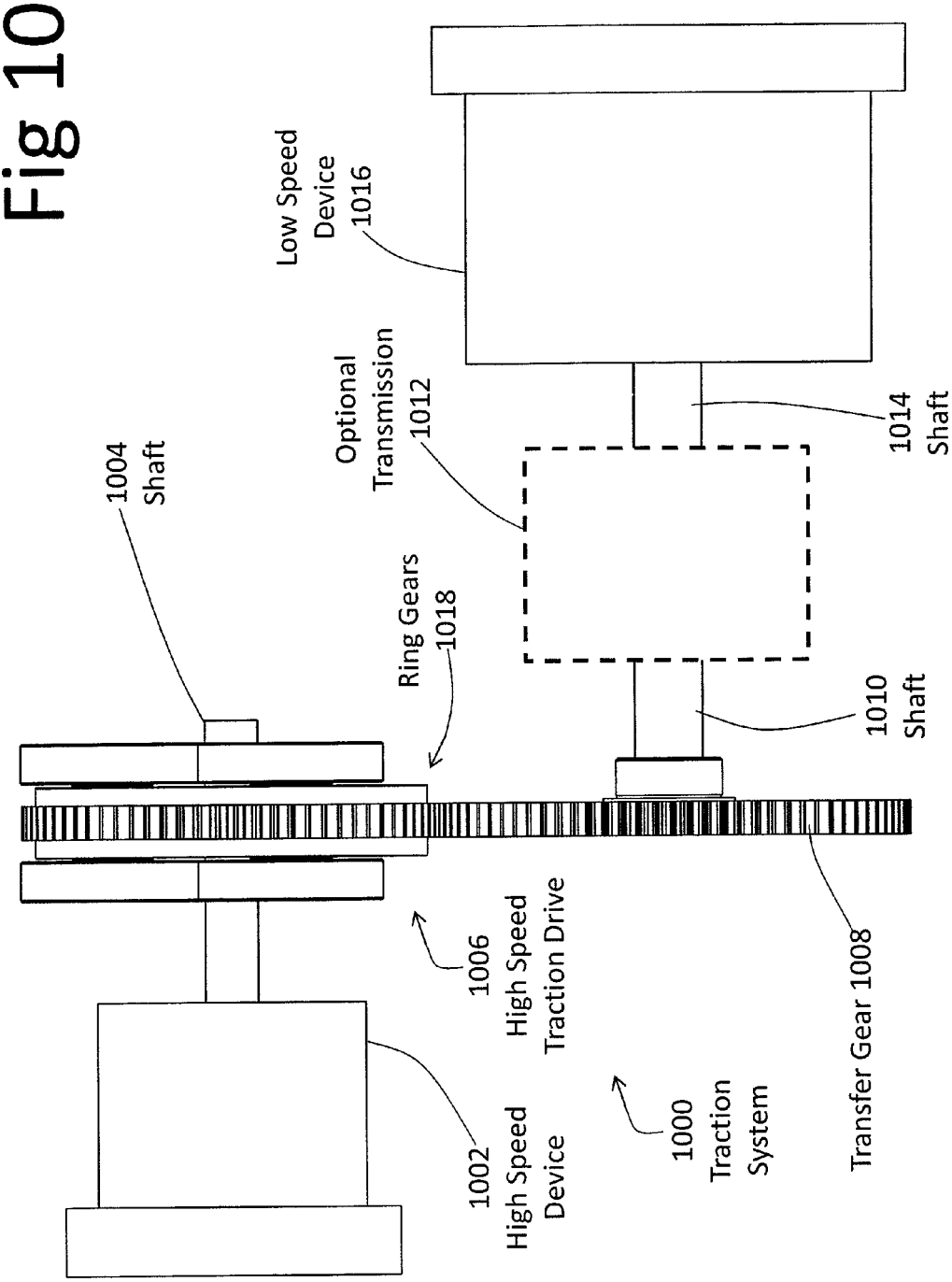

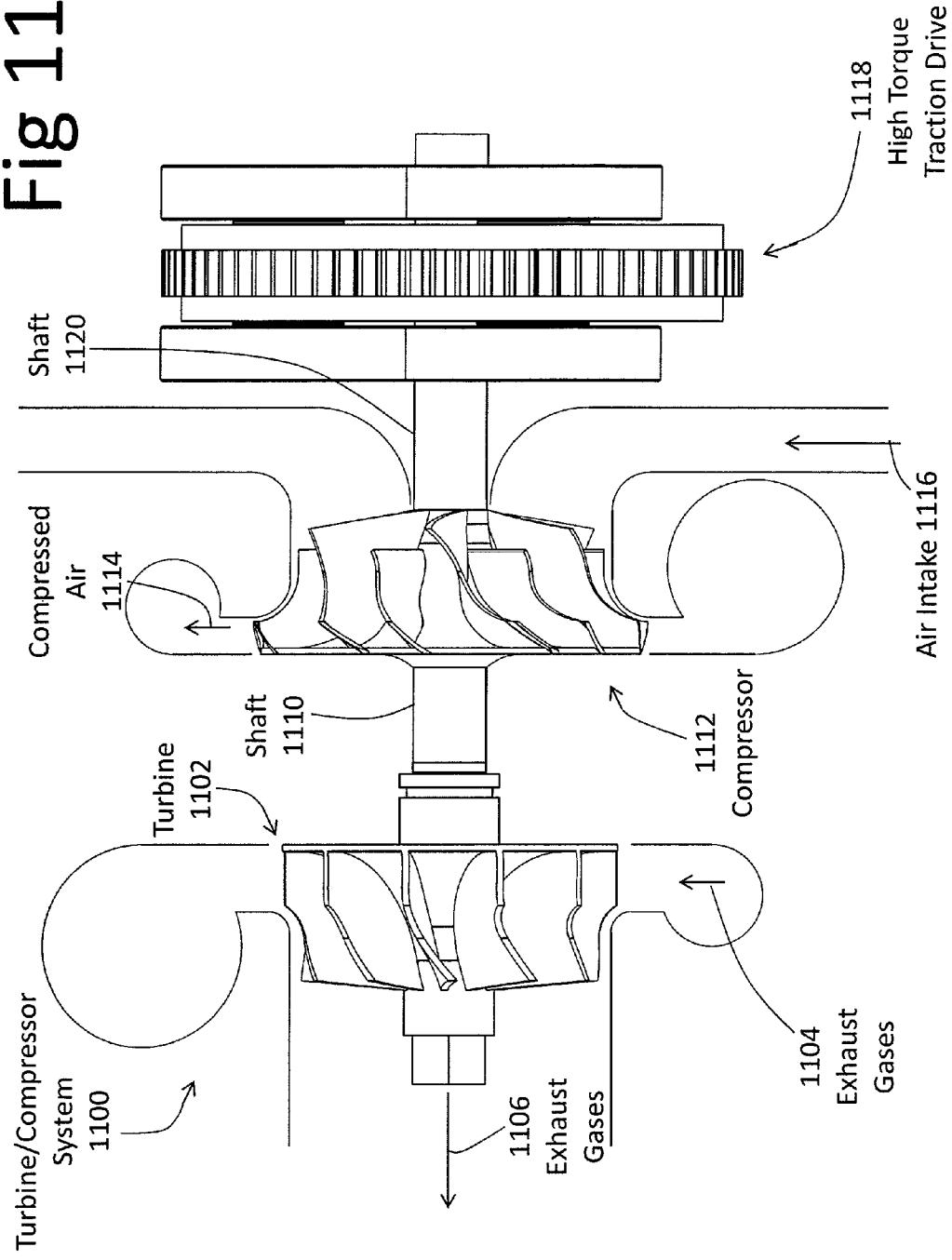

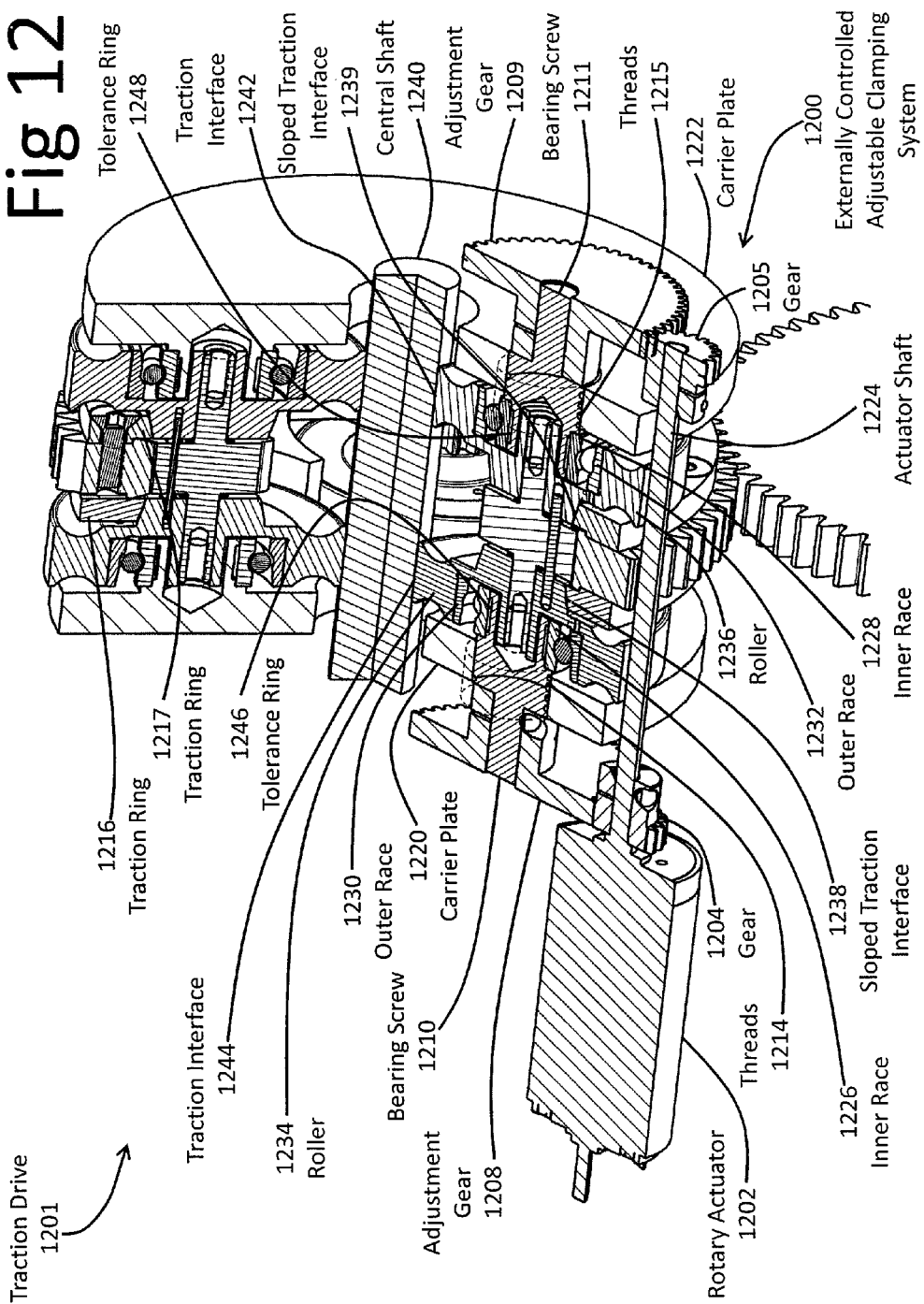

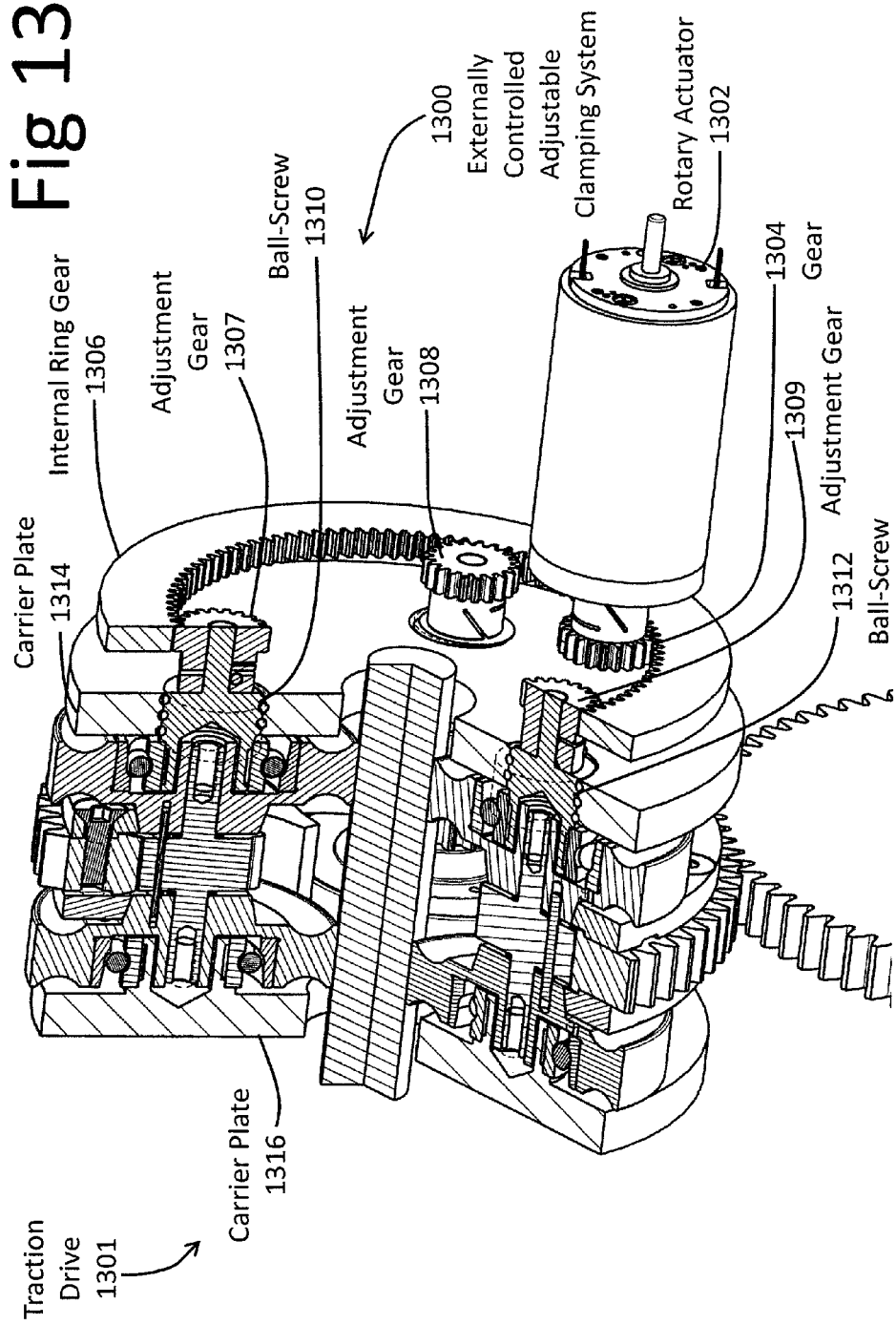

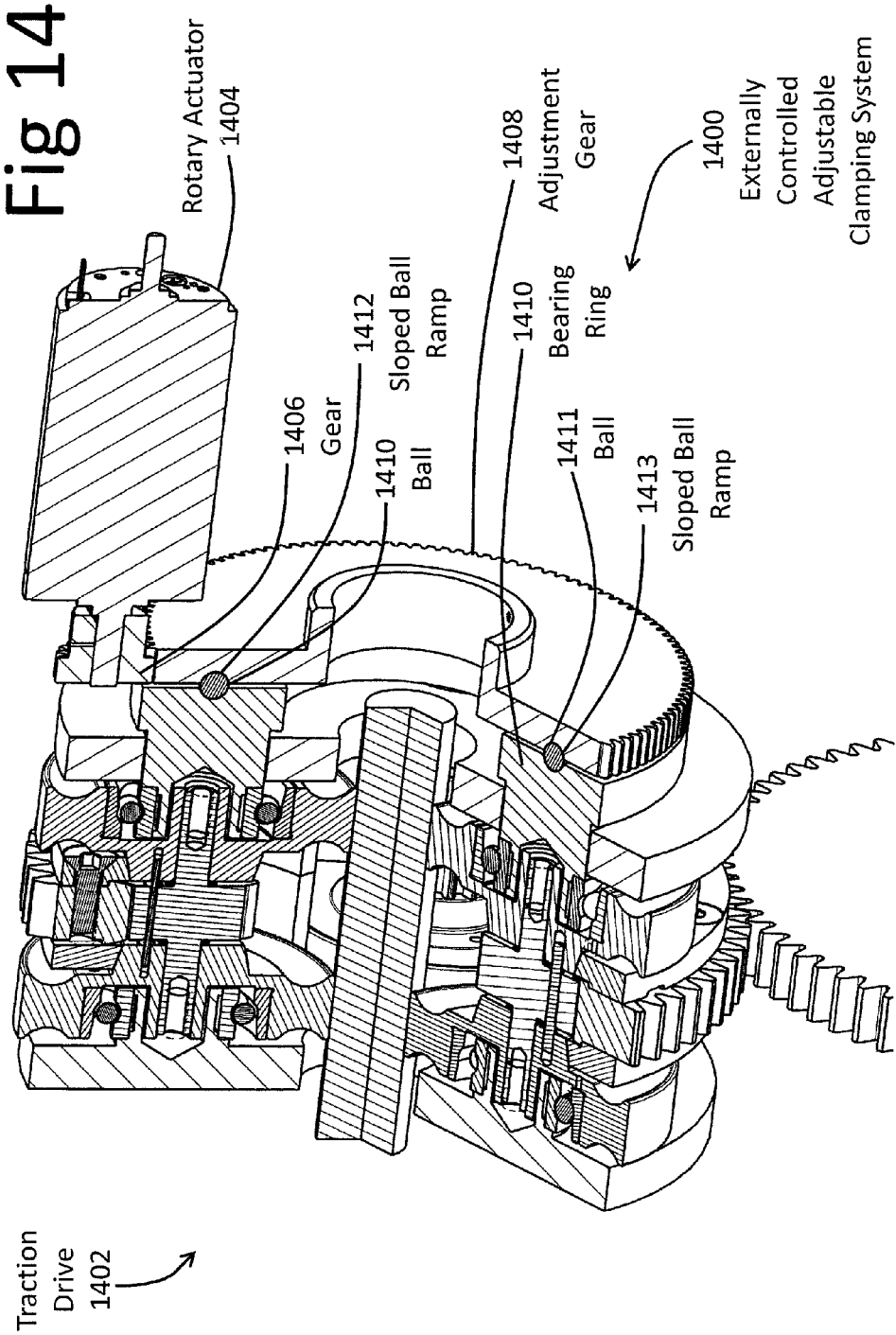

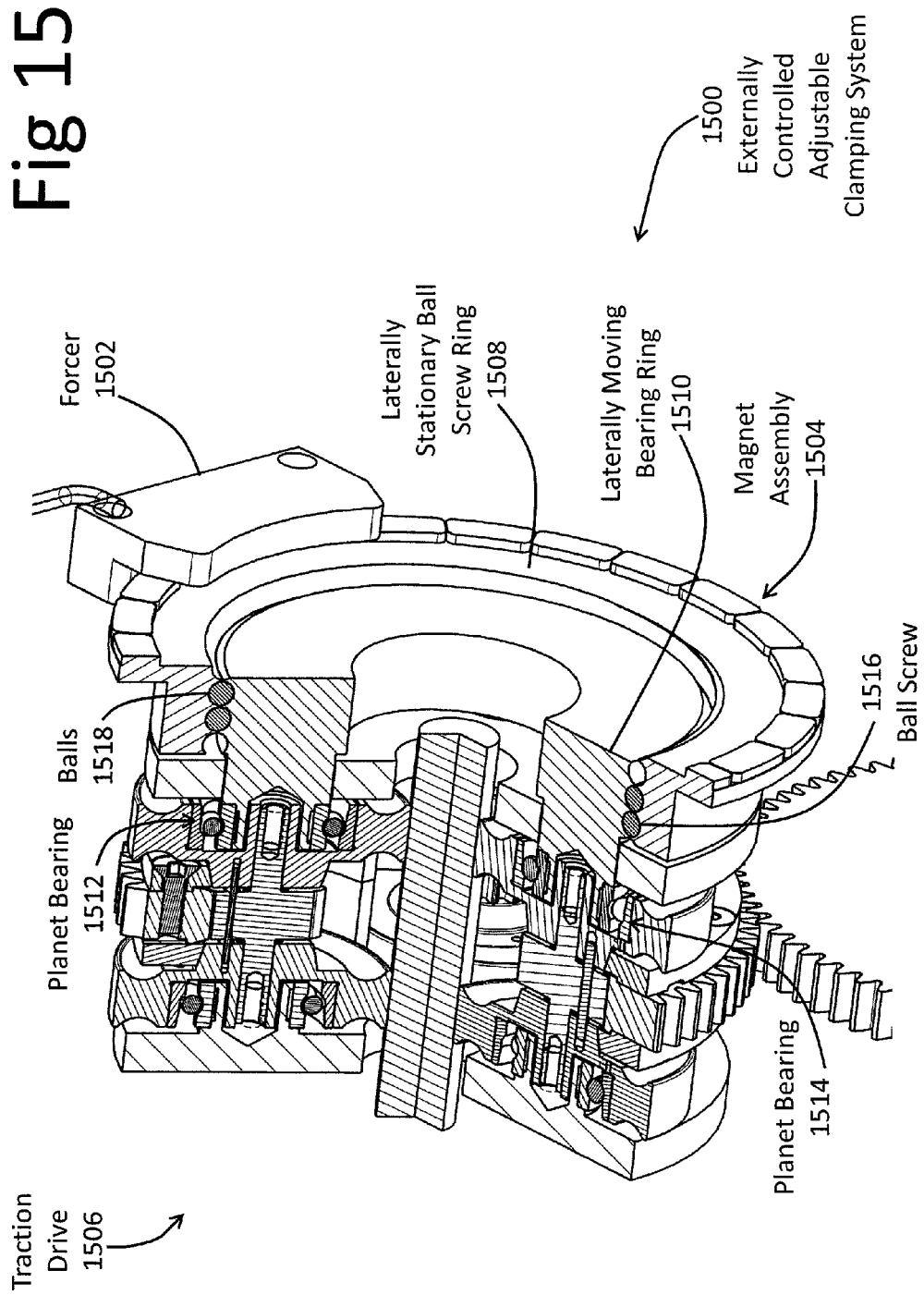

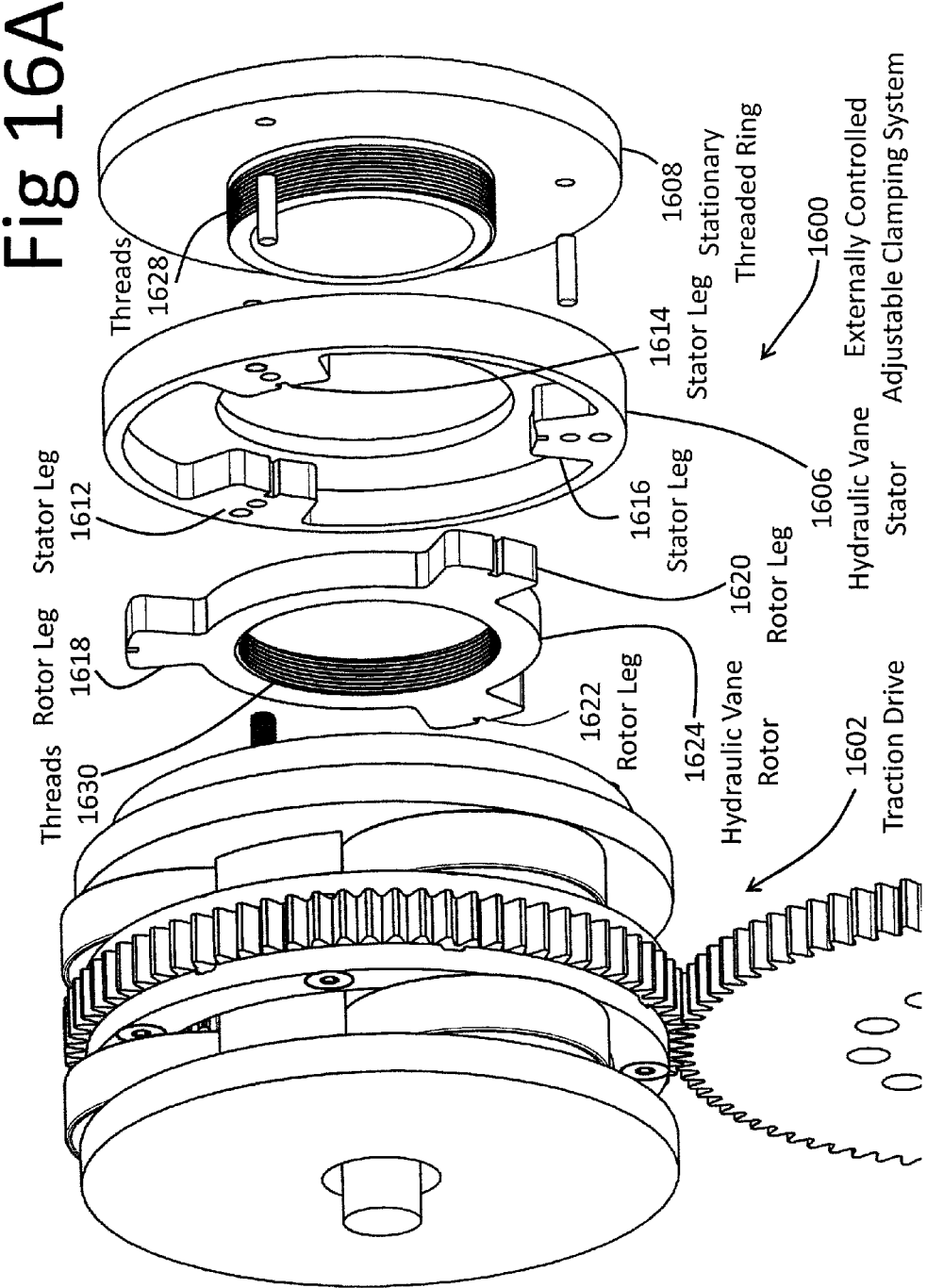

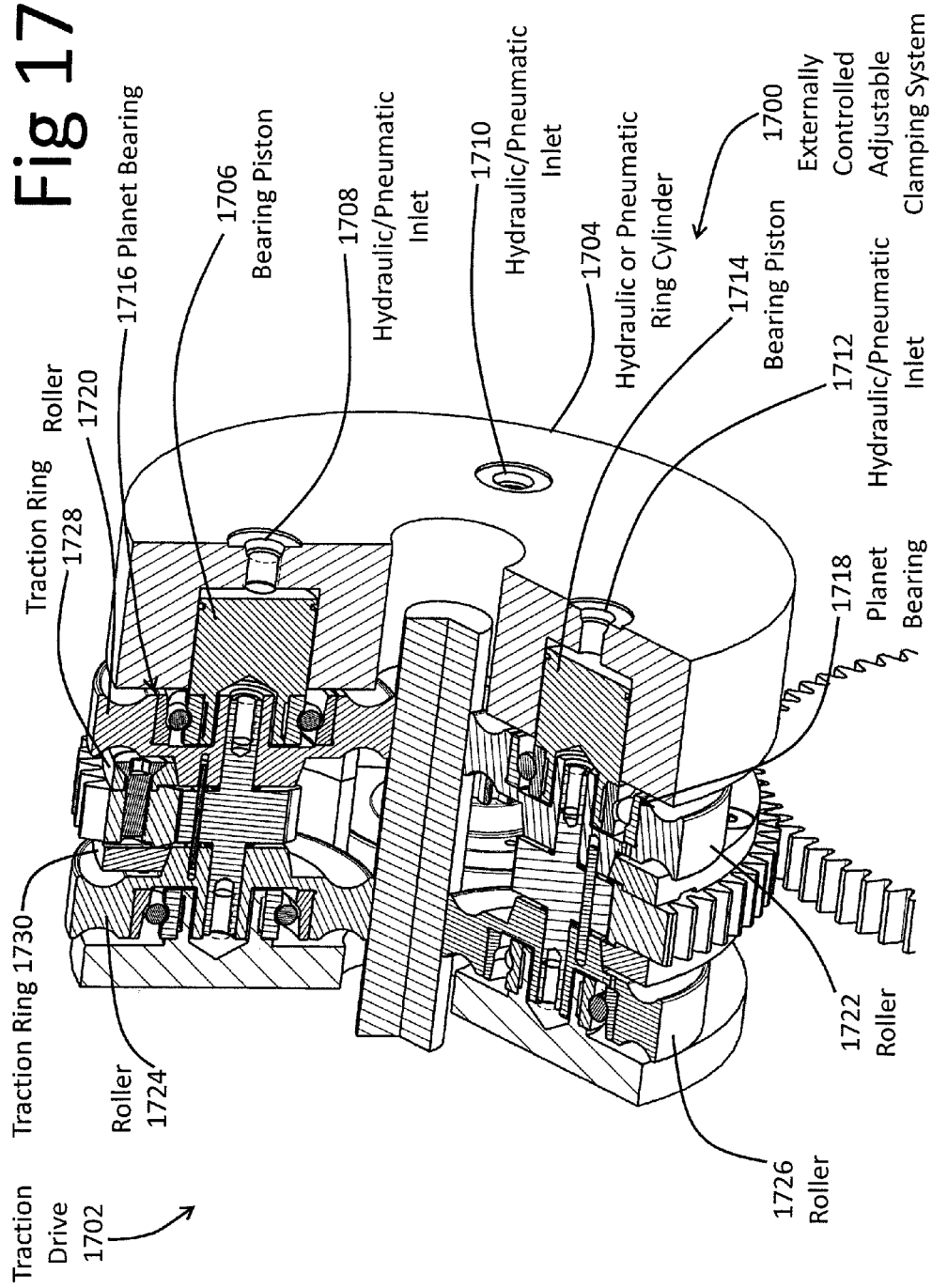

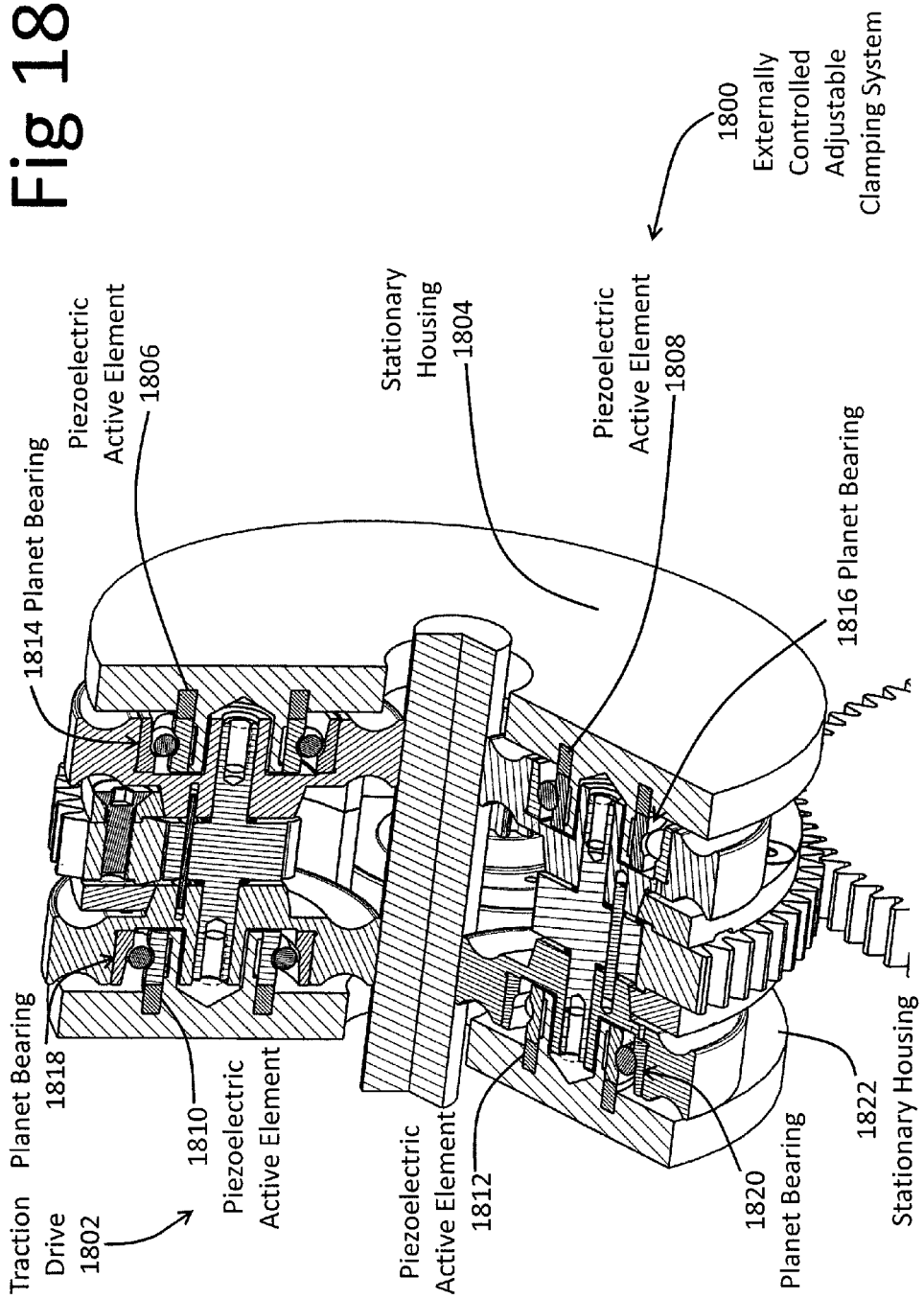

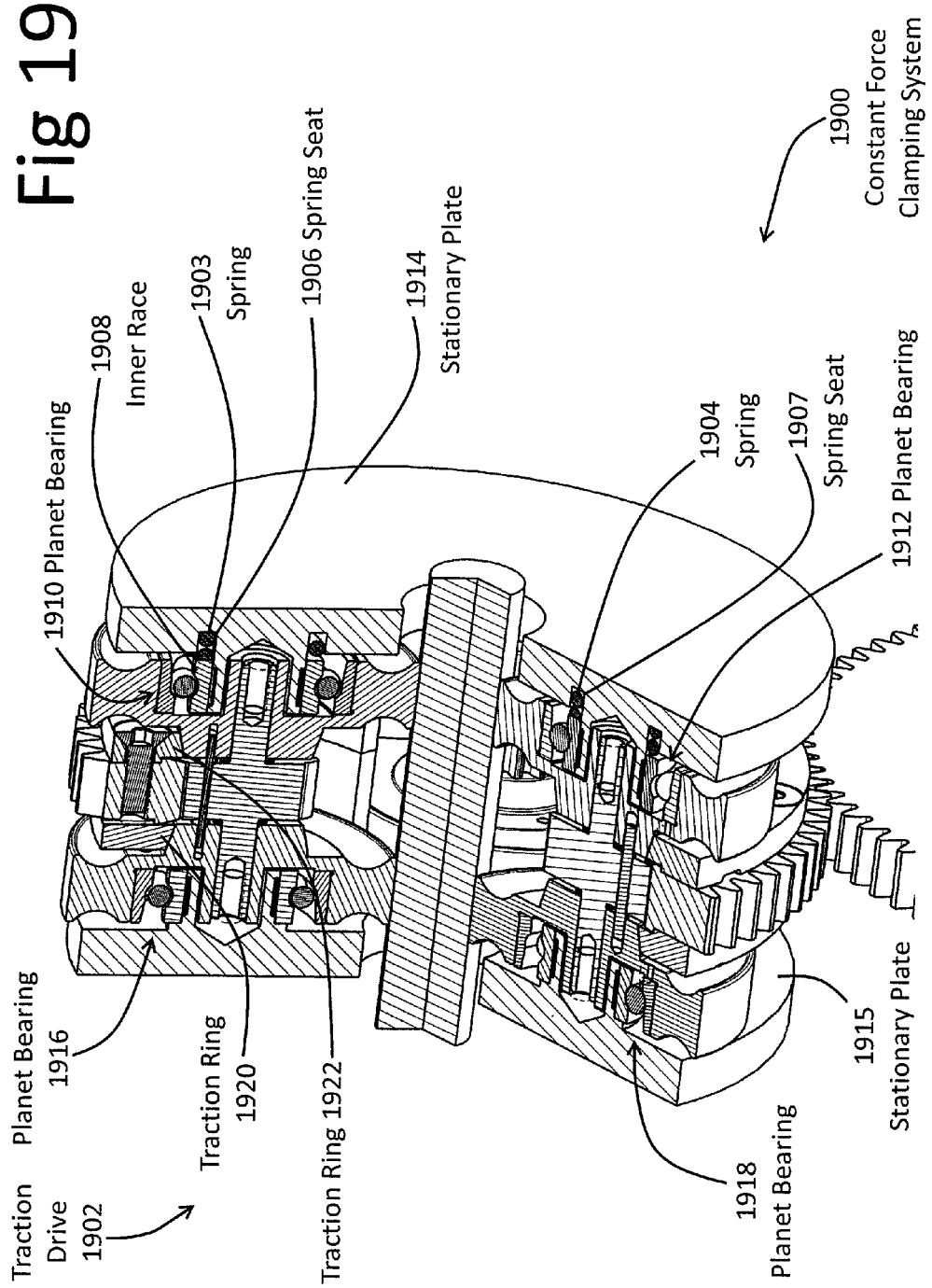

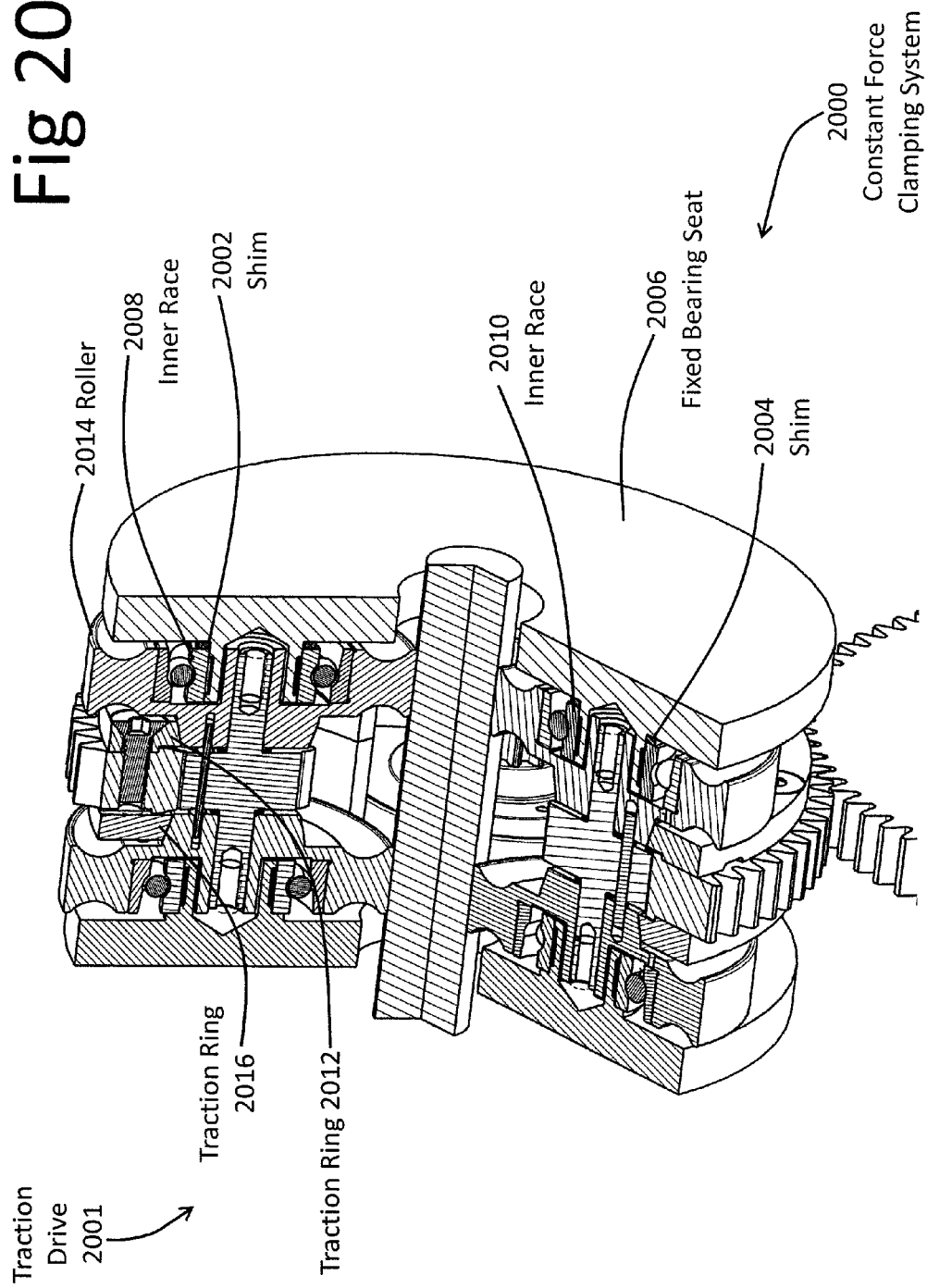

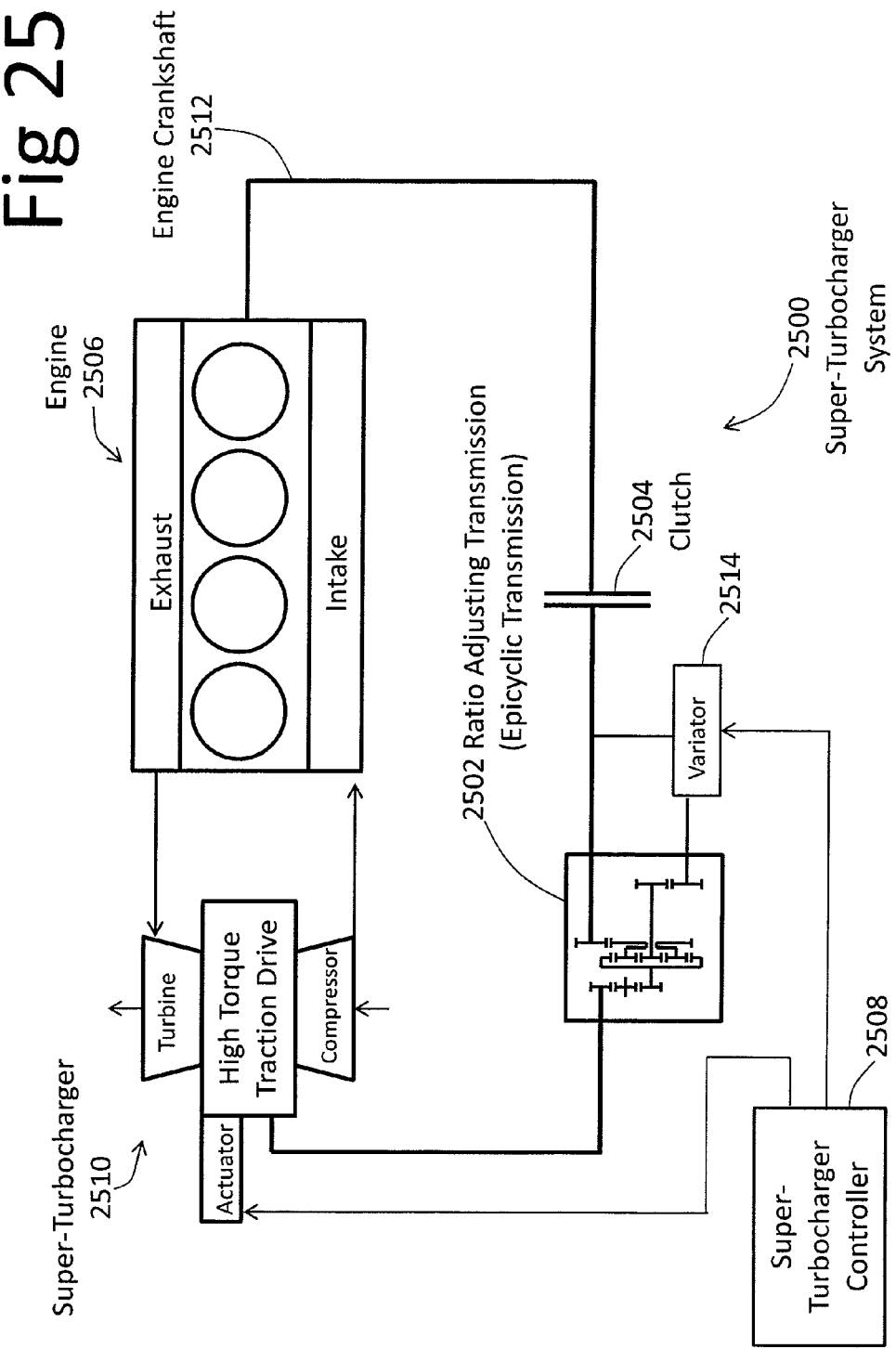

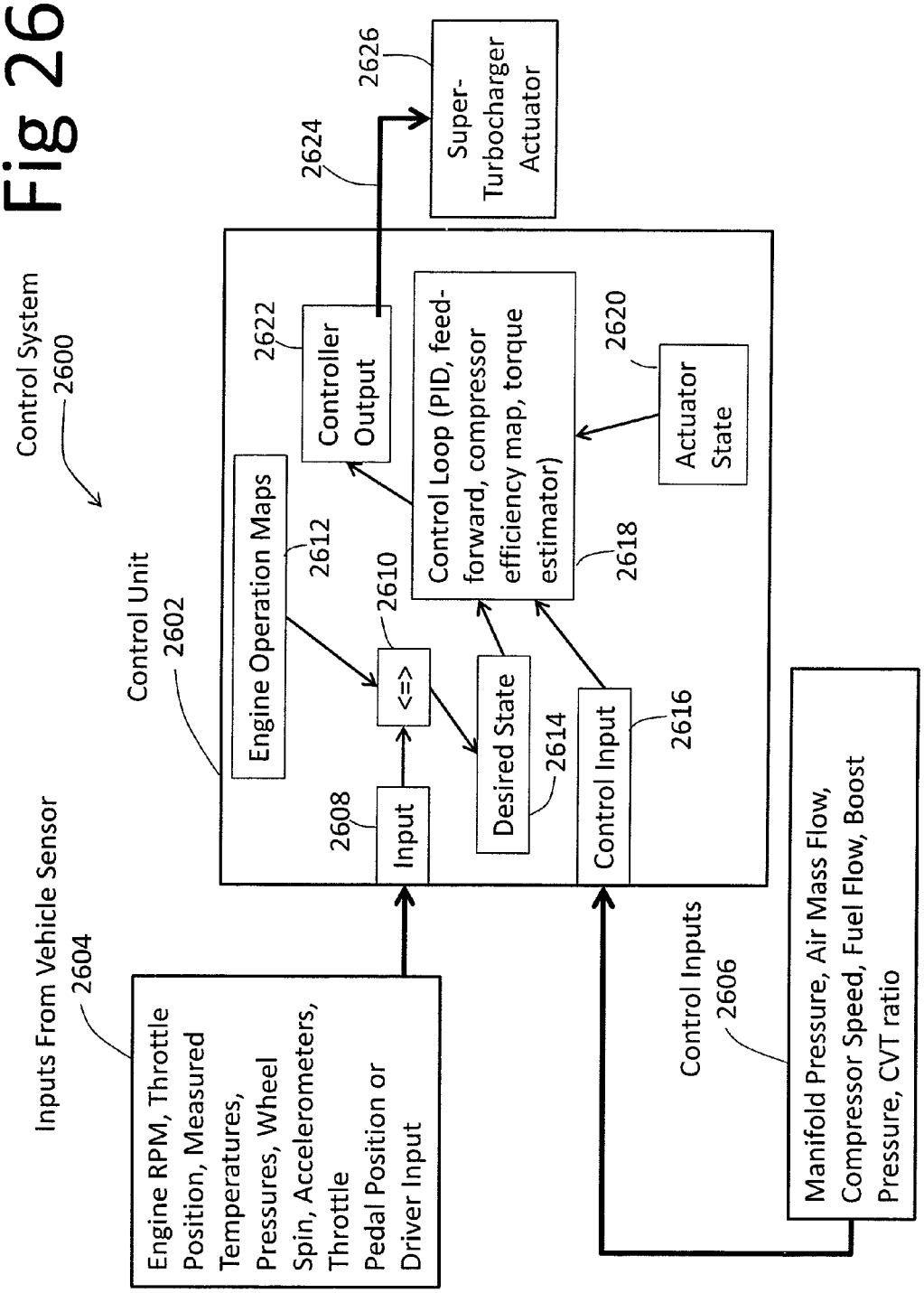

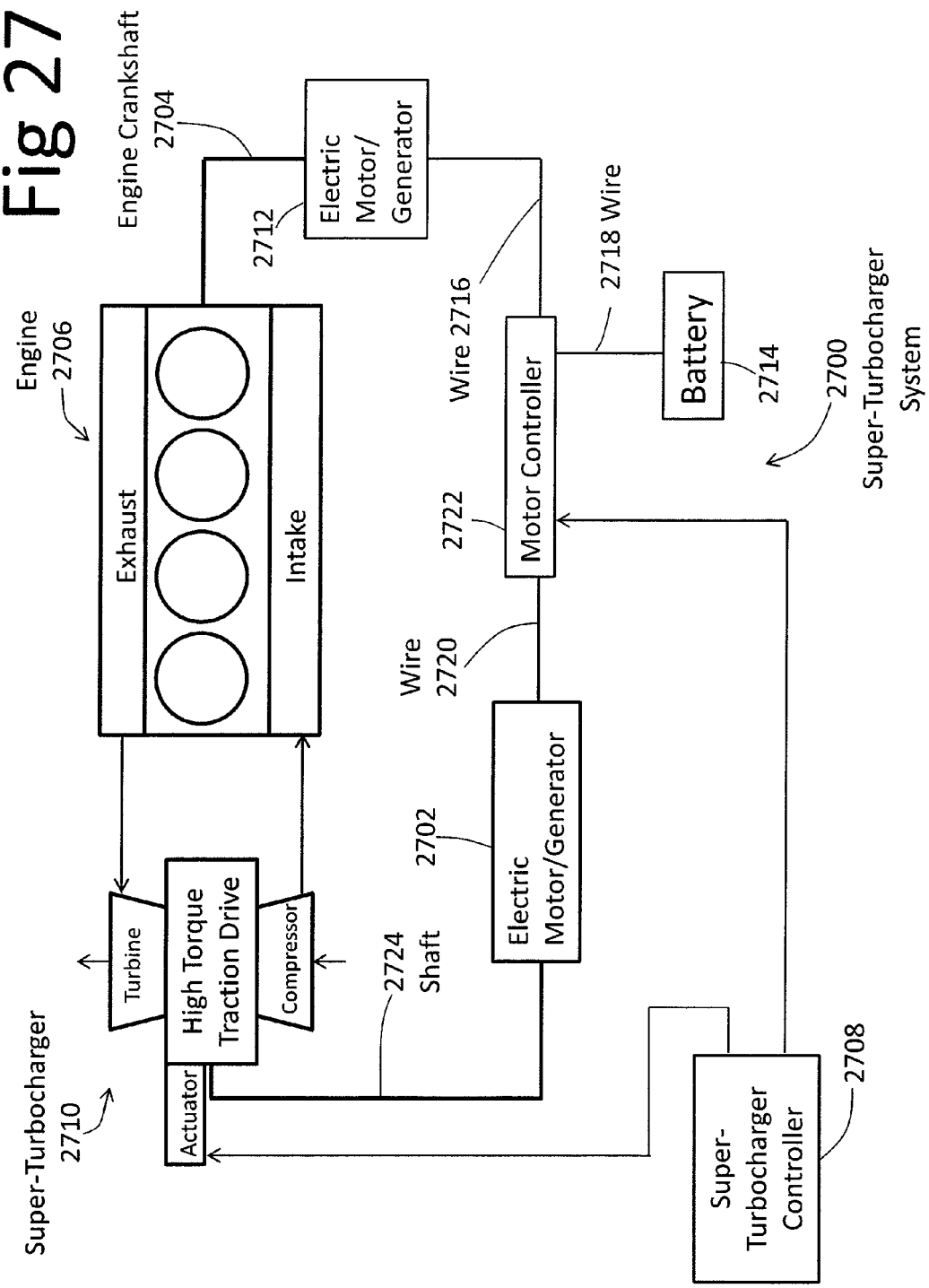

HIGH TORQUE TRACTION DRIVE

CROSS-REFERENCE TO RELATED APPLICATION

The present application is based upon and claims the benefit of Provisional Patent Application No. 61/434,358, entitled "HIGH TORQUE TRACTION DRIVE," and filed Jan. 19, 2011, by Ryan Sherrill and Ed VanDyne. The entire content of the above-mentioned application is hereby specifically incorporated herein by reference for all it discloses and teaches.

BACKGROUND OF THE INVENTION

Traction drive systems have been used for various purposes and in various environments in the prior art. Traction drives comprise an alternative to gearing systems and can be used interchangeably with gearing systems in many situations. Traction drives use a traction fluid that creates more friction at the traction drive interface to cause adherence between traction surfaces.

SUMMARY OF THE INVENTION

An embodiment of the invention may therefore comprise a method of transferring rotational mechanical energy between a shaft and a ring gear comprising: obtaining a shaft having a shaft traction surface; obtaining rollers having inner roller sloped surfaces and outer roller traction surfaces; connecting traction rings to opposite sides of the ring gear, the traction rings having sloped ring surfaces that mate with the inner roller sloped surfaces of the rollers; coupling planet gears to the rollers, the planet gears disposed to engage an inner gear mesh on the ring gear so that rotational mechanical energy is transferred between the rollers and the ring gears through the planet gears; forcing the rollers towards the traction rings to create a force against the inner roller sloped surfaces of the rollers and the sloped ring surfaces of the traction rings that creates a sloped pressure interface, forcing the rollers towards the shaft, which forces the outer roller traction surfaces of the rollers against the shaft traction surface of the shaft, to create pressure on a shaft traction interface that is created between the shaft traction surface of the shaft and the outer roller traction surface of the rollers, that increases friction in the shaft traction interface, which causes the rotational mechanical energy to be transferred between the shaft and the rollers.

An embodiment of the present invention may further comprise a traction drive comprising: a shaft having a shaft traction surface; rollers having inner roller sloped surfaces and outer roller traction surfaces; a ring gear having an inner gear mesh and an outer gear mesh; planet gears coupled to the rollers, the planet gears disposed to engage the inner gear mesh of the ring gear so that rotational mechanical energy is transferred between the rollers and the ring gears through the planet gears; sloped ring surfaces that mate with the inner roller sloped surfaces of the rollers that creates a sloped pressure interface that forces the rollers towards the shaft so that the outer roller traction surfaces are forced against the shaft traction surface to create a shaft traction interface that transfers rotational mechanical energy between the rollers and the shaft which, in turn, causes the rotational mechanical energy to be transferred between the rollers and the ring gear through the planet gears.

An embodiment of the present invention may further comprise a traction drive comprising: a shaft having a shaft traction surface; rollers having inner roller traction surfaces and outer roller traction surfaces; a ring gear having an outer gear mesh; sloped traction surfaces that mate with the inner roller traction surfaces of the rollers that creates a sloped traction interface that transfers rotational mechanical energy between the rollers and the sloped traction surfaces, and forces the rollers towards the shaft so that the outer roller traction surfaces are forced against the shaft traction surface to create a shaft traction interface that transfers rotational mechanical energy between the rollers and the shaft.

An embodiment of the present invention may further comprise a method of transferring rotational mechanical energy comprising: obtaining a shaft having a shaft traction surface; obtaining rollers having inner roller traction surfaces and outer roller traction surfaces; obtaining sloped traction surfaces that mate with the inner roller traction surfaces of the rollers; forcing the rollers towards the sloped traction surfaces to create a force against the inner roller traction surfaces of the rollers and the sloped traction surfaces that creates a sloped traction interface, that causes rotational mechanical energy to be transferred between the rollers and the sloped traction surfaces, and causing the rollers to be forced towards the shaft, which forces the outer roller traction surfaces of the rollers against the shaft traction surface of the shaft, to create pressure on a shaft traction interface that is created between the shaft traction surface of the shaft and the outer roller traction surface of the rollers, that increases friction in the shaft traction interface, which causes the rotational mechanical energy to be transferred between the shaft and the rollers.

An embodiment of the present invention may further comprise a method of transferring rotational mechanical energy between a shaft and a ring gear comprising: obtaining a shaft having a shaft hard smooth surface; obtaining rollers having inner roller hard smooth surfaces and outer roller hard smooth surfaces; coupling rings to opposite sides of the ring gear, the rings having sloped hard smooth ring surfaces that mate with the inner roller hard smooth surfaces of the rollers; attaching planet gears to the rollers, the planet gears disposed to engage an inner gear mesh on the ring gear so that rotational mechanical energy is transferred between the rollers and the ring gears through the planet gears; forcing the rollers towards the rings to create a force against the inner roller hard smooth surfaces of the rollers and the sloped hard smooth ring surfaces of the rings that creates a sloped interface, forcing the rollers towards the shaft, which forces the outer roller hard smooth surfaces of the rollers against the hard smooth surface of the shaft, to create pressure on a shaft interface that is created between the surface of the shaft and the outer roller surface of the rollers, that increases friction in the shaft interface, which causes the rotational mechanical energy to be transferred between the shaft and the rollers which causes the rotational mechanical energy to be transferred between the ring gear and the rollers through the planet gears.

BRIEF DESCRIPTION OF THE DRAWINGS

FIG. 1 is an exploded view of one embodiment of a high torque traction drive.

FIG. 2 is a partial exploded view of the embodiment of FIG. 1.

FIG. 3 is an exploded view of FIG. 2.

FIG. 4 is an exploded view of portions of FIG. 3.

FIG. 5 is an exploded view of portions of FIG. 4.

FIG. 6 is an exploded view from a different angle of the elements illustrated in FIG. 5.

FIG. 7 is a partial cut-away view of portions of the embodiment of FIG. 1.

FIG. 8 is an exploded view of another embodiment of a high torque traction drive.

FIG. 9A is an exploded diagram of another embodiment of a traction drive.

FIG. 9B is another cut-away view of the traction drive.

FIG. 10 is a schematic diagram of a traction system utilizing a high speed traction device.

FIG. 11 is an illustration of a turbine/compressor system in which a high torque traction drive is disposed to the side of the turbine and compressor.

FIG. 12 is a cut-away view of the traction drive with a threaded adjustable clamping system.

FIG. 13 is a cut-away view of the traction drive with a ball-screw based adjustable clamping system.

FIG. 14 is a cut-away view of the traction drive with a linear actuator coupled to a ball ramp to provide adjustable clamping levels.

FIG. 15 is a cut-away view of the traction drive with a magnetic forcer as an actuator to provide adjustable clamping levels.

FIG. 16A is an exploded cut-away view of the traction drive with a hydraulic vane actuator to provide adjustable clamping levels.

FIG. 17 is a cut-away view of the traction drive with hydraulic or pneumatic cylinders to provide adjustable clamping levels.

FIG. 18 is a cut-away view of the traction drive with a piezo-electric element to provide adjustable clamping levels.

FIG. 19 is a cut-away view of the traction drive with a spring to provide passive clamping.

FIG. 20 is a cut-away view of the traction drive with a shim to provide a fixed level of clamping.

FIG. 25 is another embodiment of a superturbocharged system.

FIG. 26 is a schematic diagram of an embodiment of a control system.

FIG. 27 is a schematic block diagram of an embodiment of a super-turbocharger system.

DETAILED DESCRIPTION OF THE EMBODIMENTS

Figure 16B:
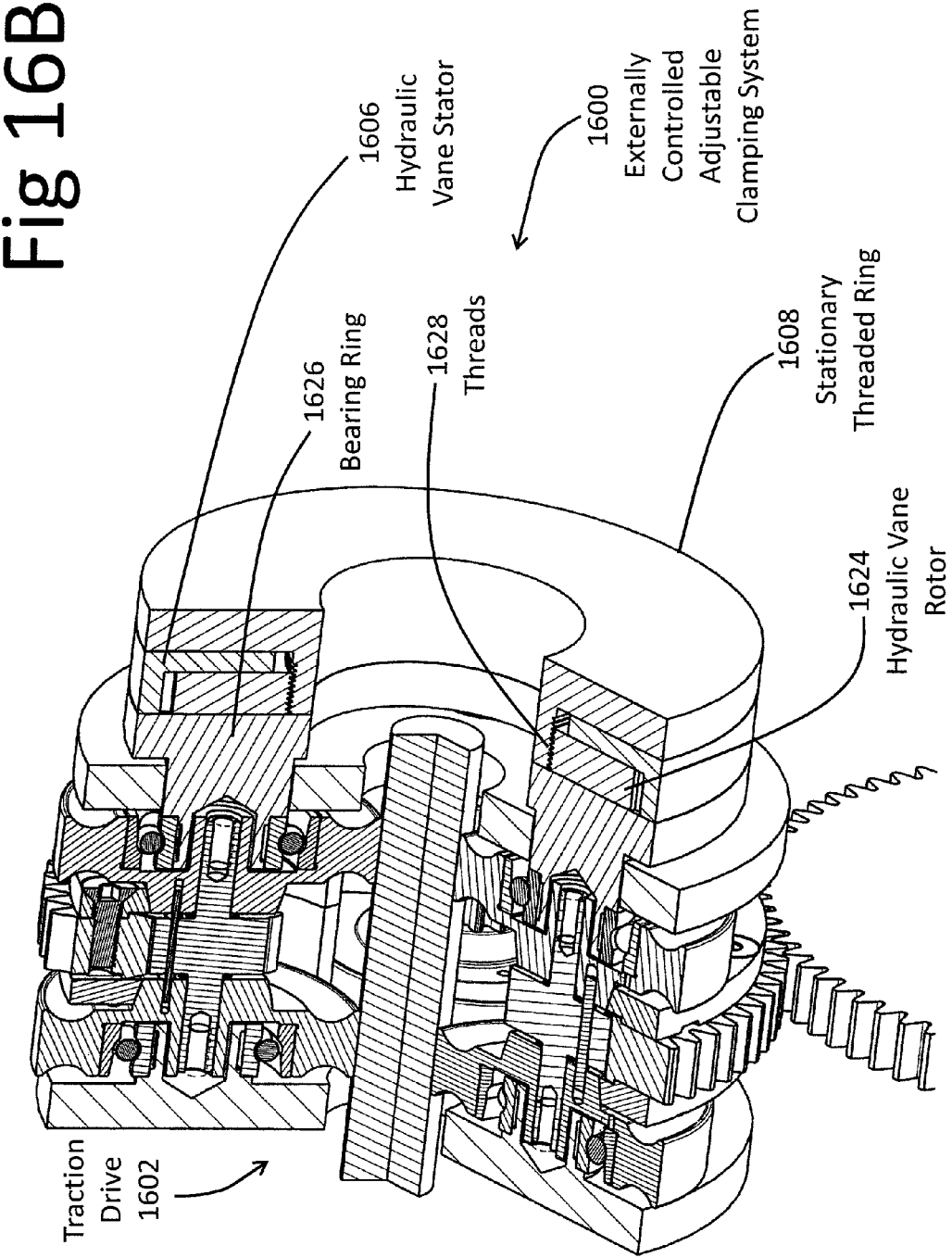
FIG. 16B is a cut-away view of FIG. 16A.

FIG. 1 is an exploded view of a high torque traction drive 100. As illustrated in FIG. 1, a carrier housing 102 is adapted to be attached to a carrier plate 104, which encloses the mechanisms of the high torque traction drive. As also shown in FIG. 1, there are two sets of rollers 106, 108. Rollers 106 comprise rollers 152, 154, 156. Rollers 108 comprise rollers 158, 160, 162. Rollers 106, 108 are disposed on opposite sides of traction rings 126, 128, ring gear 130, and planet gears 132. Planet gears 132 comprise planet gears 184, 186, 188. Planet gears 132 are attached to the axes of rollers 106, 108 and engage the inner gear mesh 182 of ring gear 130. Bearings 110, that comprise bearings 164, 166, 168, engage rollers 152, 154, 156, respectively. Bearings 112 comprise bearings 170, 172, 174, which mate with rollers 158, 160, 162, respectively. Bearing supports 114 comprise bearing supports 144, 146 that are piloted in carrier housing 102. Bearing supports 144, 146 engage and provide a stable mounting platform for bearings 166, 168. Hollow support screw 122 is mounted in bearing 164, as well as the left side arm 190 of support arm 118. Bearing screws 116, which comprise bearing screws 148, 150, mount the bearings 174, 172, respectively to the carrier plate 104. Hollow support screw 124 mounts and holds bearing 170 that engages roller 158. Fastener 178 protrudes through the hollow portion of hollow support screw 124, bearing 170, roller 158 and engages planet gear 184. Hollow support screw 124 is mounted in the right side arm 192 of the support arm 118. Turbine fan 138 is connected to the shaft 136. Compressor fan 140 is also connected to shaft 136 by nut 142. Shaft 136 has traction surface 134, arm 118 has pin 120, ring gear 130 has outer mesh 180.

FIG. 2 is an exploded view of the high torque traction drive 100. As shown in FIG. 2, turbine fan 138 is located on the left side of the high torque traction drive 100. Compressor fan 140 is located on the right side of the high torque traction drive. Both the turbine and compressor can be mounted on one side of the high torque traction drive as illustrated in FIG. 11. Referring again to FIG. 2, rollers 106 and bearings 110 are disposed adjacent to the carrier housing 102, while rollers 108 and bearings 112 are disposed adjacent to carrier plate 104. Traction ring 126 and traction ring 128 are mounted securely to ring gear 130. Alternatively, traction rings 126, 128 and ring gear 130 can be formed from a single piece of metal. The left arm 190 of support aim 118 is disposed on the left side of the ring gear 130 and traction ring 126, while right arm 192 of support arm 118 is mounted on the right side of the ring gear 130 and traction ring 128. Roller 152 is mounted to the left arm 190 of the support arm 118, while roller 158, as well as bearing 170 and hollow support screw 124, are mounted in the right arm 192 of support arm 118. Ring gear 130 has an outer gear mesh 180 that engages the gear mesh 206 of transfer gear 145. In one embodiment, transfer gear 145 is coupled to the drive train in a vehicle, so that the high torque traction drive can be utilized as a superturbocharger. Carrier housing 102 mates with the carrier plate 104 to house the high torque traction drive 100. Bearing 168 is mounted on bearing support 144, which is mounted in carrier housing 102. Roller 162 is mounted with bearing 174 using bearing screw 148, which is threaded into carrier plate 104 with threads 208.

FIG. 3 is another exploded view of the high torque traction drive 100. The high torque traction drive 100, as illustrated in FIG. 3, is coupled to a turbine fan 138 and a compressor fan 140, so that the high torque traction drive 100 can be utilized in a turbocharger or superturbocharger. However, high torque traction drive 100 has applicability for use in various technologies in which high speed rotational devices are utilized. There may be many uses of the high torque traction drive, such as high speed pumps, etc., as disclosed in more detail below. As illustrated in FIG. 3, carrier housing 102 is coupled to the carrier plate 104 to form a housing for the components of the high torque traction drive 100. The bearing screws 148, 150 are threaded through the carrier plate 104. Once the carrier plate 104 is mounted to the carrier housing 102, the bearing screws 148, 150 are tightened, which creates a force on bearings 174, 172, respectively, which is transferred through the assembly to bearing supports 144, 146, which create a reactive force on bearings 168, 166, respectively. Bearings 170, 172, 174 and bearings 164, 166, 168 are angular contact bearings that are capable of transferring lateral force without a high degree of parasitic loss. Bearing supports 144, 146 are mounted in the carrier housing 102 and create a reactive force on bearings 168, 166, respectively, which is transferred to rollers 156, 154 (FIG. 1). Hollow support screw 122 is mounted in the support arm 118. Bearing 164 is mounted in the roller 152, both of which are supported by the support arm 118. Similarly, hollow support screw 124 engages bearing 170, which is mounted in the roller 158. The roller 158 and bearing 170 are mounted in the support arm 118. The support arm 118 pivots on pin 120, which allows sufficient space for the shaft 136 to be inserted between the rollers. Traction fluid sprayers 302, 304 are located in posts 306, 308, respectively. The traction fluid sprayers 302, 304 spray fluid onto the closing side and opening side of the traction interfaces located between the outer traction surfaces of the rollers and the shaft traction surface 134, as well as the interfaces between the inner traction surfaces of the rollers and the sloped traction surfaces of the traction rings. The fluid sprayed on the closing portions of the traction interfaces provide traction fluid to the traction interfaces, while the fluid sprayed on the opening portions of the traction interfaces function to cool the traction interfaces.

As disclosed below, with respect to FIGS. 5 and 6, rollers 152, 158 cause the support arm 118 to pivot so that rollers 152, 158 move toward shaft 136. As pressure is applied by fasteners 176, 178, rollers 152, 158 are forced toward each other, which causes inner traction surfaces on rollers 152, 158 to engage sloped ring traction surfaces 514, 516 (FIG. 5), which drives rollers 152, 158 toward shaft 136, as explained in more detail below. Since the traction surfaces between the rollers and the shaft traction surface 134 forms a triangle, the forces applied to the interface on the shaft traction surface 134 are substantially balanced, as also explained in more detail below.

FIG. 4 is an additional exploded view 400 illustrating portions of the high torque traction drive shown in FIG. 3. As shown in FIG. 4, a plurality of planet gears 184, 186, 188 are disposed around the interior of the ring gear 130. Traction rings 126, 128 are secured to each side of the ring gear 130. Rollers 152, 154, 156, as well as rollers 158, 160, 162, engage the axles of the planet gears 184, 186, 188 and are pinned to the planet gears 184, 186, 188, as disclosed in more detail below. In that manner, the rollers 152, 154, 156 and rollers 158, 160, 162, as well as planet gears 184, 186, 188, all rotate together at substantially the same rotational speed. As disclosed above, bearings 164, 166, 168 engage the rollers 152, 154, 156 and are mounted on hollow support screw 122 and bearing supports 146, 144, respectively. Fastener 176 engages planet gear 184, so as to mount the roller 154, bearing 164 and hollow support screw 122 (FIG. 1). Tolerance rings 402, 404 are mounted on the recessed portions of bearing supports 144, 146, respectively. Tolerance rings 402, 404 are aligned with the inner race of bearings 168, 166 and the recessed portions of the bearing supports 144, 146, respectively. The tolerance rings 402, 404 prevent overloading of bearings 168, 166, respectively, while tolerance rings 408, 410 prevent overloading of bearings 172, 174, respectively. Tolerance rings 402, 404 are mounted inside of bearings 168, 166, which allows greater tolerance in the manufacturing of the bearing supports 144, 146 and bearings 168, 166. Similarly, tolerance rings 408, 410 are mounted in bearings 172, 174 and allow greater tolerance in the manufacturing of bearing screws 150, 148 and bearings 172, 174, respectively. The tolerance rings 402, 404, 408, 410 absorb vibrational impacts in any sort of out-of-balance or vibrational effects created by rollers 156, 152, 160, 162. Similarly, tolerance rings 408, 410 are mounted on the recessed portions of bearing screws 150, 148, which engage the inner races of bearings 172, 174, respectively. Tolerance rings 408, 410 allow the bearings 172, 174 and rollers 160, 162 to move inwardly, so that the outer traction surfaces of rollers 160, 162 engage the shaft traction surface 134 of shaft 136 (FIG. 1), as explained in more detail below. Tolerance rings 402, 404, 408, 410 are radial springs that are capable of elastic movement in a radial direction. Hollow support screw 124 supports the bearing 170 in the support arm 118 (FIG. 1) when fastener 178 is secured to the axle of planet gear 184. Bearing 170 supports roller 158. Planet gears 184, 186, 188 have a gear mesh that engages the inner gear mesh 182 of ring gear 130.

FIG. 5 is an exploded diagram 500 of portions of the high torque traction drive 100 illustrated in FIG. 1. As shown in FIG. 5, traction rings 126, 128 are shown separated from the ring gear 130. Planet gear 184 has pins 518, 520 that are used to pin planet gear 184 to the roller 158 causing the roller 158 to rotate at the same rotational speed as planet gear 184. In that manner, when the roller 158 is driven by shaft 136 (FIG. 1), planet gear 184 rotates at the same rotational speed and drives the ring gear 130, as a result of the meshing of the gear mesh of planet gear 184 and the inner gear mesh 182 of ring gear 130. Similarly, planet gear 186 has pins 522, 524 that are pinned to roller 160 causing roller 160 to rotate at the same rotational speed as planet gear 186. In the same manner, planet gear 188 has pins 526, 528 that are pinned to roller 162, causing roller 162 to rotate at the same rotational speed as planet gear 188. As also shown in FIG. 5, traction ring 128 has a sloped ring traction surface 516. Sloped ring traction surface 516 engages inner traction surfaces on rollers 158, 160, 162, as explained in more detail with respect to FIG. 6.

As also illustrated in FIG. 5, bearings 110 are disposed in the rollers 152, 154, 156 and move together with the rollers 152, 154, 156. Rollers 152, 154, 156 are also pinned to planet gears 184, 186, 188, as disclosed below with respect to FIG. 6. Rollers 152, 154, 156 have inner traction surfaces 508, 510, 512, respectively. The inner traction surfaces 508, 510, 512 engage the sloped ring traction surface 514 of traction ring 126. The slopes on the inner traction surfaces 508, 510, 512 match the sloped ring traction surface 514 of traction ring 126. It has been determined empirically that a slope of approximately 1 to 20 degrees from horizontal, as shown in FIG. 5, creates an effective traction interface, as well as providing effective pressure to move rollers 152, 154, 156 inwardly to engage the shaft traction surface 134 (FIG. 1). In the embodiments illustrated in FIGS. 1-8, and other embodiments disclosed herein, in which planet gears are used, which mesh with an inner gear in a ring gear, the inner traction surfaces of the rollers, which engage the sloped ring traction surfaces of the traction rings, do not require the transfer of torque across the interface. Rather, these interfaces create pressure and leverage to move the rollers in order to create pressure between the outer traction surfaces of the rollers and the shaft traction surface. Accordingly, the use of the terms "traction interface," "sloped ring traction surface," "traction ring," and "inner traction surfaces" merely use the term "traction" to identify items disclosed herein, and these items do not necessarily require or use traction for proper operation. Rather, various surfaces are used to move the rollers to create traction between the outer traction surfaces of the roller and the shaft traction surface. As such, the use of the term "traction" with respect to various items identified in the disclosure and claims herein, should not be considered to limit these items to a transfer of torque in the embodiments that utilize planet gears.

As illustrated in FIG. 5, the inner traction surfaces 508, 510, 512 engage the sloped ring traction surface 514 and cause the rollers 152, 154, 156 to move inwardly, as the rollers 152, 154, 156 engage the sloped ring traction surface 514 and are forced inwardly by reactive forces on bearings 110. This causes the outer traction surfaces 502, 504, 506 of rollers 152, 154, 156, respectively, to engage the shaft traction surface 134 (FIG. 1) and create shaft traction interfaces. As disclosed above, with respect to FIG. 4, the forces on rollers 152, 154, 156 and rollers 158, 160, 162, through bearings 112, toward each other are created by bearing screws 148, 150 and bearing supports 144, 146 (FIG. 1). The rotational speed of shaft 136 (FIG. 1) can be measured with respect to the rotational speed of ring gear 130 to determine if there is any slippage between the shaft traction surface 134 (FIG. 1) and outer traction surfaces 502, 504, 506 of rollers 152, 154, 156 and outer traction surfaces 602, 604, 606 of rollers 158, 160, 162 (FIG. 6). Since the ratio is known, it can be determined if sufficient pressure or force is being created on the shaft traction interface by the rollers 152-162. If there is slippage, the bearing screws 148, 150 (FIG. 1) can be tightened to create a greater force on rollers 152-162 toward each other, which, in turn, creates a greater inward force of rollers 152-162 toward the shaft traction surface 134 (FIG. 1).

FIG. 6 is another perspective view 600 of portions of the high torque traction drive 600 that is illustrated in FIG. 5. FIG. 6 is an illustration of the same components as shown in FIG. 5, except that a different view of these components is illustrated in FIG. 6. As shown in FIG. 6, planet gear 184 has pins 616, 618 that engage and pin roller 152 to the planet gear 184. Planet gear 186 has pins 620, 622, that engage and pin roller 154 to planet gear 186. Planet gear 188 has pins 624, 626 that pin and engage roller 156 to planet gear 188. In this manner, rollers 152, 154, 156 rotate with planet gears 184, 186, 188, respectively. Bearings 110 are disposed in rollers 152, 154, 156.

As also illustrated in FIG. 6, traction ring 128 has a sloped ring traction surface 516 that engages the inner traction surfaces 608, 610, 612 of rollers 158, 160, 162. The slope of the sloped ring traction surface 516 matches the slope of the inner traction surfaces 608, 610, 612 to create traction interfaces between the inner traction surfaces 608, 610, 612 and the sloped ring traction surface 516. As indicated above, a sloped angle of approximately 1 to 20 degrees creates an effective traction interface, as well as providing effective pressure to move the rollers 158, 160, 162 inwardly, as the inner traction surfaces 608, 610, 612 engage the sloped ring traction surface 516. Lateral forces placed on bearings 112 from bearing screws 116 (FIG. 1) cause rollers 160, 162 to move in a lateral direction inwardly to engage the sloped ring traction surface 516. By causing the rollers 158, 160, 162 to move inwardly, the outer traction surfaces 602, 604, 606 of rollers 158, 160, 162, respectively, engage the shaft traction surface 134 (FIG. 1) to create a traction interface between the shaft traction surface 134 (FIG. 1) and the outer traction surfaces 602, 604, 606 of rollers 158, 160, 162. Since the rollers 158, 160, 162 are pinned to the planet gears 184, 186, 188, which have a gear mesh that engages the inner gear mesh 182 of ring gear 130, torque is transferred by both the planet gears 184, 186, 188 and the traction interface that is created between inner traction surfaces 608, 610, 612 and the sloped ring traction surface 516. The traction interface between inner traction surfaces 610, 612, 614 and the sloped ring traction surface 516 primarily acts as an effective pressure to drive the rollers 158, 160, 162 inwardly toward each other and shaft 136 (FIG. 1), so that the outer traction surfaces 602, 604, 606 of rollers 152, 154, 156 engage the shaft traction surface 134 (FIG. 1). The existence of a traction interface between the inner traction surfaces 608, 610, 612 and the sloped ring traction surface 516 prevents scarring and wear of the inner traction surfaces 608, 610, 612 and the sloped ring traction surface 516, since the traction fluid prevents wearing of the traction interface. Of course, the same is true for inner traction surfaces 508, 510, 512 and sloped ring traction surface 514, as shown in FIG. 5. Bearings 110 are adapted to be disposed in rollers 152, 154, 156, while bearings 112 are adapted to be disposed in rollers 158, 160, 162.

As is illustrated in FIG. 3, rollers 152, 158 are mounted on a pivoting support arm 118 that pivots on pin 120. The pivoting support arm 118 allows the rollers 152, 158 to swing outwardly away from the other rollers to allow the shaft 136 to be inserted between the rollers. However, when a lateral force is applied by fasteners 176, 178 to bearings 164, 170, rollers 152, 158 are forced toward each other so that inner traction surface 608 engages the sloped ring traction surface 516 (FIG. 6) and inner traction surface 508 of roller 502 engages sloped ring traction surface 514 of traction ring 126, which causes the pivoting support arm 118 to pivot inwardly toward shaft 136 as a result of the inward forces created on rollers 152, 158 from the traction interface between inner traction surface 508 and sloped ring traction surface 514 and inner traction surface 608 and sloped ring traction surface 516. The movement of roller 152 toward rollers 154, 156 and the movement of roller 158 toward rollers 160, 162 creates balanced forces between the shaft traction surface 134 and the outer traction surfaces of the rollers, since the forces on the shaft traction surface 134 are substantially evenly spaced in a triangular configuration.

To prevent slipping between sloped ring traction surface 516 and the inner traction surfaces 608, 610, 612, as shown in FIG. 6, and sloped ring traction surface 514 and inner traction surface 508, 510, 512, as illustrated in FIG. 5, the center of the sloped traction interface must have a diameter that matches the diameter of the positions of the planet gears 184, 186, 188 when meshing with the inner gear mesh 182 (FIG. 5). Hence, the sloped ring traction surfaces 514, 516 of traction rings 126, 128 must be carefully sized to have the same diameter in which the planet gears 184, 186, 188 engage the inner gear mesh 182 of the ring gear 130. Otherwise, slipping will occur on the sloped traction interface of the traction rings 126, 128. As force is applied by hollow support screw 124, bearing screws 148, 150, hollow support screw 122, and bearing supports 144, 146, the center of the sloped traction interface varies (FIG. 1). Hence, the final position of the midpoint of the sloped traction interface should correspond to the diameter of the planet gears 184, 186, 188.

As also shown in FIGS. 5 and 6, shaft 136 (FIG. 1) is supported by the rollers 152-162 at two different lateral locations, each of which lateral location provides three support surfaces. In other words, the rollers 152, 154, 156 have outer traction surfaces 502, 504, 506 (FIG. 5) that support the shaft 136 on the shaft traction surface 134 (FIG. 1) at one lateral location, while rollers 158, 160, 162 have outer traction surfaces 602, 604, 606 that support the shaft 136 (FIG. 1) on the shaft traction surface 134 (FIG. 1) at another lateral location. As such, bearings are not needed to support the shaft 136 (FIG. 1). Shaft 136 may operate at a very high rotational speed. As such, the elimination of any bearings that are required to support shaft 136 eliminates another part that could fail. The shaft traction interfaces between outer traction surfaces 502-506, 602-606 and shaft traction surface 134 create minimal wear because of the use the traction fluid. In fact, in a properly operating system, there will be zero wear of the shaft traction surface 134 and the outer traction surfaces 502-506, 602-606, since the traction fluid creates the traction in the traction interface and not by contact between the traction surfaces. Similarly, the traction interfaces created between inner traction surfaces 508, 510, 512 of rollers 152, 154 (FIG. 1), 156 and sloped ring traction surface 514 (FIG. 5), as well as the traction interfaces created between inner traction surfaces 608, 610, 612 and sloped ring traction surface 516, support the ring gear 130, so that bearings are not needed to support and rotate ring gear 130. Again, the elimination of bearings to rotate ring gear 130 eliminates another part that could fail and allows the ring gear 130 to rotate on traction surfaces with substantially no wear.

FIG. 7 is a schematic cut-away view 700 of the high torque traction drive illustrated in FIG. 1. As shown in FIG. 7, shaft 136 is disposed through the center of the high torque traction drive 100. The shaft traction surface 134 engages the outer traction surfaces of rollers 152, 154, 156 and rollers 158, 160, 162. For example, roller 152 has an outer traction surface 502 that engages the shaft traction surface 134 to create a shaft traction interface 704 when roller 152 is forced inwardly toward the ring gear 130. This occurs as a result of the reactive force of fastener 176, which is screwed into the shaft of planet gear 184 and hollow support screw 122 that is asserted against bearing 164. The reactive force pushes the bearing 164 and the roller 152 inwardly toward traction ring 126. The inward force on the sloped traction interface 706 forces the roller 152 toward the shaft 136 to create pressure on the shaft traction surface 134. The reactive force created by fastener 176 and hollow support screw 122 is created by the force generated by fastener 178 and hollow support screw 124. Hollow support screw 124 is adjusted in carrier plate 104 (FIG. 1), that comprises part of the housing of the high torque traction drive 100, and forces the bearing 170 inwardly toward the roller 158. The force generated by the hollow support screw 124 and fastener 178 is transferred to the traction ring 128 and the ring gear 130 to the traction ring 126 and to the hollow support screw 122 and fastener 176, which create the reactive force. The sloped traction interface 708 forces the roller 158 toward the shaft 136 to create pressure on the shaft traction interface 702. Similar forces are created on the other rollers, including rollers 160, 162. As also shown in FIG. 7, pin 518 connects the planet gear 184 to rollers 152, 158, so that planet gear 184 rotates with roller 152 and roller 158. In this manner, the rotational speed of rollers 152, 158 and planet gear 184 are all the same.

As also illustrated in FIG. 7, pin 530 connects planet gear 188 to rollers 156, 162. Bearing screw 148 is also mounted in carrier plate 104 (FIG. 1). By turning bearing screw 148, a force is produced on bearing 174 (FIG. 1) and roller 162, which creates a reactive force on bearing support 144. Tolerance rings 402, 410, which are radial springs, are capable of compressing, which allows rollers 156, 162 to move inwardly toward shaft 136. As disclosed above, rollers 152, 158 are mounted on support arm 118 (FIG. 1) and rotate on pin 120 (FIG. 1) to allow the rollers 152, 158 to move inwardly toward shaft 136. Since bearing support 144 and bearing screw 148 are mounted directly to the carrier housing 102 (FIG. 1) and carrier plate 104 (housing) (FIG. 1), movement of the rollers 156, 162 toward shaft 136 is accomplished by compressing the tolerance rings 402, 410.

FIG. 8 is an exploded diagram of portions of a high torque traction drive 800. As shown in FIG. 8, bearing screws 802, 804, 806 are threaded into threaded openings 814, 816, 818 in carrier housing 872. Similarly, bearing screws 808, 810, 812 are threaded into threaded openings 820, 822, 824 in carrier plate 874. Stepper motors 826, 828, 830 are coupled to bearing screws 802, 804, 806 and can automatically adjust the positions of bearing screws 802, 804, 806 in threaded openings 814, 816, 818 in the carrier housing 872. Similarly, stepper motors 832, 834, 836 are coupled to bearing screws 808, 810, 812 and adjust the position of bearing screws 808, 810, 812 in the threaded openings 820, 822, 824 in carrier plate 874. Stepper motors 826-836 may operate from an electronic control system, such as electronic control system disclosed in U.S. Patent Application Ser. No. 61/367,821, entitled "Super-Turbocharger Control Systems," filed Jul. 26, 2010, by Ed VanDyne, Jared William Brown, Volker Schumacher and Christopher Chadwell, which is specifically incorporated herein by reference for all that it discloses and teaches. Specifically, the stepper motors 826-836 can tighten the bearing screws 802-812 when the high torque traction drive 800 is subjected to high torque conditions. Again, tightening of the bearing screws 802-812 causes the rollers to press against the drive shaft with greater pressure to handle higher torque conditions. Adjustments of the bearing screws 802-812, which cause the rollers 864 to move radially by 0.0001" results in a lateral movement of the rollers of approximately 0.00037" assuming infinite stiffness since $$\tan(15°)=0.0001"/(\text{lateral movement}) \qquad \text{Eq. 1}$$

$$\text{lateral movement}=0.0001"/\tan(15°) \qquad \text{Eq. 2}$$

$$\text{lateral movement}=0.00037" \qquad \text{Eq. 3}$$

This creates a large amount of pressure, so that much higher forces are created in a radial direction than those created by the bearing screws 802-812. This is simply an example to show movement at an angle of 15 degrees. Again, angles of one to 20 degrees have been empirically determined to be useful.

When lower torque conditions are present, the stepper motors 826-836 can loosen the bearing screws 802-812, since lower forces are needed between the rollers and the drive shaft in lower torque conditions. Since the turning ratio between the drive shaft and the rollers is known, the rotational speeds of the rollers and the drive shaft can be monitored to determine if any slippage exists. When slippage is detected, bearing screws 802-812 can be tightened by stepper motors 826-836 until the monitored slippage is reduced or eliminated. Further, a control system may be able to detect when high torque conditions may occur, such as when an engine is accelerated. For example, in a vehicle, there may be a slight lag between the opening of a throttle and the increase in torque that is applied to the engine. This lag will allow the stepper motors 826-836 to adjust the bearing screws 802-812 prior to application of torque to the high torque traction drive 800 and thereby prevent the initiation of any slippage between the rollers and the drive shaft. The same is true, of course, when there is a detected closing of the throttle of the engine, so that the loosening of the bearing screws 802-812 can be timed with the reduction of torque on the engine. Of course, the tightening and loosening of the bearing screws 802-812 should be performed in an even manner, so that an equal amount of deflection and force is applied to each of the rollers.

An uneven amount of deflection can cause a tilting of the ring gear 862, which may cause the ring gear 862 to not operate properly. Hence, the amount of deflection and the forces generated by the bearing screws 802-812 should be equalized to even the balance of forces on the traction rings 866 and to equalize the amount of displacement to ensure that there is no warping or tilting of the traction rings 866 or ring gear 862. Further, either set of bearing screws on either side of the ring gear 862 may comprise bearing supports, so that the bearing screws only need to be tightened on one side. However, a loosening of the bearing screws on both sides provides more room for the shaft to be inserted between the rollers. Also, bearing screws 802-812 can be manually tightened and loosened, rather than using stepper motors. Also, force sensors can be used to monitor the forces generated by the bearing screws. As shown in the embodiment of FIG. 8, neither the ring gear, tolerance rings, nor the shaft, is supported by a bearing. Again, the elimination of bearings eliminates additional parts that can wear.

As also illustrated in FIG. 8, tolerance rings 837, 838, 840 are mounted in the recessed areas in bearing screws 802, 804, 806, respectively. Similarly, tolerance rings 842, 844, 846 are mounted in the recessed portions of bearing screws 808, 810, 812. Tolerance rings 837, 838, 840 are then mounted in the inner race of bearings 848, 850, 852, respectively. Similarly, tolerance rings 842, 844, 846 are mounted in the recessed portions of bearing screws 808, 810, 812, respectively. Tolerance rings 842, 844, 846 are then mounted in the inner race of bearings 856, 858, 860, respectively. The tolerance rings are constructed from a spring type of steel that has a wavy type configuration that is formed into a ring. The wavy configuration allows the tolerance rings 837-846 to be compressed with a certain amount of force depending upon the thickness and elasticity of the spring steel used in tolerance rings 837-846. Since the tolerance rings 837-846 have a wavy configuration, the tolerance rings 837-846 can be deflected in a radial direction so that the bearings 848, 850, 852, 856, 858, 860 can be deflected toward the shaft (not shown) and cause the rollers 864 to also be deflected toward the shaft upon tightening of the bearing screws 802-812. In other words, as the bearing screws 802-812 are tightened, the tolerance rings compress because of their spring-like composition and configuration, as the rollers 864 are pushed inwardly against the traction rings 866. As such, the rollers 864 move toward the central shaft as the tolerance rings compress, which allows a proper traction interface between the traction surfaces of the rollers 864 and the traction surface of the shaft. As such, all six rollers 864 are pushed toward the shaft in a balanced manner, especially when the tolerance rings 837-846 have a consistent elasticity. Bearing screws 802-812 can be adjusted to provide a single preset force on the rollers 864 for all conditions, can be adjusted using the stepper motors, or can be adjusted by hand, as described above, for different conditions. In addition, the shaft rotational speed versus the rotational speed of the ring gear 862 has a set ratio. If that ratio begins to vary more than approximately one percent or less, the bearing screws 802, 812 can be tightened to prevent slippage. Hence, monitoring the rotational speed of the shaft and the ring gear 862 can provide information regarding slippage, which can be reduced or eliminated by adjusting bearing screws 802-812.

FIG. 9A is an exploded view of another embodiment of a traction drive 900. As shown in FIG. 9A, the inner surface 904 of the ring gear 902 does not include an inner gear mesh, as illustrated in the other embodiments. Rather, the ring gear 902 is driven by the sloped ring traction surface 968 of traction ring 970, and a similar sloped ring traction surface 972 of traction ring 974. The sloped ring traction surface 972 interfaces with inner traction surfaces 976, 978, 980 of rollers 920, 922, 924, respectively. Similarly, inner traction surfaces (not shown) of rollers 926, 928, 930 interface with the sloped ring traction surface 968. In other words, planet gears that engage an inner mesh of the ring gear 902 are not used, as disclosed in other embodiments described above. Instead of using planet gears, as illustrated in FIG. 5, roller holders, such as roller holder 906, are used, which have roller axles, such as roller axles 908, 910. The roller axles fit into the rollers 920-930. For example, roller axle 908 fits in the center portion of roller 928. Roller axle 910 fits in the center portion of roller 922. Roller axle 918 fits in the center portion of roller 930. Roller axle 916 fits in the center portion of roller 926. The roller holders have pins that pin the roller holders to the rollers. For example, roller holder 906 has pins 912, 914 that pin roller 928 to roller holder 906. Bearings 932, 934, 936 fit within rollers 920, 922, 924, respectively, to allow rollers 920-924 to rotate. Bearing supports 944, 946, 948 have tolerance rings 956, 958, 960 that fit onto the recessed portions of the bearing supports 944, 946, 948, respectively. The tolerance rings 956, 958, 960 fit within the center race of bearings 932, 934, 936, respectively. Similarly, bearings 938, 940, 942 fit within the rollers 926, 928, 930, which allow the rollers 926, 928, 930 to rotate on bearings 938, 940, 942. Tolerance rings 962, 964, 966 fit on the recessed portions of bearing screws 950, 952, 954. The tolerance rings 962, 964, 966 fit within the inner race of the bearings 938, 940, 942. The tolerance rings 956-966 allow deflection of the rollers 920-930 in a radial direction to increase traction between the rollers 920, 930 and a central shaft (not shown). Ring gear 902 is driven by the traction provided between the sloped ring traction surfaces 968, 972 and the inner traction surfaces of the rollers 920-930. For this reason, the traction drive 900, illustrated in FIG. 9, may not be able to handle higher torques that can be handled by the other embodiments that use planet gears that are disclosed above.

FIG. 9B is a cut-away view of the embodiment disclosed in FIG. 9A. As shown in FIG. 9B, the high torque traction drive 900 is not coupled to either a compressor or a turbine. Shaft 982 may be coupled to any desired device. Ring gear 902 is coupled to a transfer gear 984. Transfer gear 984 may also be utilized in any desired manner. FIG. 9B illustrates the manner in which the sloped traction interfaces 986, 988 provide a traction interface between rollers 920, 926 and ring gear 902. The sloped traction interfaces 986, 988 also create an inward force on rollers 920, 926, which increases the pressure on traction interfaces 990, 992, between rollers 920, 926 and the outer surface of the shaft 982. Again, since the roller holder 906 is not geared to an inner mesh of the ring gear 902, torque is transferred from the rollers 920, 926 to the ring gear 902 via the sloped traction interfaces 986, 988.

FIG. 9C is a cut-away view of another embodiment of a high torque traction drive 990. As illustrated in FIG. 9C, ring gear 998 is formed as a single piece having sloped interfaces 988, 999. These sloped interfaces transfer torque between rollers 993, 994 and the ring gear 998. Since the sloped traction interfaces 988, 999 are sloped, the force on traction interfaces 995, 996 can be adjusted by translative movement of the rollers 993, 994. As shown in FIG. 9C, the ring gear 998 is formed with the traction surfaces, so that additional traction rings are not required. As such, fewer parts are required in the embodiment of the high torque traction drive 990, illustrated in FIG. 9C.

FIG. 10 is a schematic diagram of a traction system 1000 utilizing the high speed traction device 1006. As illustrated in FIG. 10, the high speed traction device 1006 is coupled to a high speed device 1002 via shaft 1004. The high speed traction device 1006 may comprise the high torque traction drive 100 illustrated in FIG. 1, or other embodiments of a high torque traction drive that are disclosed herein. Ring gear 1018 is coupled to a transfer gear 1008. Transfer gear 1008 has shaft 1010 that is coupled to an optional transmission 1012. The optional transmission 1012 has a shaft 1014 that is coupled to a low speed device 1016. Of course, the optional transmission 1012 can be eliminated, so that shaft 1010 is coupled directly to the low speed device 1016. The optional transmission 1012 can be a fixed ratio transmission, or a variable ratio transmission. For example, some systems have a narrow operating band, such as generators, a fixed ratio transmission can be used for those types of systems. However, for many other systems, a wide band of operating points is necessary, which results in a necessity to use a variable ratio transmission. Variable ratio transmissions may comprise continuously variable transmissions, infinitely variable transmissions, or multiple ratio transmissions with discreet gear sets. The ratio adjusting transmission may include fixed gears, mechanical CVTs, speed summing CVTs with variators, including hydraulics, pneumatics, electric motors and mechanical variators. Discreet gear transmissions, with the ability to shift between gears can also be used, such as automatic transmissions and dual clutch transmissions.

As shown in FIG. 10, power and torque can be transmitted in either direction. For example, power and torque may be provided by the high speed device 1002 to the low speed device 1016. Alternatively, low speed device 1016 may generate torque that is applied to the high speed device 1002. The utilization of the high speed traction device 1006 simply allows conversion of high speed rotational mechanical energy to low speed rotational mechanical energy and vice versa. The high speed device 1002 may comprise numerous different devices. For example, the high speed device 1002 may be a device that either drives, or is driven by, the low speed device 1016. The high speed device can comprise a turbine. Examples of turbines include exhaust turbines, steam turbines, including the Tesla turbine and the Schumacher turbine, compressors, combinations of turbines and compressors, high speed pumps, dentist drills, or other devices that operate with high rotational speed and mechanical energy. The low speed device 1016 may comprise all types of electric motors, generators, hydraulic pumps, piston engines, or any other type of motive device. For example, high speed device 1002 may be a high speed pump that is driven by a low speed device, such as a motor or engine. Similarly, low speed device 1016 may comprise a lower speed pump that is driven by a higher speed device 1002. High speed device 1002 may comprise a compressor, while low speed device 1016 may comprise an engine that drives the high speed compressor 1002. The high speed device 1002 may comprise a turbine, which drives an engine, a generator, or an electric motor. The high speed device 1002 may comprise a steam turbine, which can drive a generator or an electric motor as a low speed device 1016. For example, various high efficiency steam turbines can be used to efficiently drive generators or electric motors. One example of a high efficiency steam turbine is a Tesla steam turbine. The high speed device 1002 can also be a high speed dentist drill that is driven by a lower speed electric motor, as low speed device 1016. Clearly, there are many applications for the traction system illustrated in FIG. 10, in which a transfer in rotational mechanical energy can be accomplished between a high rotational speed and a low rotational speed.

FIG. 11 is an illustration of a turbine/compressor system 1100 in which a high torque drive 1118 is disposed to the side of the turbine 1102 and compressor 1112. As illustrated in FIG. 11, turbine 1102 receives exhaust gases 1104, which drives the turbine 1102 and shaft 1110. Exhaust gases 1106 then exit the turbine 1102. Shaft 1110 connects the turbine 1102 with the compressor 1112, so that compressor 1112 is driven by turbine 1102. Air intake 1116 allows air to flow into the compressor 1112 to create a flow of compressed air 1114. Shaft 1120 connects the compressor 1112 to the high torque drive 1118. Hence, the high torque drive 1118 is placed to the side of the turbine 1102 and compressor 1112. Turbine 1102 is placed on the far side, away from the traction drive, since the exhaust gases are exhausted from the side of the turbine 1102. Accordingly, there is no necessity for locating the high torque drive 1118 between the turbine 1102 and compressor 1112, as disclosed in various embodiments herein.

FIG. 12 is a cut-away view of an externally controlled adjustable clamping system 1200 that is adjusted by a rotary actuator 1202. As illustrated in FIG. 12, rotary actuator 1202 actuates the actuator shaft 1224 to rotate gears 1204, 1205. Gears 1204, 1205 mesh with the gear teeth in adjustment gears 1208, 1209, respectively. Bearing screw 1210 is connected directly to adjustment gear 1208 so that rotation of adjustment gear 1208 causes rotation of bearing screw 1210. Similarly, bearing screw 1211 is connected directly to adjustment gear 1209 so that rotation of adjustment gear 1209 causes rotation of bearing screw 1211. Threads 1214 and 1215 are formed in opposite directions in carrier plates 1220, 1222, so that rotation of the actuator shaft 1224 will cause the bearing screws 1210, 1211 to either move inwardly or outwardly together. For example, threads 1214 may be a right hand thread, while threads 1215 may be a left hand thread. In either case, rotation of the actuator shaft 1224 in one direction will result in clamping, while rotation of the actuator shaft 1224 in the opposite direction will result in unclamping. When the actuator shaft 1224 is rotated in a direction which causes the bearing screws 1210, 1211 to move inwardly toward each other, a force is transferred from the bearing screw 1210 to inner race 1226, and from bearing screw 1211 to inner race 1228. Force applied to inner race 1226 causes inner race 1226 and outer race 1230 to transfer a force in an inward direction to roller 1234. Similarly, a force on inner race 1228 causes inner race 1228 and outer race 1232 to transfer an inward force to roller 1236. The inward force on roller 1234 causes the roller 1234 to move on the sloped traction interface 1238 between the roller 1234 and the traction ring 1216. Movement on the sloped traction interface 1238 increases the force on the traction interface 1244 between the central shaft 1240 and the outer surface of roller 1234. Similarly, the inward force on roller 1236 causes the roller 1236 to move on the sloped traction interface 1239 between the traction ring 1217 and the roller 1236. Movement on the sloped traction interface 1239 causes an increased force on the traction interface 1242 between the central shaft 1240 and the roller 1236. Tolerance rings 1246, 1248 allow the rollers 1234, 1236 to move slightly to increase and decrease the force on traction interfaces 1242, 1244. Accordingly, rotary actuator 1202 can be used to increase or decrease the forces on traction interfaces 1242, 1244.

Figure 24:
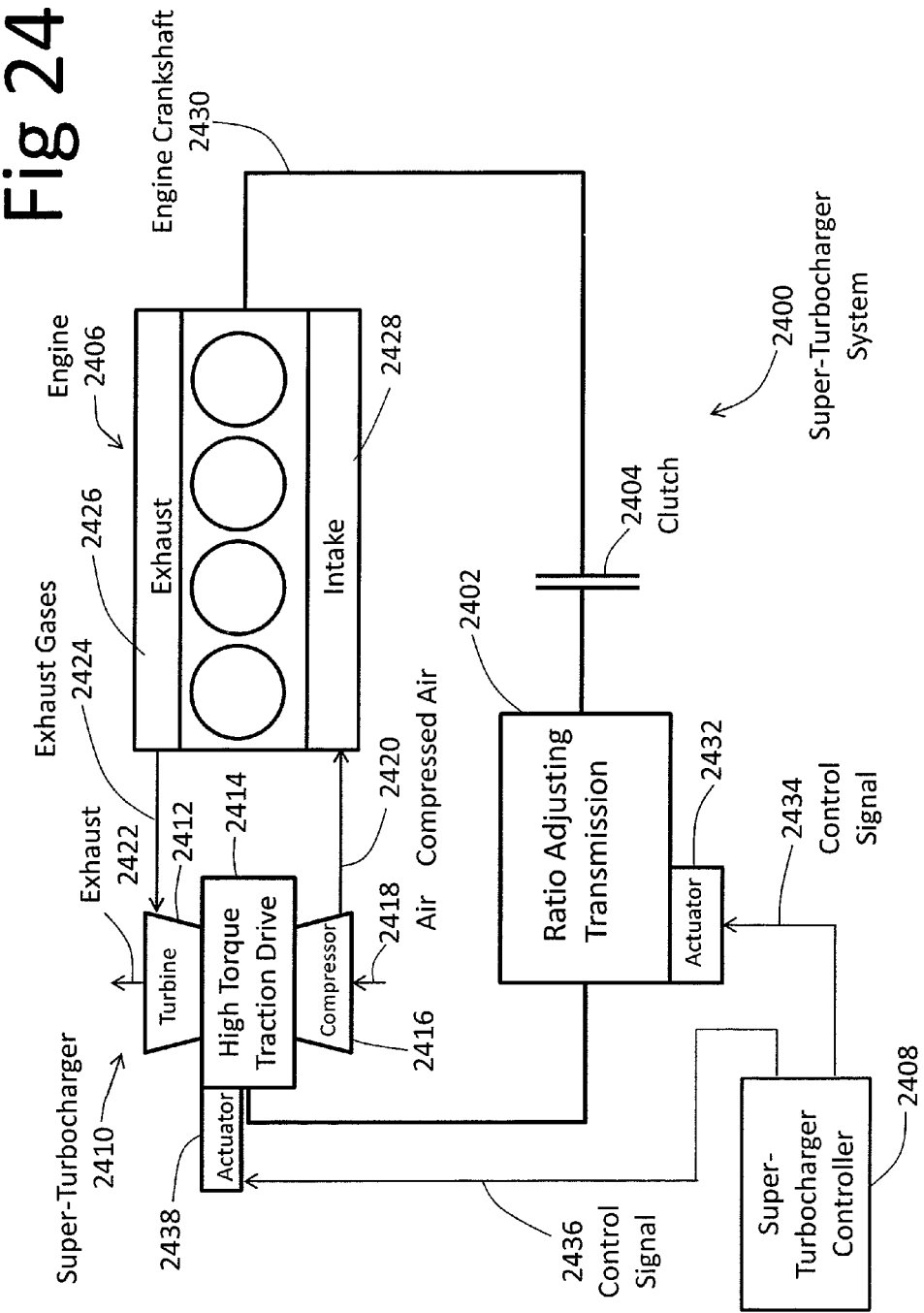
FIG. 24 is a schematic block diagram illustrating a super-turbocharger system.

Rotary actuator 1202, illustrated in FIG. 12, can be actuated in response to a controller, such as the super-turbocharged controllers illustrated in FIGS. 24, 25 and 27. These control units may operate in the manner described in U.S. patent application Ser. No. 13/191,407, entitled "Superturbocharger Control Systems," filed Jan. 26, 2011, by Ed VanDyne, Jared William Brown and Volker Schumacher, which application is specifically incorporated herein by reference for all that it discloses and teaches. These controllers are able to detect requested torque and generate a clamping signal on a real time basis. Various embodiments of externally controlled active clamping systems are disclosed herein, which respond to control signals generated by a controller, as disclosed below. In each of the embodiments, the ability to control the traction force at the various traction interfaces, such as traction interfaces 1242, 1244 of FIG. 12, provides greater overall reliability and extends the life of the system. When high torque conditions are detected by a controller, a control signal can be generated to increase the clamping force to create the required force on the traction interfaces, such as traction interfaces 1242, 1244, to prevent slipping and wear on the traction interfaces. Slipping will cause excessive wear, which shortens the lifetime of the traction drive, such as traction drive 1201. Hence, when an increase in torque is detected, greater forces on the traction interfaces, such as traction interfaces 1242, 1244, are generated to prevent or reduce slippage and the resultant excessive wear. Similarly, in lower torque conditions, the pressure can be reduced on the traction interfaces, such as traction interfaces 1242, 1244, and parasitic losses can be reduced.

FIG. 13 is a cut-away view of an externally controlled adjustable clamping system 1300. FIG. 13 shows a rotary actuator 1302 coupled to a gear 1304 that mates to an internal ring gear 1306. The internal ring gear 1306 meshes with three adjustment gears 1307, 1308, 1309. The adjustment gears 1307, 1308, 1309 are coupled to ball screws 1310, 1312. Adjustment gear 1308 is coupled to another ball screw (not shown). The ball screws 1310, 1312 generate clamping forces on the traction drive 1301. The bearing ball screws 1310, 1312 form a spiral so that, as the adjustment gears 1307, 1309 are rotated, the adjustment gears 1307, 1309 move inwardly or outwardly with respect to the stationary carrier plate 1314. In this manner, clamping occurs at three points, i.e., at all three rollers in the traction drive 1301. Reactive forces created by carrier plate 1316 balance the forces created by each of the adjustment gears 1307, 1308 and 1309. Force is applied to all three rollers in the embodiment of FIG. 13 and differs from the embodiment of FIG. 12, which only applies force to a single set of rollers 1234, 1236. The other sets of rollers in FIG. 12 adjust to the movement of rollers 1234, 1236 to also apply pressure to the traction interfaces between the rollers and the central shaft 1240.

FIG. 14 is a cut-away view of another embodiment of an externally controlled adjustable clamping system 1400. As shown in FIG. 14, traction drive 1402 is adjusted by a rotary actuator 1404. Rotary actuator 1404 is connected to gear 1406. Gear 1406 actuates ball ramp adjustment gear 1408. Ball ramp adjustment gear 1408 is coupled to a housing (not shown) and rotates but does not move laterally. When adjustment gear 1408 is rotated, balls 1410, 1411 move in sloped ball ramps 1412, 1413, respectively. Since the bearing ring 1410 is rotationally fixed on a housing, the bearing ring 1410 moves laterally to adjust the force on the traction drive by adjusting the force on the inner races of the bearings as disclosed above with respect to FIG. 12. In this manner, the force on the traction drive can be adjusted using controls for the rotary actuator 1404. Although a rotary actuator 1404 is disclosed as the motive device in FIG. 14, any of the other devices described herein can be used as the motive force for the actuator for the ball ramp.

FIG. 15 is a cut-away view of another embodiment of an externally controlled adjustable clamping system 1500. As shown in FIG. 15, a forcer 1502 engages a magnet assembly 1504, that causes the magnet assembly 1504 to rotate and adjust the clamping pressure on the high torque traction drive 1506. As shown in FIG. 15, balls, such as balls 1518, are mounted in grooves in ball screw 1516 formed in laterally moving bearing ring 1510, that moves in a lateral direction but does not rotate, and laterally stationary ball screw ring 1508 that does not move in a lateral direction but rotates in response to forcer 1502 applying a magnetic force to magnet assembly 1504. As the magnet assembly 1504 and laterally stationary ball screw ring 1508 rotate in response to the forcer 1502, the laterally moving bearing ring 1510 moves laterally and applies force to planet bearings 1512, 1514. The grooves in the stationary ball screw ring 1508 are disposed in a spiral, so that lateral movement of the laterally moving bearing ring 1510 is created when the laterally stationary ball screw ring 1508 is rotated by the forcer 1502. Forces on the planet bearings 1512, 1514 adjust the clamping force in the high torque traction drive 1506. Magnet assembly 1504 is attached to the laterally stationary ball screw ring 1508 and causes the laterally stationary ball screw ring 1508 to rotate in response to an electrical field generated by the forcer 1502.

FIG. 16A is an exploded view of another embodiment of an externally controlled adjustable clamping system 1600. As shown in FIG. 16A, the externally controlled adjustable clamping system 1600 has a stationary threaded ring 1608 that is disposed adjacent to a hydraulic vane stator 1606. Hydraulic vane stator 1606 is pinned to the stationary threaded ring 1608 so that the hydraulic vane stator 1606 does not rotate with respect to the stationary threaded ring 1608. The hydraulic vane stator 1606 has stator legs 1612, 1614, 1616. Stator legs, 1612, 1614, 1616 have openings for the flow of hydraulic fluid in the cavity formed by the hydraulic vane stator 1606. Hydraulic vane rotor 1624 is disposed in the cavity formed by the hydraulic vane stator 1606 and is threaded onto the stationary threaded ring 1608 via threads 1628, 1630. Rotor legs 1618, 1620, 1622 are disposed between the stator legs 1612, 1614, 1616. This assembly is then inserted within the traction drive 1602. When hydraulic fluid is inserted into the cavity created by the hydraulic vane stator 1606, via the openings in stator legs 1612, 1614, 1616, the hydraulic vane rotor 1624 rotates as a result of the pressure applied on either side of the rotor legs 1618, 1620, 1622. As the hydraulic vane rotor 1624 rotates, threads 1628, which are meshed with threads 1630, cause the hydraulic vane rotor 1624 to move laterally and apply pressure to planet bearings (illustrated in FIG. 16B) to cause clamping or unclamping.

FIG. 16B is a cut-away view of the embodiment of the externally controlled adjustable clamping system 1600, illustrated in FIG. 16A. As shown in FIG. 16B, the stationary threaded ring 1608 is coupled to a housing and does not rotate or move in a lateral direction. The hydraulic vane stator 1606 is coupled to, and secured to, the stationary threaded ring 1608 via the posts shown on the stationary threaded ring 1608 and the openings on stator legs 1612, 1614, 1616. Hydraulic vane rotor 1624 is disposed within the cavity formed by the hydraulic vane stator 1606. The hydraulic vane rotor 1624 has three rotor legs 1618, 1620, 1622 (FIG. 16A). Upon application of hydraulic fluid pressure to the cavity within the hydraulic vane stator 1606, pressure from the hydraulic fluid is asserted on the rotor legs 1618, 1620, 1622 (FIG. 16A), which causes the hydraulic vane rotor 1624 to rotate. Since the hydraulic vane rotor 1624 is threaded onto the threads 1628 of the stationary threaded ring 1608, lateral movement is created in the hydraulic vane rotor 1624. Rotational movement of the hydraulic vane rotor 1624 creates the lateral movement, which creates or releases pressure on the bearing ring 1626. Bearing ring 1626 is disposed against the roller bearings to adjust the clamping pressure on the ring gears.

FIG. 17 is a cut-away view of another embodiment of an externally controlled adjustable clamping system 1700. As illustrated in FIG. 17, a hydraulic or pneumatic ring cylinder 1704 engages a plurality of hydraulic or pneumatic bearing pistons 1706, 1714. The hydraulic or pneumatic ring cylinder 1704 is stationary and is attached to a housing. When hydraulic or pneumatic pressure is applied to the hydraulic or pneumatic bearing pistons 1706, 1714, and a third piston (not shown), through the hydraulic or pneumatic inlets 1708, 1710, 1712, the hydraulic or pneumatic pistons 1706, 1714 move and create a force on the roller bearings of the high torque traction drive 1702. As illustrated in FIG. 17, hydraulic or pneumatic pressure is inserted through hydraulic/pneumatic inlets 1708, 1710, 1712, in the cylinder 1704, to create pressure on bearing pistons 1706, 1714. The pistons 1706, 1714 and the additional piston (not shown) react to the pneumatic or hydraulic pressure, so that the bearing pistons 1706, 1714 and the additional piston (not shown) move laterally and generate a force on the inner race of the planet bearings 1716, 1718. This force is transmitted from the planet bearings 1716, 1718 to the traction rings 1728, 1730 through rollers 1720, 1722 and 1724, 1726, respectively, to create the desired clamping force on the traction ring 1728 and an equal reactive force on traction ring 1730, in response to the applied pneumatic or hydraulic pressure. In this manner, the desired clamping force is created in the high torque traction drive 1702.

FIG. 18 is a cut-away view of another embodiment of an externally controlled adjustable clamping system 1800. As illustrated in FIG. 18, a desired clamping force is generated in the high torque traction drive 1802 using piezoelectric active elements 1806, 1808, 1810, 1812. The piezoelectric active elements 1806, 1808, 1810, 1812 are mounted on stationary housing 1804 and stationary housing 1822. When a voltage is applied to the piezoelectric active element 1806, the piezoelectric active elements 1806, 1808, 1810, 1812, expands proportionally with the applied voltage. The expansion of the piezoelectric active elements 1806, 1808, 1810, 1812 causes the planet bearings 1814, 1816, 1818, 1820 to move laterally and apply a force to the rollers and traction rings. In this manner, a voltage can be used to create the desired clamping force in the high torque traction drive 1802.

FIG. 19 is a cut-away view of an embodiment of a constant force clamping system 1900. As illustrated in FIG. 19, a spring 1903 is situated between spring seat 1906 and inner race 1908 of planet bearing 1910. Similarly, spring 1904 is situated between spring seat 1907 of stationary plate 1914 and the inner race of planet bearing 1912. Stationary plate 1914 and stationary plate 1915 are stationary and are mounted to a housing. Springs 1903, 1904 create a constant pressure on planet bearings 1912, 1910, respectively. The force on the planet bearings 1910, 1912 is transferred to the traction ring 1920. A reactive force is created between stationary plate 1915 and planet bearings 1916 and 1918 to equalize the forces on the traction rings 1920, 1922. The springs 1903, 1904 therefore create a desired constant clamping force in the high torque traction drive 1902, based upon the strength of the spring 1903, 1904.

FIG. 20 is a schematic cut-away view of another embodiment of a constant force clamping system 2000. As illustrated in FIG. 20, fixed bearing seat 2006 is stationary and secured to a housing. Shims 2002, 2004 are inserted between the fixed bearing seat 2006 and the ring gear bearing inner races 2008, 2010. Shims 2002, 2004 create a substantially constant pressure on the inner races 2008, 2010, which is transferred to traction ring 2012 via roller 2014. A reactionary force is created on the other side to balance the forces on traction rings 2016 and 2016. In this fashion, a constant clamping force is created in the high torque traction drive 2001 based upon the size of the shims 2002, 2004. The shim can be replaced after a certain time period if traction surfaces become worn.

Figure 21:
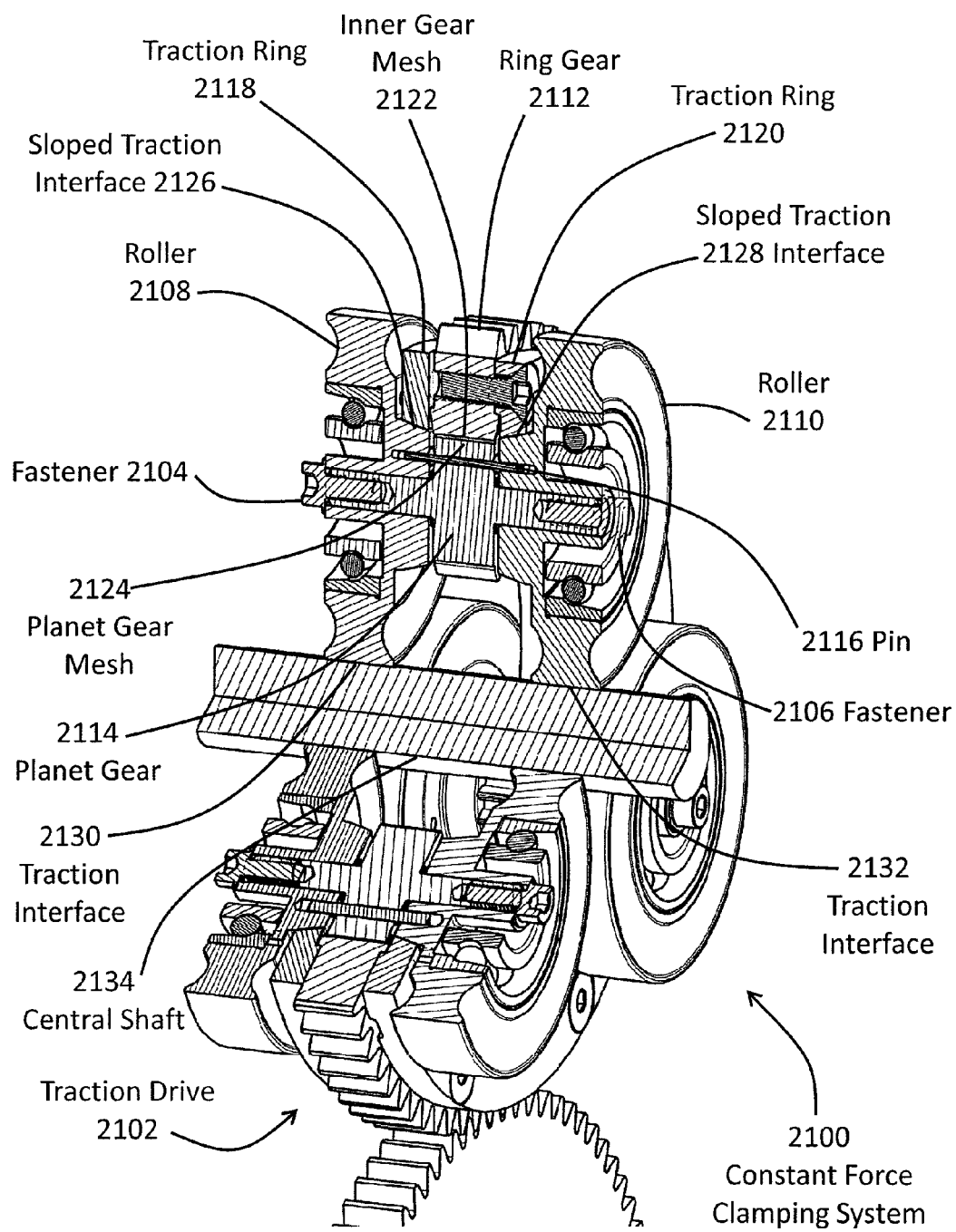
FIG. 21 is a cut-away view of the traction drive with a screw to provide a fixed level of clamping.

FIG. 21 is a cut-away view of another embodiment of a constant force clamping system 2100. As illustrated in FIG. 21, planet gear 2114 is pinned to the rollers 2108, 2110, using pin 2116. In that fashion, the planet gear 2114 rotates with the rollers 2108, 2110. Additionally, the inner gear mesh 2122 engages the planet gear mesh 2124, so that the ring gear 2112 rotates in response to the geared interface between the planet gear 2114 and the inner gear mesh 2122 of the ring gear 2112. By tightening the fasteners 2104, 2106 to a predetermined force, rollers 2108, 2110 move on the sloped traction interfaces 2126, 2128 of traction rings 2120, 2118, respectively, which forces the rollers 2108, 2110 to create an increased force on traction interfaces 2130, 2132 between the outer surface of the rollers 2108, 2110 and the central shaft 2134. In this manner, a constant clamping force is created on traction drive 2102 at the traction interfaces 2130, 2132 by simply tightening the fasteners 2104, 2106 to a predetermined torque.

Figure 22:
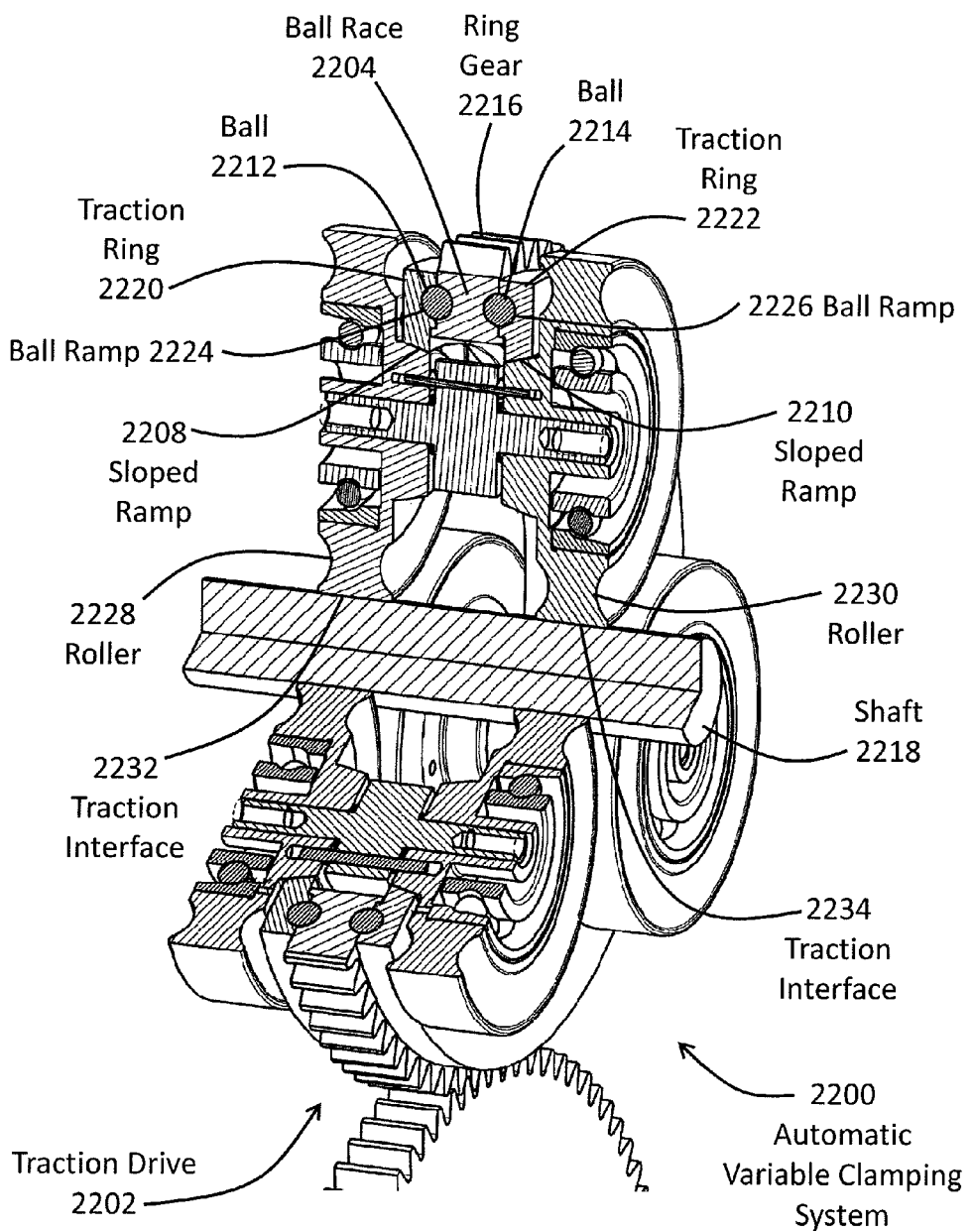
FIG. 22 is a cut-away view of the traction drive with a passive ball ramp to provide variable clamping levels.

FIG. 22 is a cut-away view of an embodiment of an automatic variable clamping system 2200. As illustrated in FIG. 22, balls 2212, 2214 are mounted in ball ramps 2224, 2226 in ball race 2204. As greater torque is applied to either the shaft 2218 or the ring gear 2216, balls 2212, 2214 move in the ball ramps 2224, 2226, respectively, which causes traction rings 2220, 2222 to move on the sloped ramps 2208, 2210, respectively, which automatically forces rollers 2228, 2230 inwardly towards shaft 2218 to increase pressure on traction interfaces 2232, 2234. The amount of torque applied to the shaft 2218, or ring gear 2216, controls the amount that the balls 2212, 2214 move within the ball ramps 2224, 2226, and consequently the amount of clamping force that is created in the automatic variable clamping system 2200. The traction rings 2220, 2222 move laterally in response to movement of the balls 2212, 2214 in ball ramps 2224 and 2226. Traction rings 2220, 2222 can move freely in a lateral direction and are coupled to the ball race 2204 by balls 2212, 2214. This lateral movement provides clamping of traction drive 2202.

Figure 23:
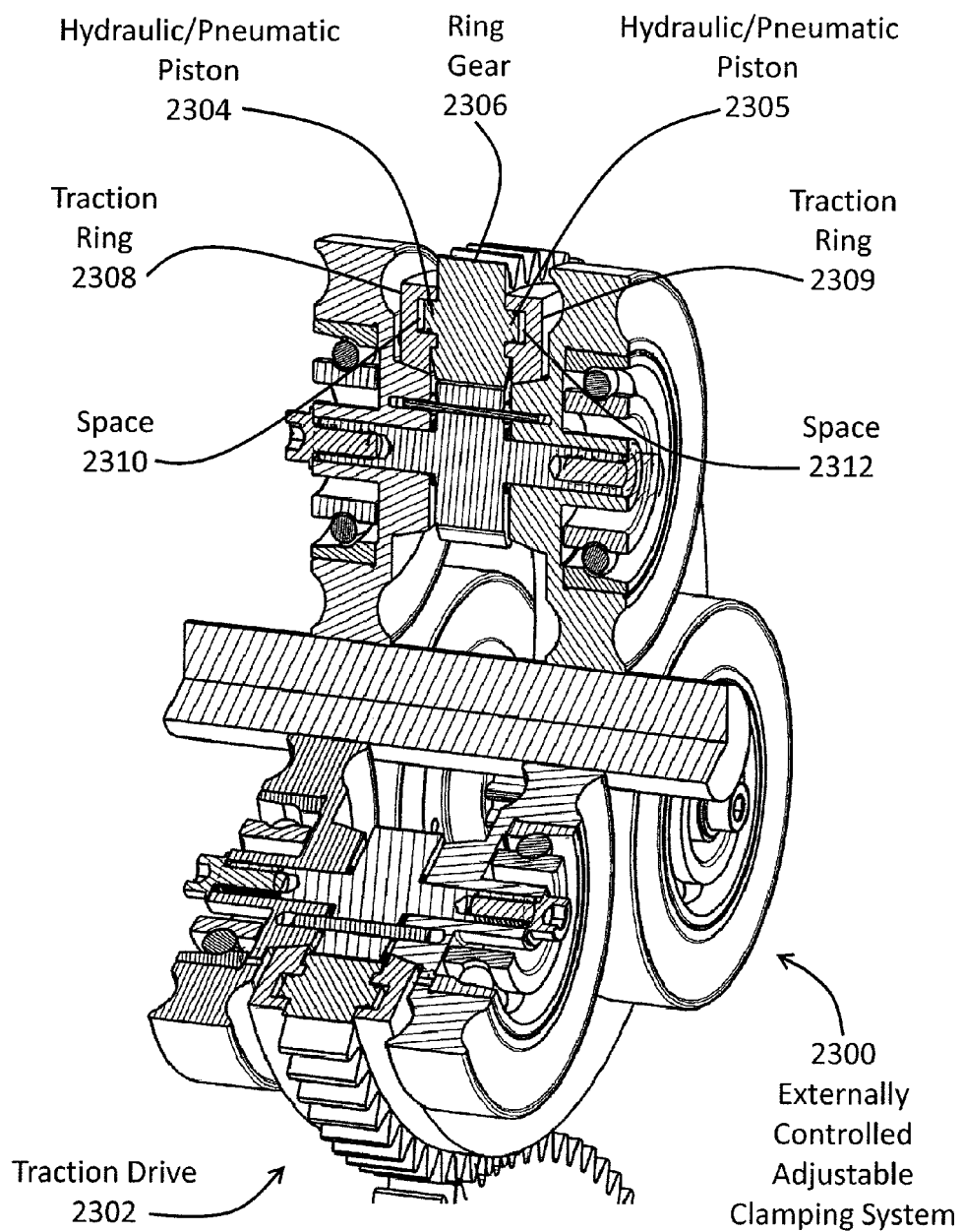
FIG. 23 is a cut-away view of the traction drive with a hydraulic piston internal to the ring gear assembly to provide adjustable clamping levels.

FIG. 23 is a cut-away view of an embodiment of another externally controlled adjustable clamping system 2300. Hydraulic/pneumatic pistons 2304, 2305 are formed as a portion of ring gear 2306 and sit within a cylinder formed in traction rings 2308, 2309. A hydraulic fluid or pneumatic gas is injected in spaces 2310, 2312, which adjusts the pressure between traction rings 2308, 2309 and ring gear 2306. The pressure in the hydraulic/pneumatic pistons 2304, 2305 is adjusted to push outward on traction rings 2308, 2309 to achieve a desired level of clamping on high torque traction drive 2302.

FIG. 24 is a schematic block diagram illustrating a super-turbocharger system 2400. As disclosed in FIG. 24, a ratio adjusting transmission 2402 is coupled to a clutch 2404. Clutch 2404 is coupled to the engine crankshaft 2430 of engine 2406. Super-turbocharger controller 2408 generates control signal 2434, which is applied to actuator 2432, which actuates and controls the ratio adjusting transmission 2402. Ratio adjusting transmission 2402 is coupled to the low speed side of the high torque traction drive 2414 of super-turbocharger 2410. Turbine 2412 and compressor 2416 are coupled to the high speed side of the high torque traction drive 2414. Compressor 2416 takes in air 2418 to generate a source of compressed air 2420 that is applied to intake 2428 of engine 2406. Turbine 2412 receives exhaust gases 2424 from exhaust 2426 of engine 2406. Turbine 2412 then exhausts the exhaust gases from the exhaust 2422. Super-turbocharger controller 2408 generates control signal 2436, which is applied to actuator 2438 that controls the high torque traction drive 2414. The ratio adjusting transmission 2402 adjusts the overall ratio from the crankshaft 2430 to the low speed side of the high torque traction drive 2414. This allows the turbine 2412 and compressor 2416 to spin at a desired speed under different operating conditions. The ratio adjusting transmission 2402 can be a fixed ratio transmission, or variable ratio transmission. For example, some systems have a narrow operating band, such as generators. A fixed ratio transmission 2402 can be used for those types of systems. However, for many other systems, a wide band of operating points is necessary, which results in the necessity to use a variable ratio transmission. Variable ratio transmissions may comprise continuously variable transmissions, infinitely variable transmissions or multiple ratio transmissions with discreet gear sets, such as ten speed dual clutch transmissions, as one example. By providing a variable ratio, the super-turbocharger controller 2408 is able to adjust the overall ratio of the super-turbocharger 2410 and cause the speed of the turbine 2412 to match variable desired speeds over a wide range of operating conditions. The ratio adjusting transmission 2402 may include fixed gears, mechanical CVTs, speed summing CVTs with variators, including hydraulics, pneumatics, electric motors, and mechanical variators. Discreet gear transmissions, with the ability to shift between gears, can also be used, such as automatic transmissions and dual clutch transmissions. Clutch 2404 permits the super-turbocharger system 2400 to be entirely decoupled from engine 2406, which can be useful for operating points, including idle, in which the super-turbocharger 2410 does not need to be spinning at all, and if connected, comprises a parasitic drag on engine 2406. The clutch 2404 can be used in combination with any of the ratio adjusting transmissions 2402, described herein.

FIG. 25 illustrates another embodiment of the superturbocharged system 2500 that includes an example of a ratio adjusting transmission 2502. The specific ratio adjusting transmission 2502, illustrated in FIG. 25, is a speed summing differential, continuously variable transmission, which is otherwise known as an epicyclic transmission. The epicyclic transmission uses epicyclic gearing, which consists of a gear system that has one or more outer gears, or planet gears, revolving about a central sun gear. Typically the planet gears are mounted on a moveable arm or carrier, which itself may rotate relative to the sun gear. Epicyclic gearing systems also incorporate the use of an outer ring gear, or annulus, which meshes with the planet gears. Accordingly, the three basic components of an epicyclic gear are the sun gear, which is the central gear, the planet carrier, which holds one or more peripheral planet gears, which are all the same size and are meshed with the sun gear, and the annulus, which is the outer ring with inward facing teeth that mesh with the planet gears. In the epicyclic transmission 2502, illustrated in FIG. 25, variator 2514 can be used to constrain one or more of these three components so that the overall ratio of the ratio adjusting transmission 2502 can be adjusted. By controlling one of the three components, one of the other two remaining components can function as an input, while the other component can act as an output. The ratio of the input rotation to the output rotation is dependent upon the number of teeth in each gear and the manner in which the variator 2514 controls the other component. For example, variator 2514 may be a motor that rotates the annulus to control the ratio of the sun gear to the planet gears. Alternatively, the variator 2514 may connect to the sun gear and the planet gears, in which case the ring gear or annulus is used as the output to the high torque traction drive of the super-turbocharger 2510. Since a variator 2514 can be used to control the ratio of the ratio adjusting transmission 2502, the super-turbocharger controller 2508 is capable of varying the gear ratios between the crank shaft 2512, which is coupled to the engine 2506, and the high torque traction drive of the super-turbocharger 2510. Variator 2514 may comprise a wide variety of devices, including coupled hydraulic pumps, electric motors, mechanical continuously variable transmissions, or other devices. The clutch 2504 can be used in combination with any of the ratio adjusting transmissions 2502, described herein.

FIG. 26 is a schematic diagram of an embodiment of a control system 2600. As shown in FIG. 26, various inputs 2604 from vehicle sensors are sent to the input 2608. These inputs may include engine rpm, a throttle position, measured temperatures, pressures, wheel spin, accelerometers, throttle, pedal position or driver input. Control inputs 2606 are received by the control input device 2616 of the control unit 2602. The control input may include manifold pressure, air mass flow, compressor speed, fuel flow, boost pressure, CVT ratio, etc. The vehicle sensor inputs 2608 are compared in comparator 2610 with the engine operation maps 2612 and the result is sent to a desired state 2614. Control inputs 2606 are transmitted directly to the control loop 2618. In addition, the state of the actuator 2620, such as actuator 1202 of FIG. 12, is also sent to the control loop. The desired state information 2614 and the actuator state 2620 are also forwarded to the control loop 2618. The control loop 2618 may comprise a proportional integral derivative controller (PID controller), which is a controlled loop feedback controller. PID controllers calculate an error value as a difference between a measured process variable and a desired setpoint. PID controllers then attempt to minimize the error by adjusting the process control inputs. PID controllers use proportional, integral and derivative values to generate corrections. The proportional value (P) is representative of the present error, the (I) value is representative of the accumulation of past errors and the (D) value is the future errors, which is calculated using the derivative based upon the current rate of change. The weighted sum of these three is used as a controller output 2622. Additional features of the control loop may include feed forward, compressor efficiency map, and torque estimators. Controller output 2622 generates a control signal 2624 which is applied to the super-turbocharger actuator 2626, such as super-turbocharger actuator 1202 of FIG. 12. In this manner, the overall ratio can be determined for the super-turbocharger. Actuator 2626, such as actuator 1202 of FIG. 12, and variator 2514 of FIG. 25, utilize a control signal to adjust the ratio of the ratio adjusting transmission 2402 (FIG. 24), or the ratio adjusting transmission 2502 (FIG. 25). The operation of control systems is further described in U.S. patent application Ser. No. 13/191,407, filed Jul. 26, 2011, entitled "Superturbocharger Control Systems." which is specifically incorporated herein by reference for all that it discloses and teaches.

FIG. 27 is a schematic block diagram of an embodiment of a super-turbocharger system 2700 that is used in conjunction with electric motor/generators. As shown in FIG. 27, super-turbocharger 2710 functions with the engine 2706 to increase power levels. Super-turbocharger 2710 operates in response to control signals from the super-turbocharger controller 2708. Electric motor/generator 2702 is coupled to the low speed side of the high torque traction drive of the super-turbocharger 2710 via shaft 2724. The motor controller 2722 operates in response to control signals from the super-turbocharger controller 2708. Engine crank shaft 2704 of engine 2706 is coupled to an electric motor/generator 2712. The electric motor/generator 2712 is coupled by wire 2716 to motor controller 2722. The electric motor/generator 2712 can be used as a generator to charge the battery bank 2714, as a motor for propelling a vehicle, or other desired uses. Similarly, electric motor/generator 2702 is connected by wire 2720 to motor controller 2722. Electric motor/generator 2702 can be used to charge the battery bank 2714 by using the electric generator. Alternatively, the electric motor/generator 2702 can be used as a motor to drive the low speed end of super-turbocharger 2710. Battery 2714 is connected by wire 2718 to the motor controller 2722 so that the battery 2714 can be charged, or to drive the electric motors of electric motor/generators 2702, 2712 depending upon operating conditions of the system.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of transferring rotational mechanical energy between a shaft and a ring gear comprising:
    obtaining a shaft having a shaft traction surface;
    obtaining rollers having inner roller sloped surfaces and outer roller traction surfaces;
    connecting traction rings to opposite sides of said ring gear, said traction rings having sloped ring surfaces that mate with said inner roller sloped surfaces of said rollers;
    coupling planet gears to said rollers, said planet gears disposed to engage an inner gear mesh on said ring gear so that rotational mechanical energy is transferred between said rollers and said ring gears through said planet gears;
    forcing said rollers towards said traction rings to create a force against said inner roller sloped surfaces of said rollers and said sloped ring surfaces of said traction rings that creates a sloped pressure interface, forcing said rollers towards said shaft, which forces said outer roller traction surfaces of said rollers against said shaft traction surface of said shaft, to create pressure on a shaft traction interface that is created between said shaft traction surface of said shaft and said outer roller traction surface of said rollers, that increases friction in said shaft traction interface, which causes said rotational mechanical energy to be transferred between said shaft and said rollers.

2. The method of claim 1 wherein said process of obtaining rollers having inner roller sloped surfaces and outer roller sloped surfaces further comprises:
    obtaining rollers having inner roller sloped surfaces that mate with said sloped ring surfaces of a complimentary angle of approximately one degree to approximately twenty degrees, which creates pressure to force said outer roller traction surfaces of said roller against said shaft traction surface of said shaft.

3. The method of claim 1 further comprising:
    mounting at least two of said rollers on a pivoting arm that allows said at least two rollers to pivot away from said shaft so that said shaft can be inserted between and removed from said outer roller traction surfaces of said rollers without causing damage to said outer roller traction surfaces and said shaft traction surface.

4. The method of claim 1 further comprising:
    spraying traction fluid on said sloped pressure interface and said shaft traction interface.

5. The method of claim 4 wherein said process of spraying said traction fluid on said sloped pressure interface and said shaft traction interface comprises:
    spraying said traction fluid on a closing side of said sloped pressure interface and said shaft traction interface to supply traction fluid to said sloped pressure interface and said shaft traction interface;
    spraying said traction fluid on an opening side of said sloped pressure interface and said shaft traction interface to cool said sloped pressure interface and said shaft traction interface.

6. The method of claim 1 further comprising:
    mounting a first set of said rollers in a first set of bearings;
    mounting said first set of bearings in bearing supports;
    mounting said bearing supports on a housing;
    mounting a second set of said rollers on a second set of bearings;
    mounting said second set of bearings on bearing screws, said bearing screws being adjustably mounted in said housing;
    adjusting said bearing screws in said housing to create a force on said second set of bearings which forces said second set of rollers towards said first set of rollers and creates a reactive force in said bearing supports that forces said first set of bearings and said first set of rollers towards said second set of rollers.

7. The method of claim 6 wherein said process of forcing said rollers towards said traction rings to create a force against said inner roller sloped surfaces of said rollers and said sloped ring surfaces of said traction rings that creates a sloped pressure interface, causing said rollers to move towards said shaft further comprises:
    forcing said rollers towards said traction rings to create a force against said inner roller sloped surfaces of said rollers and said sloped ring surfaces of said traction rings that creates a sloped pressure interface, causing said rollers to move towards said shaft as a result of compression of tolerance rings disposed on said bearing supports and said bearing screws which function as radial springs.

8. The method of claim 7 wherein said process of adjusting said bearing screws further comprises:
    adjusting said bearing screws automatically using an electronic control system to create a traction drive with variable torque.

9. The method of claim 6 wherein said process of forcing said rollers towards said traction rings to create a force against said inner roller sloped surfaces of said rollers and said sloped ring surfaces of said traction rings that creates a sloped pressure interface, causing said rollers to move towards said shaft further comprises:
    forcing said rollers towards said traction rings to create a force against said inner roller sloped surfaces of said rollers and said sloped ring surfaces of said traction rings that creates a sloped pressure interface, causing said rollers mounted on a pivoting arm to move toward said shaft.

10. The method of claim 1 wherein said process of forcing said rollers toward said traction rings comprises:
    using an externally controlled adjustable clamping process to force said traction rings together.

11. The method of claim 10 wherein said process of using an externally controlled adjustable clamping process comprises:
    using a rotary actuator to rotate at least two bearing seats to create lateral translative movement of said at least two bearing seats to vary clamping forces on said traction rings.

12. The method of claim 11 further comprising:
    using a controller that generates a control signal to control said rotary actuator.

13. The method of claim 12 wherein said lateral translative movement is created by a threaded interface.

14. The method of claim 12 wherein said translative movement is created by ball ramps.

15. The method of claim 12 wherein said translative movement is created by ball screws.

16. The method of claim 12 wherein said externally controlled adjustable clamping process comprises:

controlling application of hydraulic pressure to a hydraulic translative device that controls said force applied to said bearing seats.

17. The method of claim 11 wherein said externally controlled adjustable clamping process comprises:
controlling application of pneumatic pressure to a pneumatic translative device that controls said force applied to said bearing seats.

18. The method of claim 11 wherein said process of using an externally controlled clamping process comprises:
using a threaded hydraulic vane rotor that rotates and generates a translative movement that applies a force to said bearing seats.

19. The method of claim 11 wherein said externally controlled adjustable clamping process comprises:
controlling voltage applied to a piezoelectric element that controls said force applied to said bearing seats.

20. The method of claim 1 wherein said process of forcing said rollers toward said traction rings comprises:
using a substantially constant force clamping process.

21. The method of claim 20 wherein said process of using a substantially constant force clamping process comprises using a spring to force said rollers toward said traction rings.

22. The method of claim 20 wherein said process of using a substantially constant force clamping process comprises using a shim to force said rollers toward said traction rings.

23. The method of claim 1 wherein said process of forcing said rollers toward said traction rings comprises:
using an automatic variable clamping process to force said traction rings apart.

24. The method of claim 23 wherein said process of using an automatic variable clamping process comprises:
using a plurality of balls that are disposed in a sloped channel in a ball race that generate a translative movement in said traction ring, whenever torque is applied to said ball race.

25. A traction drive comprising:
a shaft having a shaft traction surface;
rollers having inner roller sloped surfaces and outer roller traction surfaces;
a ring gear having an inner gear mesh and an outer gear mesh;
planet gears coupled to said rollers, said planet gears disposed to engage said inner gear mesh of said ring gear so that rotational mechanical energy is transferred between said rollers and said ring gears through said planet gears;
sloped ring surfaces that mate with said inner roller sloped surfaces of said rollers that creates a sloped pressure interface that forces said rollers towards said shaft so that said outer roller traction surfaces are forced against said shaft traction surface to create a shaft traction interface that transfers rotational mechanical energy between said rollers and said shaft which, in turn, causes said rotational mechanical energy to be transferred between said rollers and said ring gear through said planet gears.

26. The traction drive of claim 25 wherein said sloped ring surfaces comprise traction rings coupled to said ring gear.

27. The traction drive of claim 25 wherein said sloped ring surfaces comprise sloped surfaces formed on said ring gear.

28. The traction drive of claim 25 wherein said rollers further comprise:
rollers having inner sloped surfaces that mate with said sloped ring surfaces at a complimentary angle of approximately one degree to approximately twenty degrees.

29. The traction drive of claim 28 further comprising:
traction fluid sprayed on said sloped pressure interface and said shaft traction interface.

30. The traction drive of claim 29 further comprising:
spray holes that spray said sloped pressure interface and said shaft traction interface.

31. The traction drive of claim 30 further comprising:
spray holes that spray said traction fluid on a closing side of said sloped pressure interface and said shaft traction interface to supply traction fluid to said sloped pressure interface and said shaft traction interface;
spray holes that spray said traction fluid on an opening side of said sloped pressure interface and said shaft traction interface to cool said inner roller sloped surfaces and said outer roller traction surface and said shaft traction surface.

32. The traction drive of claim 25 further comprising:
at least one first bearing mounted in at least one first roller;
at least one bearing support that mounts said at least one first bearing on a housing;
at least one second bearing mounted in at least one second roller;
at least one bearing screw mounted on said at least one second bearings, said at least one bearing screw being adjustably mounted in a housing to create a force on said at least one second bearing which forces said at least one second roller towards said at least one first roller and creates a reactive force in said bearing supports that forces said first set of bearings and said at least one first roller towards said at least one second roller.

33. The traction drive of claim 32 further comprising:
tolerance rings disposed on said bearing supports and said bearing screws that function as radial springs that are compressed when said first set of rollers move toward said second set of rollers.

34. The traction drive of claim 25 further comprising:
a pivoting arm having at least two rollers mounted on said pivoting arm that allow said at least two rollers to move toward and away from said shaft.

35. The traction drive of claim 34 further comprising:
a first set of bearings mounted in a first set of said rollers;
a second set of bearings mounted in a second set of said rollers;
bearing screws mounted on said first set of bearings and said second set of bearings, said bearing screws being adjustably mounted in a housing to create a force on said first set of bearings and said second set of bearings which forces said first set of rollers and said second set of rollers towards each other.

36. The traction drive of claim 25 further comprising:
an externally controlled adjustable actuator that controls movement of said sloped traction surfaces.

37. The traction drive of claim 36 wherein said externally controlled adjustable actuator comprises:
a rotary actuator that rotates to create translative movement.

38. The traction drive of claim 37 wherein said externally controlled adjustable actuator comprises a threaded hydraulic vane rotor that rotates on a threaded interface to create a translative motion in said sloped pressure interfaces whenever hydraulic pressure is applied to said thermal hydraulic vane rotor.

39. The traction drive of claim 38 further comprising:
a controller that generates a control signal that controls said adjustable actuator.

40. The traction drive of claim 39 further comprising:
a threaded interface that generates said translative movement of at least one bearing screw.

41. The traction drive of claim 39 further comprising:
ball ramps and balls that generate said translative movement.

42. The traction drive of claim 39 further comprising:
a ball screw and balls that generate said translative movement.

43. The traction drive of claim 36 wherein said externally controlled adjustable actuator comprises:
a hydraulic pressure translative actuator that controls force applied to said sloped ring surfaces.

44. The traction drive of claim 36 wherein said externally controlled adjustable actuator comprises:
a pneumatic pressure translative actuator that controls force applied to said sloped ring surfaces.

45. The traction drive of claim 36 wherein said externally controlled adjustable actuator comprises:
at least one piezoelectric element that controls force applied to said sloped ring surfaces.

46. The traction drive of claim 36 wherein said rotary actuator comprises an electric motor.

47. The traction drive of claim 25 further comprising:
a substantially constant force device that hold pressure of said sloped traction surfaces.

48. The traction drive of claim 47 wherein said substantially constant force device comprises a spring.

49. The traction drive of claim 47 wherein said substantially constant force device comprises a shim.

50. The traction drive of claim 25 further comprising:
an automatic variable clamping actuator that controls movement of said sloped traction surfaces.

51. The traction drive of claim 50 wherein said automatic variable clamping actuator comprises a plurality of balls that are disposed in a sloped channel in at least three ball races that generate a translative movement in said traction rings whenever torque is applied to said at least three ball races.

52. A traction drive comprising:
a shaft having a shaft traction surface;
rollers having inner roller traction surfaces and outer roller traction surfaces;
a ring gear having an outer gear mesh;
sloped traction surfaces that mate with said inner roller traction surfaces of said rollers that creates a sloped traction interface that transfers rotational mechanical energy between said rollers and said sloped traction surfaces, and forces said rollers towards said shaft so that said outer roller traction surfaces are forced against said shaft traction surface to create a shaft traction interface that transfers rotational mechanical energy between said rollers and said shaft.

53. The traction drive of claim 52 wherein said rollers further comprise:
rollers having inner roller traction surfaces that mate with said sloped traction ring surfaces of an angle of approximately one degree to twenty degrees which creates pressure to force said outer roller traction surfaces of said roller against said shaft traction surface of said shaft.

54. The traction drive of claim 52 further comprising:
traction fluid sprayed on said sloped traction interface and said shaft traction interface.

55. The traction drive of claim 54 further comprising:
spray holes that spray said sloped traction interface and said shaft traction interface with traction fluid.

56. The traction drive of claim 55 further comprising:
spray holes that spray said traction fluid on a closing side of said sloped traction interface and said shaft traction interface to supply traction fluid to said sloped traction interface and said shaft traction interface;
spray holes that spray said traction fluid on an opening side of said sloped traction interface and said shaft traction interface to cool said inner roller sloped surfaces and said outer roller traction surface and said shaft traction surface.

57. The traction drive of claim 52 further comprising:
at least one first bearing mounted in at least one first roller;
at least one bearing support that mounts said at least one first bearing on a housing;
at least one second bearing mounted in at least one second roller;
at least one bearing screw mounted on said at least one second bearings, said at least one bearing screw being adjustably mounted in a housing to create a force on said at least one second bearing which forces said at least one second roller towards said at least one first roller and creates a reactive force in said bearing supports that forces said first set of bearings and said at least one first roller towards said at least one second roller.

58. The traction drive of claim 57 further comprising:
tolerance rings disposed on said bearing supports and said bearing screws that function as radial springs that are compressed when said first set of rollers move toward said second set of rollers.

59. The traction drive of claim 57 further comprising:
a pivoting arm having at least two rollers mounted on said pivoting arm that allow said at least two rollers to move toward and away from said shaft.

60. The traction drive of claim 57 further comprising:
a motor that is coupled to at least one of said bearing screws that automatically adjusts at least one of said bearing screws in response to control signals.

61. The traction drive of claim 52 wherein said sloped traction surfaces comprise traction rings that are coupled to opposite sides of said ring gear.

62. The traction drive of claim 52 wherein said sloped traction surfaces are formed in said ring gear.

63. The traction drive of claim 52 further comprising:
an externally controlled adjustable actuator that controls movement of said sloped traction surfaces.

64. The traction drive of claim 63 wherein said externally controlled adjustable actuator comprises a threaded hydraulic vane rotor that rotates on a threaded interface to create a translative motion in said sloped traction surfaces whenever hydraulic pressure is applied to said thermal hydraulic vane rotor.

65. The traction drive of claim 63 wherein said externally controlled adjustable actuator comprises:
a rotary actuator that rotates to create translative movement.

66. The traction drive of claim 65 further comprising:
a controller that generates a control signal that controls said adjustable actuator.

67. The traction drive of claim 66 further comprising:
a threaded interface that generates said translative movement of at least one bearing screw.

68. The traction drive of claim 66 further comprising:
ball ramps and balls that generate said translative movement.

69. The traction drive of claim 66 further comprising:
a ball screw and balls that generate said translative movement.

70. The traction drive of claim 65 wherein said rotary actuator comprises an electric motor.

71. The traction drive of claim 63 wherein said externally controlled adjustable actuator comprises:
a hydraulic pressure translative actuator that controls force applied to said sloped traction surfaces.

72. The traction drive of claim 63 wherein said externally controlled adjustable actuator comprises:
a pneumatic pressure translative actuator that controls force applied to said sloped traction surfaces.

73. The traction drive of claim 63 wherein said externally controlled adjustable actuator comprises:
at least one piezoelectric element that controls force applied to said sloped traction surfaces.

74. The traction drive of claim 52 further comprising:
a substantially constant force device that holds pressure of said sloped traction surfaces.

75. The traction drive of claim 74 wherein said substantially constant force device comprises a spring.

76. The traction drive of claim 74 wherein said substantially constant force device comprises a shim.

77. The traction drive of claim 52 further comprising:
an automatic variable clamping device that holds pressure of said sloped traction surfaces.

78. The traction drive of claim 77 wherein said automatic variable clamping device comprises a plurality of balls that are disposed in sloped channels in at least three ball races that generate a translative movement in said traction rings whenever torque is applied to said at least three ball races.

79. The traction drive of claim 52 further comprising:
roller holders attached to said rollers, said roller holders disposed to engage pairs of said rollers so that said pairs of said rollers rotate together.

80. A method of transferring rotational mechanical energy comprising:
obtaining a shaft having a shaft traction surface;
obtaining rollers having inner roller traction surfaces and outer roller traction surfaces;
obtaining sloped traction surfaces that mate with said inner roller traction surfaces of said rollers;
forcing said rollers towards said sloped traction surfaces to create a force against said inner roller traction surfaces of said rollers and said sloped traction surfaces that creates a sloped traction interface, that causes rotational mechanical energy to be transferred between said rollers and said sloped traction surfaces, and causing said rollers to be forced towards said shaft, which forces said outer roller traction surfaces of said rollers against said shaft traction surface of said shaft, to create pressure on a shaft traction interface that is created between said shaft traction surface of said shaft and said outer roller traction surface of said rollers, that increases friction in said shaft traction interface, which causes said rotational mechanical energy to be transferred between said shaft and said rollers.

81. The method of claim 80 wherein said process of obtaining sloped traction surfaces comprises coupling traction rings to a ring gear.

82. The method of claim 80 wherein said process of obtaining sloped traction surfaces comprises forming said sloped traction surfaces on a ring gear.

83. The method of claim 80 wherein said process of obtaining rollers having inner roller traction surfaces and outer roller traction surfaces further comprises:
obtaining rollers having inner roller traction surfaces that mate with said sloped traction surfaces of an angle of approximately one degree to approximately twenty degrees, which creates pressure to force said outer roller traction surfaces of said roller against said shaft traction surface of said shaft.

84. The method of claim 80 further comprising:
mounting at least two of said rollers on a pivoting arm that allows said at least two rollers to pivot away from said shaft so that said shaft can be inserted between and removed from said inner roller traction surfaces of said rollers without causing damage to said inner roller traction surfaces and said shaft traction surface.

85. The method of claim 80 further comprising:
spraying traction fluid on said sloped traction interface and said shaft traction interface.

86. The method of claim 85 wherein said process of spraying said traction fluid on said sloped traction interface and said shaft traction interface comprises:
spraying said traction fluid on a closing side of said sloped traction interface and said shaft traction interface to supply traction fluid to said sloped traction interface and said shaft traction interface;
spraying said traction fluid on an opening side of said sloped traction interface and said shaft traction interface to cool said sloped traction interface and said shaft traction interface.

87. The method of claim 80 further comprising:
mounting a first set of said rollers in a first set of bearings;
mounting said first set of bearings in bearing supports;
mounting said bearing supports on a housing;
mounting a second set of said rollers on a second set of bearings;
mounting said second set of bearings on bearing screws, said bearing screws being adjustably mounted in said housing;
adjusting said bearing screws in said housing to create a force on said second set of bearings which forces said second set of rollers towards said first set of rollers and creates a reactive force in said bearing supports that forces said first set of bearings and said first set of rollers towards said second set of rollers.

88. The method of claim 87 wherein said process of forcing said rollers towards said sloped traction surfaces to create a force against said inner roller traction surfaces of said rollers and said sloped traction surfaces that creates a sloped traction interface, causing said rollers to move towards said shaft further comprises:
forcing said rollers towards said sloped traction surfaces to create a force against said inner roller traction surfaces of said rollers and said sloped traction surfaces that creates a sloped traction interface, causing said rollers to move towards said shaft as a result of compression of tolerance rings disposed on said bearing supports and said bearing screws which function as radial springs.

89. The method of claim 87 wherein said process of forcing said rollers towards said sloped traction surfaces to create a force against said inner roller traction surfaces of said rollers and said sloped traction surfaces that creates a sloped traction interface, causing said rollers to move towards said shaft further comprises:
forcing said rollers towards said sloped traction surfaces to create a force against said inner roller traction surfaces of said rollers and said sloped traction surfaces that creates a sloped traction interface, causing said rollers mounted on a pivoting arm to move toward said shaft.

90. The method of claim 87 wherein said process of adjusting said bearing screws further comprises:

adjusting said bearing screws automatically using an electronic control system to create a traction drive with variable torque.

91. The method of claim 80 further comprising:
mounting said rollers in bearings;
mounting said bearings on bearing screws, said bearing screws being adjustably mounted in a housing;
adjusting said bearing screws in said housing to create a force on said bearings which forces said rollers towards each other.

92. The method of claim 91 wherein said process of forcing said rollers towards said sloped traction surfaces to create a force against said inner roller traction surfaces of said rollers and said sloped traction surfaces that creates a sloped traction interface, causing said rollers to move towards said shaft further comprises:
forcing said rollers towards said sloped traction surfaces to create a force against said inner roller traction surfaces of said rollers and said sloped traction surfaces that creates a sloped traction interface, causing said rollers to move towards said shaft as a result of compression of tolerance rings disposed on said bearing supports and said bearing screws which function as radial springs.

93. The method of claim 91 wherein said process of forcing said rollers towards said sloped traction surfaces to create a force against said inner roller traction surfaces of said rollers and said sloped traction surfaces that creates a sloped traction interface, causing said rollers to move towards said shaft further comprises:
forcing said rollers towards said sloped traction surfaces to create a force against said inner roller traction surfaces of said rollers and said sloped traction surfaces that creates a sloped traction interface, causing said rollers mounted on a pivoting arm to move toward said shaft.

94. The method of claim 91 wherein said process of adjusting said bearing screws further comprises:
adjusting said bearing screws automatically using an electronic control system to create a traction drive with variable torque.

95. The method of claim 80 wherein said process of forcing said rollers toward said sloped traction surfaces comprises:
using an externally controlled adjustable clamping process to force said sloped traction surfaces together.

96. The method of claim 95 wherein said process of using an externally controlled adjustable clamping process comprises:
using a rotary actuator that rotates to create lateral translative movement of at least two bearing seats to vary clamping forces on said sloped traction surfaces.

97. The method of claim 96 further comprising:
using a controller that generates a control signal to control said rotary actuator.

98. The method of claim 97 wherein said lateral translative movement is created by a threaded interface.

99. The method of claim 97 wherein said translative movement is created by ball ramps.

100. The method of claim 97 wherein said translative movement is created by ball screws.

101. The method of claim 96 wherein said process of using an externally controlled clamping process comprises:
using a threaded hydraulic vane rotor that rotates and generates a translative movement that applies a force to said bearing seats.

102. The method of claim 95 wherein said externally controlled adjustable clamping process comprises:
controlling application of hydraulic pressure to a hydraulic translative device that controls said force applied to said bearing seats.

103. The method of claim 95 wherein said externally controlled adjustable clamping process comprises:
controlling application of pneumatic pressure to a pneumatic translative device that controls said force applied to said sloped traction surfaces.

104. The method of claim 95 wherein said externally controlled adjustable clamping process comprises:
controlling voltage applied to a piezoelectric element to create lateral translative movement of at least one bearing seat to vary clamping forces on said sloped traction surfaces.

105. The method of claim 80 wherein said process of forcing said rollers toward said sloped traction surfaces comprises:
using a substantially constant force clamping process.

106. The method of claim 105 wherein said process of using a substantially constant force clamping process comprises using a spring to force said rollers toward said sloped traction interface.

107. The method of claim 105 wherein said process of using a substantially constant force clamping process comprises using a shim to force said rollers toward said sloped traction surfaces.

108. The method of claim 80 wherein said process of forcing said rollers toward said sloped traction interface comprises:
using an automatic variable clamping process to increase force on said sloped traction interface.

109. The method of claim 108 wherein said process of using an automatic variable clamping process comprises:
using a plurality of balls that are disposed in sloped channels in at least two ball races that generate a translative movement in said sloped traction surfaces, whenever torque is applied to said at least two ball races.

110. A method of transferring rotational mechanical energy between a shaft and a ring gear comprising:
obtaining a shaft having a shaft hard smooth surface;
obtaining rollers having inner roller hard smooth surfaces and outer roller hard smooth surfaces;
coupling rings to opposite sides of said ring gear, said rings having sloped hard smooth ring surfaces that mate with said inner roller hard smooth surfaces of said rollers;
attaching planet gears to said rollers, said planet gears disposed to engage an inner gear mesh on said ring gear so that rotational mechanical energy is transferred between said rollers and said ring gears through said planet gears;
forcing said rollers towards said rings to create a force against said inner roller hard smooth surfaces of said rollers and said sloped hard smooth ring surfaces of said rings that creates a sloped interface, forcing said rollers towards said shaft, which forces said outer roller hard smooth surfaces of said rollers against said hard smooth surface of said shaft, to create pressure on a shaft interface that is created between said surface of said shaft and said outer roller surface of said rollers, that increases friction in said shaft interface, which causes said rotational mechanical energy to be transferred between said shaft and said rollers which causes said rotational mechanical energy to be transferred between said ring gear and said rollers through said planet gears.

111. The method of claim 110 wherein said process of obtaining rollers having inner roller hard smooth surfaces and outer roller hard smooth surfaces further comprises:

obtaining rollers having inner roller hard smooth surfaces that have an angle of approximately one to approximately twenty degrees that mate with said sloped hard smooth ring surfaces that have a complimentary angle, which creates pressure to force said outer roller hard smooth surfaces of said roller against said hard smooth surface of said shaft.

112. The method of claim 110 further comprising:

mounting at least two of said rollers on a pivoting arm that allows at least two rollers to pivot away from said shaft so that said shaft can be inserted between and removed from said outer roller hard smooth surfaces of said rollers without causing damage to said outer roller hard smooth surfaces and said shaft hard smooth surface.

113. The method of claim 110 further comprising:

spraying fluid on said sloped interface and said shaft interface.

114. The method of claim 113 wherein said process of spraying said fluid on said sloped interface and said shaft interface comprises:

spraying said fluid on a closing side of said sloped interface and said shaft interface to supply fluid to said sloped interface and said shaft interface;

spraying said fluid on an opening side of said sloped interface and said shaft interface to cool said inner roller hard smooth surfaces, outer roller hard smooth surfaces and said hard smooth surface of said shaft.

115. The method of claim 110 further comprising:

mounting a first set of said rollers in a first set of bearings;

mounting said first set of bearings in bearing supports;

mounting said bearing supports on a housing;

mounting a second set of said rollers on a second set of bearings;

mounting said second set of bearings on bearing screws, said bearing screws being adjustably mounted in said housing;

adjusting said bearing screws in said housing to create a force on said second set of bearings which forces said second set of rollers towards said first set of rollers and creates a reactive force in said bearing supports that forces said first set of bearings and said first set of rollers towards said second set of rollers.

\* \* \* \* \*